United States Patent
Buzbee et al.

(10) Patent No.: US 12,093,429 B2
(45) Date of Patent: *Sep. 17, 2024

(54) REMOTING APPLICATION ACROSS A NETWORK USING DRAW COMMANDS WITH AN ISOLATOR APPLICATION

(71) Applicant: CLOUDFLARE, INC., San Francisco, CA (US)

(72) Inventors: Benjamin Buzbee, Woodinville, WA (US); Killian Koenig, Seattle, WA (US); Trevor Sundberg, Kirkland, WA (US); Michael Conrad, Monroe, WA (US); Darren Remington, Mesa, AZ (US); David Harnett, Seattle, WA (US)

(73) Assignee: CLOUDFLARE, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/333,285

(22) Filed: Jun. 12, 2023

(65) Prior Publication Data
US 2023/0342500 A1 Oct. 26, 2023

Related U.S. Application Data

(63) Continuation of application No. 16/781,854, filed on Feb. 4, 2020, now Pat. No. 11,675,930.
(Continued)

(51) Int. Cl.
*G06F 21/62* (2013.01)
*G06F 11/36* (2006.01)
(Continued)

(52) U.S. Cl.
CPC ........ *G06F 21/629* (2013.01); *G06F 11/3656* (2013.01); *G06F 21/53* (2013.01);
(Continued)

(58) Field of Classification Search
None
See application file for complete search history.

(56) References Cited

U.S. PATENT DOCUMENTS

| 5,835,096 A | 11/1998 | Baldwin |
| 5,909,545 A | 6/1999 | Frese et al. |

(Continued)

FOREIGN PATENT DOCUMENTS

| CN | 102316093 A | 1/2012 |
| CN | 102333075 A | 1/2012 |

(Continued)

OTHER PUBLICATIONS

Notice of Allowance, U.S. Appl. No. 16/781,854, dated Jan. 25, 2023, 5 pages.
(Continued)

*Primary Examiner* — Christopher C Harris
(74) *Attorney, Agent, or Firm* — NICHOLSON DE VOS WEBSTER & ELLIOTT LLP

(57) ABSTRACT

A client device instantiates an isolator application. A request to instantiate a remote application in a server device is sent by the isolator application instance. The isolator application instance receives, from the remote application instance, draw commands and position information that correspond to the draw commands. The isolator application instance renders one or more portions of output based on the draw commands and the position information.

21 Claims, 19 Drawing Sheets

Related U.S. Application Data

(60) Provisional application No. 62/843,205, filed on May 3, 2019, provisional application No. 62/800,948, filed on Feb. 4, 2019, provisional application No. 62/800,937, filed on Feb. 4, 2019.

(51) Int. Cl.
*G06F 21/53* (2013.01)
*G06F 21/71* (2013.01)
*H04L 9/40* (2022.01)

(52) U.S. Cl.
CPC ...... *G06F 21/6245* (2013.01); *G06F 21/6281* (2013.01); *G06F 21/71* (2013.01); *H04L 63/1416* (2013.01); *H04L 63/1441* (2013.01)

(56) References Cited

U.S. PATENT DOCUMENTS

| | | |
|---|---|---|
| 6,279,001 B1 | 8/2001 | Debettencourt et al. |
| 6,384,821 B1 | 5/2002 | Borrel et al. |
| 6,704,024 B2 | 3/2004 | Robotham et al. |
| 6,832,380 B1 | 12/2004 | Lau et al. |
| 7,003,565 B2 | 2/2006 | Hind et al. |
| 7,552,467 B2 | 6/2009 | Lindsay |
| 7,555,529 B2 | 6/2009 | Bloomfield et al. |
| 7,634,810 B2 | 12/2009 | Goodman et al. |
| 7,657,837 B2 | 2/2010 | Shappir et al. |
| 7,865,931 B1 | 1/2011 | Stone et al. |
| 7,982,749 B2 | 7/2011 | Mathew et al. |
| 7,984,500 B1 | 7/2011 | Khanna et al. |
| 8,019,995 B2 | 9/2011 | Van Bemmel |
| 8,140,610 B2 | 3/2012 | Abdo et al. |
| 8,176,434 B2 | 5/2012 | Saul et al. |
| 8,189,661 B2 | 5/2012 | Abdo et al. |
| 8,209,372 B2 | 6/2012 | Abdo et al. |
| 8,214,899 B2 | 7/2012 | Chien |
| 8,220,047 B1 | 7/2012 | Soghoian et al. |
| 8,291,065 B2 | 10/2012 | Goodman et al. |
| 8,306,807 B2 | 11/2012 | Van et al. |
| 8,307,103 B2 | 11/2012 | Abdo et al. |
| 8,332,626 B2 | 12/2012 | Mansfield |
| 8,370,899 B2 | 2/2013 | Shoval et al. |
| 8,375,434 B2 | 2/2013 | Cottrell et al. |
| 8,453,049 B1 | 5/2013 | Grieve et al. |
| 8,474,035 B2 | 6/2013 | Wei et al. |
| 8,504,654 B1 | 8/2013 | Kominac et al. |
| 8,607,054 B2 | 12/2013 | Ramarathinam et al. |
| 8,615,795 B2 | 12/2013 | Cottrell et al. |
| 8,621,604 B2 | 12/2013 | Chien |
| 8,762,861 B2 | 6/2014 | Hyndman et al. |
| 8,763,009 B2 | 6/2014 | Degirmenci et al. |
| 8,776,169 B2 | 7/2014 | Rajagopal et al. |
| 8,799,357 B2 | 8/2014 | Clift et al. |
| 8,866,701 B2 | 10/2014 | Momchilov et al. |
| 8,881,227 B2 | 11/2014 | Rajagopal et al. |
| 8,913,068 B1 | 12/2014 | Kokkevis et al. |
| 8,941,673 B2 | 1/2015 | Larsson |
| 8,949,726 B2 | 2/2015 | Kominac et al. |
| 8,970,450 B2 | 3/2015 | Momchilov |
| 9,009,334 B1 | 4/2015 | Jenkins et al. |
| 9,015,090 B2 | 4/2015 | Chien |
| 9,075,895 B2 | 7/2015 | Lindsey et al. |
| 9,092,249 B2 | 7/2015 | Stone |
| 9,124,668 B2 | 9/2015 | Giebler |
| 9,137,238 B1 | 9/2015 | Jakobsson |
| 9,167,020 B2 | 10/2015 | Abdo et al. |
| 9,244,912 B1 | 1/2016 | Kominac et al. |
| 9,246,904 B2 | 1/2016 | Rajagopal et al. |
| 9,257,097 B2 | 2/2016 | Subramaniam et al. |
| 9,363,134 B1 | 6/2016 | Goodspeed |
| 9,367,947 B2 | 6/2016 | Stone |
| 9,391,832 B1 | 7/2016 | Song et al. |
| 9,395,885 B1 | 7/2016 | Kominac et al. |
| 9,430,036 B1 | 8/2016 | Kominac et al. |
| 9,460,284 B1 | 10/2016 | Hajmasan et al. |
| 9,521,118 B2 | 12/2016 | Cottrell et al. |
| 9,535,560 B1 | 1/2017 | Kominac et al. |
| 9,537,873 B2 | 1/2017 | Petry et al. |
| 9,582,600 B1 | 2/2017 | Killian et al. |
| 9,634,999 B1 | 4/2017 | Marion et al. |
| 9,646,394 B2 | 5/2017 | Lindsey |
| 9,674,145 B2 | 6/2017 | Chien |
| 9,767,110 B2 | 9/2017 | Lindsey et al. |
| 9,898,610 B1 | 2/2018 | Hadsall |
| 9,912,677 B2 | 3/2018 | Chien |
| 9,954,825 B2 | 4/2018 | Prey et al. |
| 9,965,133 B1 | 5/2018 | Lindsey et al. |
| 10,002,403 B2 | 6/2018 | Abdo et al. |
| 10,027,700 B2 | 7/2018 | Petry et al. |
| 10,062,141 B2 | 8/2018 | Lifshitz et al. |
| 10,084,791 B2 | 9/2018 | Chien |
| 10,185,761 B2 | 1/2019 | Mahjoub et al. |
| 10,268,522 B2 | 4/2019 | Ferris et al. |
| 10,949,488 B1 | 3/2021 | Kanfer et al. |
| 2001/0000265 A1 | 4/2001 | Schreiber et al. |
| 2002/0078255 A1 | 6/2002 | Narayan |
| 2002/0154214 A1 | 10/2002 | Scallie et al. |
| 2003/0041093 A1 | 2/2003 | Yamane et al. |
| 2003/0120658 A1 | 6/2003 | Carneal et al. |
| 2003/0177172 A1 | 9/2003 | Duursma et al. |
| 2003/0208634 A1 | 11/2003 | McElligott |
| 2004/0049530 A1 | 3/2004 | Lok et al. |
| 2004/0085310 A1 | 5/2004 | Snuffer |
| 2004/0165007 A1 | 8/2004 | Shafron |
| 2004/0179262 A1 | 9/2004 | Harman et al. |
| 2004/0183756 A1 | 9/2004 | Freitas et al. |
| 2005/0012749 A1 | 1/2005 | Gonzalez et al. |
| 2005/0050548 A1 | 3/2005 | Sheinis et al. |
| 2005/0140694 A1 | 6/2005 | Subramanian et al. |
| 2005/0257243 A1 | 11/2005 | Baker |
| 2006/0082583 A1 | 4/2006 | Leichtling et al. |
| 2006/0123478 A1 | 6/2006 | Rehfuss et al. |
| 2006/0184614 A1 | 8/2006 | Baratto et al. |
| 2006/0200535 A1 | 9/2006 | Moser |
| 2006/0230105 A1 | 10/2006 | Shappir et al. |
| 2006/0230438 A1 | 10/2006 | Shappir et al. |
| 2006/0248571 A1 | 11/2006 | Ruge |
| 2006/0285172 A1 | 12/2006 | Hull et al. |
| 2007/0055749 A1 | 3/2007 | Chien |
| 2007/0067104 A1 | 3/2007 | Mays |
| 2007/0211065 A1 | 9/2007 | Feth et al. |
| 2008/0042923 A1 | 2/2008 | De Laet |
| 2008/0098006 A1 | 4/2008 | Pedersen et al. |
| 2008/0100626 A1 | 5/2008 | Diard |
| 2008/0152097 A1 | 6/2008 | Kent |
| 2008/0170622 A1 | 7/2008 | Gordon et al. |
| 2008/0211816 A1 | 9/2008 | Gonzalez et al. |
| 2008/0212942 A1 | 9/2008 | Gordon et al. |
| 2008/0301566 A1 | 12/2008 | Abdo et al. |
| 2009/0190028 A1 | 7/2009 | Rodriguez et al. |
| 2009/0207167 A1 | 8/2009 | Pasetto |
| 2009/0259588 A1 | 10/2009 | Lindsay |
| 2009/0303245 A1 | 12/2009 | Soupikov et al. |
| 2009/0305790 A1 | 12/2009 | Lu et al. |
| 2009/0327354 A1 | 12/2009 | Resnick et al. |
| 2009/0328109 A1 | 12/2009 | Pavlovskaia et al. |
| 2010/0013842 A1 | 1/2010 | Green et al. |
| 2010/0020098 A1 | 1/2010 | Elmieh et al. |
| 2010/0079480 A1 | 4/2010 | Murtagh |
| 2010/0138780 A1 | 6/2010 | Marano et al. |
| 2010/0158109 A1 | 6/2010 | Dahlby et al. |
| 2010/0228871 A1 | 9/2010 | Schmieder et al. |
| 2010/0254603 A1 | 10/2010 | Rivera |
| 2010/0268813 A1 | 10/2010 | Pahlavan et al. |
| 2010/0299436 A1 | 11/2010 | Khalid et al. |
| 2010/0302261 A1 | 12/2010 | Abdo et al. |
| 2010/0303146 A1 | 12/2010 | Kamay |
| 2010/0306413 A1 | 12/2010 | Kamay |
| 2010/0318992 A1 | 12/2010 | Kushwaha et al. |
| 2011/0010455 A1 | 1/2011 | Wolfe et al. |
| 2011/0055922 A1 | 3/2011 | Cohen et al. |
| 2011/0078234 A1 | 3/2011 | Engel |
| 2011/0078532 A1 | 3/2011 | Vonog et al. |

(56) References Cited

U.S. PATENT DOCUMENTS

| | | |
|---|---|---|
| 2011/0134111 A1 | 6/2011 | Stone |
| 2011/0141123 A1 | 6/2011 | Kumar et al. |
| 2011/0157196 A1 | 6/2011 | Nave et al. |
| 2011/0173251 A1 | 7/2011 | Sandhu et al. |
| 2011/0173564 A1 | 7/2011 | Margarint et al. |
| 2011/0260948 A1 | 10/2011 | Teng et al. |
| 2012/0081353 A1 | 4/2012 | Yusupov et al. |
| 2012/0084791 A1 | 4/2012 | Benedek et al. |
| 2012/0092277 A1 | 4/2012 | Momchilov |
| 2012/0108330 A1 | 5/2012 | Dietrich et al. |
| 2012/0113091 A1 | 5/2012 | Isaacson |
| 2012/0117145 A1 | 5/2012 | Clift et al. |
| 2012/0151369 A1 | 6/2012 | Kominac et al. |
| 2012/0151371 A1 | 6/2012 | Kominac et al. |
| 2012/0206463 A1 | 8/2012 | Reid et al. |
| 2012/0210333 A1 | 8/2012 | Potter et al. |
| 2012/0226742 A1 | 9/2012 | Momchilov et al. |
| 2012/0262379 A1 | 10/2012 | King |
| 2012/0296959 A1 | 11/2012 | Momchilov et al. |
| 2012/0317236 A1 | 12/2012 | Abdo et al. |
| 2013/0002688 A1 | 1/2013 | Zhu et al. |
| 2013/0042259 A1 | 2/2013 | Urbach |
| 2013/0113833 A1 | 5/2013 | Larsson |
| 2013/0127858 A1 | 5/2013 | Leroy et al. |
| 2013/0138810 A1 | 5/2013 | Binyamin et al. |
| 2013/0246513 A1 | 9/2013 | Zaveri et al. |
| 2013/0290858 A1 | 10/2013 | Beveridge |
| 2014/0047007 A1 | 2/2014 | Plant |
| 2014/0184622 A1 | 7/2014 | Xia |
| 2014/0208442 A1 | 7/2014 | Mooring |
| 2014/0310809 A1 | 10/2014 | Li et al. |
| 2014/0344345 A1 | 11/2014 | Venkatraman et al. |
| 2015/0058923 A1 | 2/2015 | Rajagopal et al. |
| 2015/0161754 A1 | 6/2015 | Isaacson |
| 2015/0195106 A1 | 7/2015 | Sehr et al. |
| 2015/0222600 A1 | 8/2015 | Cottrell et al. |
| 2015/0350295 A1 | 12/2015 | Isaacson |
| 2015/0373148 A1 | 12/2015 | He et al. |
| 2016/0006800 A1 | 1/2016 | Summers et al. |
| 2016/0006803 A1 | 1/2016 | Kumar |
| 2016/0050159 A1 | 2/2016 | Cook et al. |
| 2016/0085603 A1 | 3/2016 | Degirmenci et al. |
| 2016/0104264 A1 | 4/2016 | Arulesan et al. |
| 2016/0163017 A1 | 6/2016 | Iwasaki |
| 2016/0330260 A1 | 11/2016 | Ruge |
| 2016/0350061 A1 | 12/2016 | Turner et al. |
| 2017/0011487 A1 | 1/2017 | Billyard |
| 2017/0019393 A1 | 1/2017 | Rajagopal et al. |
| 2017/0041332 A1 | 2/2017 | Mahjoub et al. |
| 2017/0046013 A1 | 2/2017 | Reskusich et al. |
| 2017/0078406 A1 | 3/2017 | Ruge |
| 2017/0126775 A1 | 5/2017 | Schwebke et al. |
| 2017/0171289 A1 | 6/2017 | Fausak et al. |
| 2017/0185799 A1 | 6/2017 | Zheng |
| 2017/0249455 A1 | 8/2017 | Permeh et al. |
| 2017/0257655 A1 | 9/2017 | Quentin |
| 2017/0269953 A1 | 9/2017 | Prey et al. |
| 2017/0329985 A1 | 11/2017 | Barboy et al. |
| 2017/0353497 A1 | 12/2017 | Bradley et al. |
| 2018/0113794 A1 | 4/2018 | Yang et al. |
| 2018/0159896 A1 | 6/2018 | Soman et al. |
| 2018/0227326 A1 | 8/2018 | Shavro |
| 2018/0247075 A1 | 8/2018 | Aistrope |
| 2018/0307508 A1 | 10/2018 | Banerjee et al. |
| 2018/0309728 A1 | 10/2018 | Schwebke et al. |
| 2018/0324145 A1 | 11/2018 | Petry et al. |
| 2018/0324206 A1 | 11/2018 | Petry et al. |
| 2018/0338166 A1 | 11/2018 | Amiga et al. |
| 2018/0349283 A1 | 12/2018 | Bhatia et al. |
| 2018/0365334 A1 | 12/2018 | Semlani |
| 2018/0367483 A1 | 12/2018 | Rodriguez et al. |
| 2019/0025903 A1 | 1/2019 | Mehta et al. |
| 2019/0058738 A1 | 2/2019 | Adams et al. |
| 2019/0075130 A1 | 3/2019 | Petry et al. |
| 2019/0087161 A1 | 3/2019 | Sathe et al. |
| 2019/0109820 A1 | 4/2019 | Clark et al. |
| 2019/0213325 A1 | 7/2019 | McKerchar et al. |
| 2019/0279332 A1 | 9/2019 | Kruglick |
| 2019/0391712 A1 | 12/2019 | Singh |
| 2020/0250259 A1 | 8/2020 | Nanavati et al. |

FOREIGN PATENT DOCUMENTS

| | | |
|---|---|---|
| CN | 102333110 A | 1/2012 |
| CN | 102333306 A | 1/2012 |
| CN | 103997487 A | 8/2014 |
| CN | 107801052 A | 3/2018 |
| EP | 2403206 A1 | 1/2012 |
| EP | 2403207 A1 | 1/2012 |
| EP | 2790176 A1 | 10/2014 |
| EP | 3104271 A1 | 12/2016 |
| JP | 5646518 B2 | 12/2014 |
| JP | 6200062 B2 | 9/2017 |
| KR | 10-2014-0027741 A | 3/2014 |
| KR | 10-1914207 B1 | 11/2018 |
| WO | 2009/127067 A1 | 10/2009 |
| WO | 2014/035936 A2 | 3/2014 |
| WO | 2015/023316 A1 | 2/2015 |
| WO | 2016/177678 A1 | 11/2016 |
| WO | 2020/141391 A1 | 7/2020 |

OTHER PUBLICATIONS

Notice of Allowance, U.S. Appl. No. 16/781,854, dated May 10, 2023, 2 pages.
Notice of Allowance, U.S. Appl. No. 16/781,854, dated Sep. 29, 2022, 5 pages.
Notice of Allowance, U.S. Appl. No. 16/781,859, dated Feb. 17, 2022, 8 pages.
Notice of Allowance, U.S. Appl. No. 16/781,859, dated Nov. 10, 2021, 2 pages.
Notice of Allowance, U.S. Appl. No. 16/781,859, dated Oct. 21, 2021, 20 pages.
Notice of Allowance, U.S. Appl. No. 16/781,861, dated Feb. 23, 2023, 9 pages.
Notice of Allowance, U.S. Appl. No. 16/781,861, dated Sep. 8, 2022, 9 pages.
Notice of Allowance, U.S. Appl. No. 17/566,550, dated Apr. 5, 2023, 5 pages.
Notice of Allowance, U.S. Appl. No. 16/781,854, dated Apr. 15, 2022, 11 pages.
Open Simulator, "drawing commands", 2021 (Year: 2021).
Perrin, "Information processing apparatus, control method therefor, and program", 2016 (Year: 2016).
Requirement for Restriction/Election, U.S. Appl. No. 16/781,861, dated Jan. 15, 2021, 5 pages.
Stelovsky et al., "A System for Specification and Rapid Prototyping of Application Command Languages", 1988 (Year: 1988).
Technopedia, "Instantiate", 2020 (Year: 2020).
Techopedia, "instantiate", 2021 (Year: 2021).
thesourcecad_com, "150 Autocad command an shortcut list", 2021 (Year: 2021).
Wikipedia, "Instantiation", 2020 (Year: 2020).
Wikipedia, "instantiation", 2021 (Year: 2021).
Yue et al., "BogusBiter: A Transparent Protection Against Phishing Attacks," ACM Trans. Internet Technol. 10, 2, Article 6 (May 2010), 31 pages.
"Ericom Shield Remote Browser Isolation, Protect Your Endpoints and Network From Browser-Based Attacks," Data Sheet, Ericom, Jan. 1, 2018, 2 pages.
"How can I implement authentication in my proxy server?," Information Security Stack Exchange, Aug. 1, 2013, retrieved from the Internet through security.stackexchange.com on Apr. 15, 2019, 8 pages.
"Menlo Security Isolation Platform, Adaptive Clientless Rendering," Menlo Security, Menlo Park, California, Jan. 1, 2016, 8 pages.
"Remote Browser Isolation Technology," WEBGAP, retrieved on the Internet on Feb. 20, 2019, at https://webgap.io/browser-isolalion-technology.html, 3 pages.

(56) References Cited

OTHER PUBLICATIONS

"Remote Desktop Protocol: Graphics Device Interface (GDI) Acceleration Extensions," Microsoft Corporation, Jun. 1, 2017, 260 pages.
"Remote Graphics FAQ," Ascender Technologies Ltd., retrieved from the Internet on Jan. 18, 2019, at http://www.ascender.com/remote-graphics/faq, 8 pages.
"Symantec Web Isolation, Advanced Threat Prevention Capabilities for Secure Web Gateways," Data Sheet, Symantec Corporation, Mountain View, California, Jan. 1, 2017, 2 pages.
"Using Cookie-based Authentication with a Forward Proxy," Novell, Micro Focus, posted May 24, 2002, current version: BorderManager 3.7, retrieved from the Internet on Apr. 15, 2019, at https://www.novell.com/coolsolutions/feature/7830.html, 2 pages.
"WebGL Demo Technical Explanation," Ascender Technologies Ltd., retrieved from the Internet on Jan. 22, 2019, at http://www.ascender.com/webgl-demo/webgl-demo-technical-explanation, 3 pages.
"Weblife Service: Next Gen Web Use Isolation," Technology Data Sheet, Weblife, Jan. 1, 2017, 2 pages.
De Lucas et al., "Ultra-Low Power Render-Based Collision Detection for CPU/GPU Systems", 2015 (Year: 2015).
Di Stefano et al., "STREGA: A Support for Transparently Handing Resources for Grid Applications", 2004 (Year: 2004).
U.S. Appl. No. 14/102,341 (Isaacson).
U.S. Appl. No. 14/288,764 (Isaacson).
U.S. Appl. No. 15/998,399 (Adams et al.).
U.S. Appl. No. 13/281,460 (Isaacson).
U.S. Appl. No. 14/169,989 (Cottrell et al.).
U.S. Appl. No. 15/281,440 (Rajagopal et al.).
Final Office Action, U.S. Appl. No. 16/389,879, dated Aug. 27, 2020, 23 pages.
Final Office Action, U.S. Appl. No. 16/389,879, dated Dec. 4, 2019, 27 pages.
Final Office Action, U.S. Appl. No. 16/389,879, dated Mar. 2, 2023, 20 pages.
Final Office Action, U.S. Appl. No. 16/389,879, dated May 11, 2021, 24 pages.
Final Office Action, U.S. Appl. No. 16/781,861, dated Aug. 25, 2021, 31 pages.
Final Office Action, U.S. Appl. No. 16/389,879, dated Mar. 28, 2022, 18 pages.
Gupta et al., "Defending against phishing attacks: taxonomy of methods, current issues and future directions," Telecommun Syst (2018) 67:247, https://doi.org/10.1007/s11235-017-0334-z, retrieved from the Internet through springer.com, 18 pages.
Informit, Pfeeger, "Security in Computing", "interception", 2006 (Year: 2006).
Isaacson, "Cloud Graphical Rendering: A New Paradigm," Version 1.6, Ascender Technologies Ltd., Aug. 2013, retrieved from the Internet through www.ascender.com on Jan. 18, 2019, 28 pages.
Isaacson, "Cloud Graphical Rendering: A New Paradigm," Version 1.7, Ascender Technologies Ltd., Aug. 2013, 30 pages.
Isaacson, "Cloud Graphical Rendering: Background to Ascender's Solution Part I," Ascender Technologies Ltd., Aug. 2013, retrieved from the Internet through www.ascender.com on Jan. 18, 2019, 8 pages.
Isaacson, "Cloud Graphical Rendering: Background to Ascender's Solution Part II," Version 1.5, Ascender Technologies Ltd., Aug. 2013, retrieved from the Internet through ascender.com on Jan. 18, 2019, 3 pages.
Isaacson, "Procedural Compression: Efficient, Low Bandwidth Remote Android Graphics," Ascender Technologies Ltd., Jan. 1, 2014, 24 pages.
Isaacson, "Remote Android Rendering Summary," Ascender Technologies Ltd., Jan. 1, 2014, 8 pages.
Isaacson, "Remote Android Rendering," Ascender Technologies Ltd., Jan. 1, 2014, 38 pages.
Isaacson, "Remote Graphical Rendering," Ascender Technologies Ltd., Jan. 1, 2012, 44 pages.
Kobes, Steve (skobes@chromium.org), "Life of a Pixel," Google LLC, Jun. 2018, 55 pages.
Non-Final Office Action, U.S. Appl. No. 16/389,879, dated Apr. 1, 2020.
Non-Final Office Action, U.S. Appl. No. 16/389,879, dated Aug. 26, 2022, 18 pages.
Non-Final Office Action, U.S. Appl. No. 16/389,879, dated Dec. 10, 2020, 19 pages.
Non-Final Office Action, U.S. Appl. No. 16/389,879, dated Oct. 7, 2021, 18 pages.
Non-Final Office Action, U.S. Appl. No. 16/781,854, dated Oct. 28, 2021, 6 pages.
Non-Final Office Action, U.S. Appl. No. 16/781,859, dated Mar. 22, 2021, 19 pages.
Non-Final Office Action, U.S. Appl. No. 16/781,859, dated Oct. 2, 2020, 36 pages.
Non-Final Office Action, U.S. Appl. No. 16/781,861, dated Apr. 27, 2021, 26 pages.
Non-Final Office Action, U.S. Appl. No. 17/566,550, dated Sep. 22, 2022, 21 pages.
Notice of Allowance, U.S. Appl. No. 16/389,879, dated Sep. 28, 2023, 21 pages.
Notice of Allowance, U.S. Appl. No. 16/503,388, dated Aug. 8, 2019, 17 pages.
Notice of Allowance, U.S. Appl. No. 16/503,393, dated Sep. 27, 2019, 10 pages.
Notice of Allowance, U.S. Appl. No. 16/509,278, dated Oct. 1, 2019, 10 pages.
Notice of Allowance, U.S. Appl. No. 16/554,384, dated Dec. 4, 2019, 11 pages.
Notice of Allowance, U.S. Appl. No. 16/659,482, dated Jan. 9, 2020, 9 pages.
Final Office Action, U.S. Appl. No. 18/355,587, Mar. 14, 2024, 22 pages.
Non-Final Office Action, U.S. Appl. No. 18/355,587, Feb. 13, 2024, 20 pages.

REMOTING APPLICATION ACROSS A NETWORK USING DRAW COMMANDS WITH AN ISOLATOR APPLICATION

CROSS-REFERENCE TO RELATED APPLICATIONS

This application is a continuation of Ser. No. 16/781,854 filed Feb. 4, 2020, which claims the benefit of U.S. Provisional Application No. 62/800,937, filed Feb. 4, 2019, U.S. Provisional Application No. 62/800,948, filed Feb. 4, 2019, and U.S. Provisional Application No. 62/843,205, filed May 3, 2019, which are each hereby incorporated by reference.

FIELD

The present disclosure relates to the field of network communication; and more specifically to methods, techniques, and systems for remoting applications across a network using draw commands with an isolator application.

BACKGROUND

Bad actors and cyber-attackers create malicious websites that install malware onto or otherwise attack a user's machine (whether that machine is a PC, Mac, tablet, phone, virtual-reality headset, augmented/mixed reality headset, or other computing device). These attackers can infect a user's machine at many levels, including taking advantage of security holes in operating systems and applications interfaces to system resources and drivers. One solution has been to restrict a user's direct access to the interface to the operating system (the "desktop") from which applications are run and to "remote" the desktop so that it runs in a protected space (e.g., a sandbox or virtual machine) on a server computing system. There are many protocols for forwarding input from the client computing system to the remote desktop and for sending back the output from the remoted desktop application, including Remote Desktop Protocol (RDP) and other similar protocols, all of which communicate output from the remote desktop by sending pixels or video. One difficulty with RDP and similar protocols is that they are specific to desktop operating systems and will not provide an ideal user experience with a web browsing session because the desktop input and output is intercepted at the interface to the underlying operating system. In addition, they may rely on specific operating system services and drivers being present on a client device. For example, RDP assumes a client device supports GDI (a WINDOWS® operating system graphics device interface) which may not be available on non-Windows based devices and other less ideal graphics interfaces are used for those non-Windows based devices. Another difficulty is that they are limited to transfers of pixels (as bitmaps) when remoting to non-Windows operating system clients. Another solution has been to isolate applications on the client computing system in a sandbox such as a virtual machine or equivalent on the client machine itself. However, a disadvantage is that, should an attack somehow escape the sandbox, it can attack the entire client computing system where it is likely to have personally identifiable information linked to the user rather than a remote server. Another disadvantage is that client-side isolation may require installing software on the client computing system.

Additionally, exploits within web browsers provide many avenues for attackers to steal information, gain access, or install malware to a user's machine (whether that machine is a PC, Mac, tablet, phone or other computing device). For example, malicious code can take advantage of a flaw or vulnerability in the operating system or browser software to breach browser security. Active content in today's browsers, such as through use of Flash and/or JavaScript, contributes to browser vulnerability by enabling attackers to identify memory locations, scrape data, and generate malicious code. For example, an exploit might change browser settings without the user's knowledge, or even run arbitrary code by exploiting flaws in the many technologies that execute within the browser, such as HTML, JavaScript, CSS, Java, images, video, etc. As another example, websites can be injected with malicious code which results in 'clickless' infections by which malware is downloaded without requiring the user to do anything but visit the website. This downloaded malware may then steal credential information, effect identity theft, etc. Most problems caused by such attacks are treated "ex post facto" and cannot be prevented in total.

One manner of securing an application is to execute the application remotely on a server instead of locally on a client device where the hosted remoted application can be protected inside of a sandbox, such as a virtual machine. When the application is a web browser, this is sometimes referred to as "browser isolation." One difficulty with using this approach with web browsers is that such browsers require extensive CPU, GPU, and memory resources making them expensive to run on a server.

Several attempted solutions have been employed to address these obstacles and to allow web browsers to be isolated by running them as remote processes. One such solution is to employ "pixel pushing" or "pixel mirroring" which allows a web page to be rendered remotely utilizing a web browser running on an external server to execute any active code associated with the web page and to produce a series of images which are sent back to a client web browser as compressed pixels or video (using for example H264 video format) to be eventually rendered by the web browser on the client device. This approach suffers from high bandwidth usage for sending pixel data, high server cost due to video rasterizing and encoding, high latency in the user experience, and rendering artifacts due to use of lossy compression or video encoding. In addition, malicious code can still penetrate the output sent to the endpoint (client) by changing pixels to embed malicious code to send bad data.

Another solution is to employ "Document Object Model" (DOM) remoting/mirroring. With this solution, the DOM corresponding to a page is sanitized before it is sent to the client to remove potentially malicious code and reconstructed on the client before rendering. This solution yields typically better performance than pixel pushing, but provides a less secure environment. Using DOM mirroring, a sanitizing process on the isolated browser computing system (e.g., a server) identifies bad HTML and active content and cleans up the DOM tree and reformats it without the active content or with content that has been transcoded into a safe format. Since the DOM on the isolated browser (the server) includes HTML, JavaScript, etc., malware still has plenty of opportunities to embed itself and surface. DOM mirroring also fails to support dynamic content (for example, WebGL or Flash), and each browser type renders DOM content differently, which leaves users with inconsistent or unpredictable experiences. Some companies offer solutions that allow a user, such as an IT administrator, to choose how much security is desired versus performance and employ a choice of using DOM mirroring and pixel pushing.

One approach to providing an isolation session is to have a web browser application executing on a client computer device download and parse a web application (for example, an application served via HyperText Transfer Protocol (HTTP) or HTTP Secure (HTTPS) and composed largely of HyperText Markup Language (HTML), JavaScript, Cascading Style Sheets (CSS), WebAssembly, or other components) to interface with a remotely isolated web browser instance to locally render outputs of the remotely isolated web browser instance as discussed above and to provide the remotely isolated web browser instance notifications of certain user inputs that are perceivable by the web application. Each of those user inputs must first be processed by the local web browser before being provided to the web application for use. Output of the remotely isolated web browser instance must be processed by the web application before being provided to the local web browser for rendering as discussed above. Accordingly, this approach often provides slow startup times and slow execution times.

Web applications also have limited access to the client computing device, such as fonts, a clipboard buffer, display details (for example, vertical blanking interval), or other limited aspects. This approach also causes locally installed extensions to operate on the web application yet not the remotely isolated web browser instance. For example, a local password manager extension would fail to recognize output of the remotely isolated web browser instance as including a password field that could be filled, unless the web application generated its own password field, which increases complexity. Moreover, many web browser functions that the user would expect to be available during non-isolation session are either not available or not seamless to the user during isolation sessions. For example, a find function of the local web browser searches the web application, which merely displays visuals from the remotely isolated web browser instance in a way that is not text-searchable (unless it is DOM mirroring, which is not fully secure, as discussed further above). As another example, a print or save function typically prints or saves output of the locally installed web application, instead of the output of the remote web browser. Some web browsers such as Chrome provide limited support for isolation sessions as utilized by the "devtool" views (for example, to view an Android browser), yet this limited support fails to seamlessly integrate into the existing user interface of the browser (for example, instead creating a separate input for an address bar of the remotely isolated web browser instance). This limited support also typically has limited features, as discussed further above.

DESCRIPTION OF EMBODIMENTS

Figure 1:
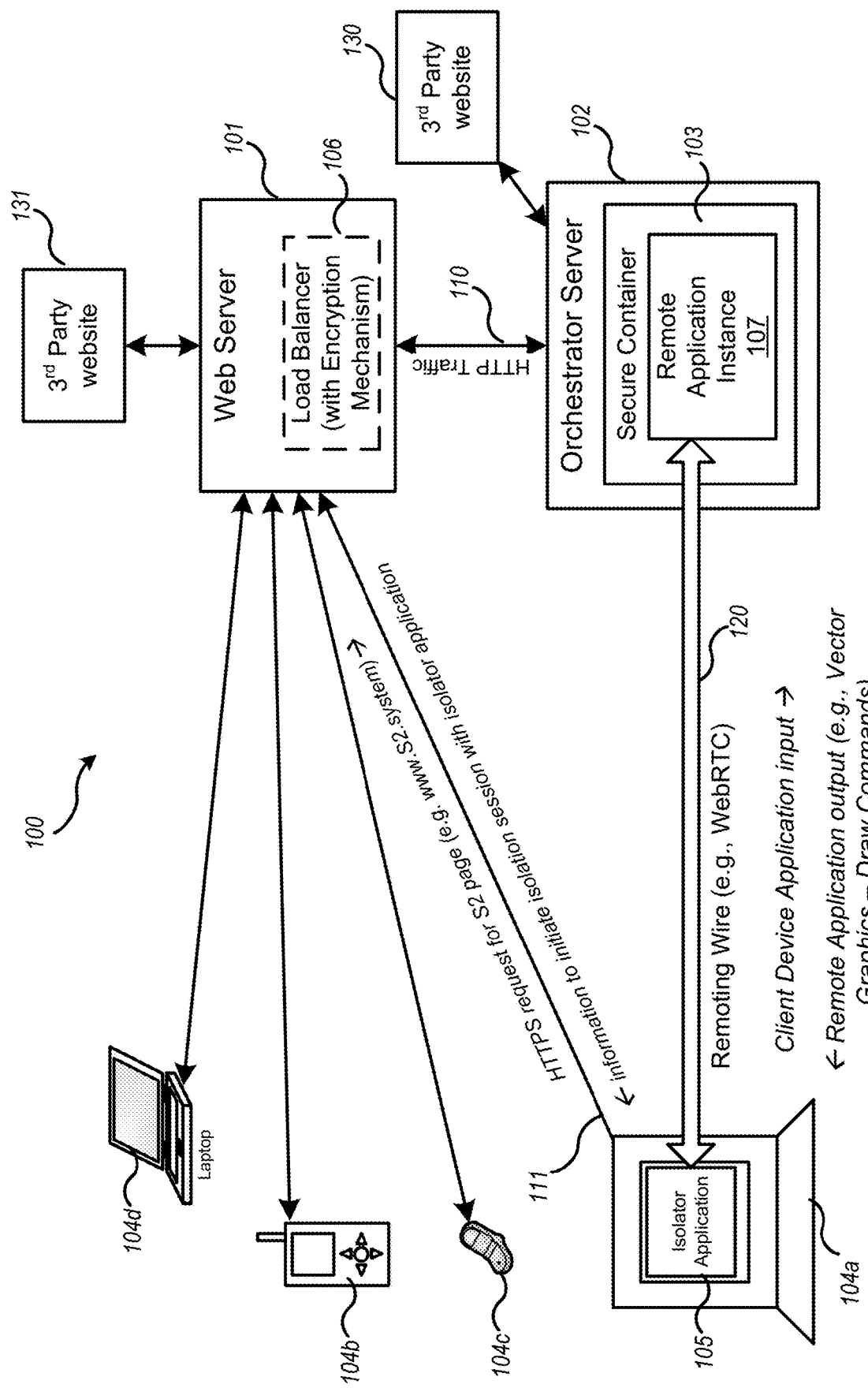
FIG. 1 is an example block diagram of an example secure computing environment for executing remoted applications in isolation using an example Adaptive Rendering Application Isolation System.

Embodiments described herein provide enhanced computer- and network-based methods, techniques, and systems for isolating applications, including web browser applications, to provide more secure environments and reduce unauthorized security vulnerabilities. Example embodiments provide an Adaptive Rendering Application Isolation System ("ARAIS"), which transparently and dynamically enables an existing application to run in an isolated execution environment yet be rendered locally by an isolator application having one or more cohesive application-isolation interfaces (for example, one or more of cohesive isolation programming interfaces that interface with the isolated execution environment, cohesive isolation user interfaces that facilitate communication between the user and the isolator application or the isolated application instance, or other cohesive application-isolation interfaces) minimizing the amount of data to be transferred and the latency caused by expensive computation and/or by overburdening available bandwidth while enabling functions that are typically unavailable during application isolation sessions. In particular, the ARAIS overcomes the problems and inefficiencies of prior isolation solutions by transferring output from the isolated execution environment to the isolator application running locally using draw commands or other higher level graphics primitives where possible instead of using pixels (or bitmaps/video) and by intercepting rendering on the isolated execution environment at a higher level in the graphics rendering pipeline than rasterization. Unlike pixel pushing systems, the ARAIS solution allows the use of less expensive execution (e.g., server) machines that do not require massive and expensive amounts of hardware (such as GPU farms) for rasterization and video encoding. In addition, the rendering data for transport can be optimized, encoded, compressed, packetized (and subsequently depacketized, decompressed, and decoded), etc. based upon proprietary or existing protocols and potentially dynamically based upon known or computed characteristics or rules. By avoiding the transportation of video (pixel pushing) and instead transferring rendering data at a "higher level," application output can be rendered identically on the isolated execution environment and on the local rendering environment at least because lossy compression is not required to reduce the bandwidth consumption to acceptable levels (unlike pixel pushing). Thus, rendering artifacts due, for example, to the use of video encoding or lossy compression can be eliminated or nearly eliminated.

In addition, the ARAIS provides the isolator application having the one or more cohesive application-isolation interfaces such that the isolator application facilitates providing the ARAIS indications of user actions that are otherwise lost during fully secure isolation sessions absent one or more cohesive application-isolation interfaces of the isolator application. The isolator application also facilitates executing functions that are otherwise unavailable during fully secure isolation sessions absent the one or more cohesive application-isolation interfaces of the isolator application. The one or more cohesive application-isolation interfaces of the isolator application also facilitate reducing the attack surface of the client computing device during fully secure isolation sessions that rely on web applications loaded into web browsers in client computing devices. Fully secure isolation sessions include isolation sessions that employ pixel pushing, draw commands, or other isolation technologies that do not rely on providing code or script to an application on a client computing device (for example, DOM mirroring is not fully secure). Thus, the ARAIS provides a transparent mechanism for equipping an application to be executed remotely and rendered locally while obtaining user actions and providing corresponding functions that are typically available only during non-isolation sessions; thus, protecting the isolator application and the client computing device executing the isolator application from malicious attacks while providing a user experience that is typically available only during non-isolation sessions (for example, the one or more cohesive application-isolation interfaces are seamlessly integrated as part of the preconfigured interfaces of the isolator application). Also, by equipping the isolator application with the one or more cohesive application-isolation interfaces, the ARAIS can handle compatibility issues such as differences between operating systems, versions of graphics and other libraries, etc. transparently to the user.

Although this disclosure typically refers to the isolated execution environment as a server computing system and the local rendering environment as a client computing system, in example ARAIS environments, the isolated execution environment may be any type of separate environment that allows the isolation-enabled application to be executed independently from where its output is ultimately rendered. Thus, the ARAIS also may be implemented as a peer-to-peer system. In addition, the server system may comprise one or more server systems or servers on a single computing system. For example, the isolated execution environment may be located on a separate computing system from the rendering device or may be located on the same device. In some cases, the isolation execution environment may be located on a separate computing system from the rendering device, and the separate computing system may be hosted entirely in one or more server computing devices that are located in a different premises as the rendering device (e.g., using cloud computing for the one or more server computing devices). In other cases, the isolation execution environment may be located on a separate computing system from the rendering device, and the separate computing system may be hosted completely or partially in one or more server computing devices located in the same premises as the rendering device (e.g., using primarily an on-premises server computing device for low latency, and using a cloud computing device when the on-premises server computing device experiences spikes in user activity). When using the same computing system, a separate instance of the application could be executed in a sandboxed (e.g., containerized or virtualized) environment and used to perform code execution and send rendering data to the instance of the application ultimately responsible for rendering output. Such an architecture allows the application code to be executed safely and separately from the process responsible for rendering output, for example, to an end user. In addition, separation of code execution from output rendering can lead to performance gains in some applications. For example, code execution could be executed on a machine with significantly higher network or CPU resources.

FIG. 1 is an example block diagram of an example secure computing environment for executing remoted applications in isolation using an example Adaptive Rendering Application Isolation System. The remote execution environment 100 comprises one or more client devices 104a—d (e.g., a laptop, mobile devices, desktops, or other systems, such as a virtual-reality or augmented/mixed reality headset), a web server 101, one or more third party websites 130 and 131 or data repositories from which requested content is retrieved, and one or more orchestrator servers 102. One or more of these servers can be part of each other and located physically remotely from the client devices 104a—d or can be located on the same physical machine as the client endpoint, or in any other architectural layout amenable to isolation (e.g., via sandboxing, containerization, or virtualization).

In overview, an application such as isolator application 105 executing (running) on a client device such as client device 104a requests instantiation of a remote application (for example, a web browser), typically using an HTTP/HTTPS request. Unlike generic web browsers or thin clients that may become isolation enabled by executing or loading code in one or more files provided responsive to such a request (for example, a web application, extension, plug-in, or others), the isolator application may be pre-configured ("out-of-the-box") to be isolation enabled and may have one or more cohesive application-isolation interfaces (for example, one or more of cohesive isolation programming interfaces that interface with the isolated execution environment, cohesive isolation user interfaces that facilitate communication between the user and the isolator application or the isolated application instance, or other cohesive application-isolation interfaces). In some cases, a file or object is provided merely to facilitate initiating a secure connection. To initiate a connection for an isolation session, this client request is redirected by a secure component of the web server 101, such as load balancer 106, to a local server, such as orchestration server 102, so that an isolated execution environment, such as secure container 103 with a remote application instance 107, can be configured specifically for that client device (or the local isolator application running on the client device). For example, the load balancer 106 may forward the request (e.g., the HTTP request) to the remote application instance 107. This configuration involves setting up a secure connection 120 (e.g., a real-time secure connection such as WebRTC, Hyper Text Transfer Protocol Secure (HTTPS) web sockets, or others) between the isolator application 105 and the secure container 103 with the remote application instance 107. In some scenarios, the connection is directly between the isolator application 105 and the remote application instance 107 within the secure container 103 to avoid additional latency. The secure container 103 may be implemented using any mechanism that provides security isolation, such as containerization offered by Docker Inc.'s "Docker" software platform, which provides operating-system-level virtualization across operating system platforms using a "light weight" virtualization solution (containers share an operating system kernel), or more traditional virtualization products (virtual machine implementations) offered for example by third parties.

In one example, the web server 101 securely communicates (e.g., via public/private key encryption) with the client device 104a. For instance, the load balancer 106 or other secure component provided, for example by AWS, AZURE, or another cloud based server infrastructure mechanism, may be used for securely communicating with the client device 104a. That way, if any of the isolated execution environments instantiated on behalf of client devices become compromised, the security of the web server 101 (such as its private key) is not exposed or compromised. In this example configuration, the load balancer 106 may translate client requests into HTTP and redirect the request to the orchestration server 102 via communication path 110 using HTTP. All communication between applications running on the client device 104a and the remote execution environment 100 is through the web server 101 using HTTP/HTTPS until the orchestration server 102 is able to establish a secure connection 120 between the isolator application 105 executing on the client device 104a and the corresponding remote application instance 107 within the secure container 103 (isolated execution environment). Thereafter, at least some remoting communication is performed via the secure connection 120 directly between the remote application instance 107 of the secure container 103 and the isolator application 105.

In one example ARAIS, the secure connection 120 is implemented using WebRTC. WebRTC allows both UDP/IP connections (which uses non-sequenced packets) and TCP/IP connections (which uses sequenced packets) and thus provides great flexibility. In addition, when using UDP, the secure connection 120 is typically faster. Other secure connections 120 can be used, including for example WebSockets, RDP, and proprietary or other standard known solutions. Implementations of the secure connection 120 may support peer-to-peer and unreliable communication channels (e.g., WebRTC) because, when applications can take full advantage of unreliable channels, average latency is typically reduced, especially under lossy network conditions where traditional ordered, reliable mechanisms (e.g., TCP) can suffer from large spikes due to head-of-line blocking.

A secure WebRTC connection can be set up by the client leveraging the secure connection (HTTPS) between the client computing system and web server 101. For example, in one possible configuration, as part of a page returned in response to the initial (redirect) request of an isolator application 105 running on the client device 104a (typically for the "home page"), a packet is returned by the web server 101 (via load balancer 106) containing a file "index.html" which includes initial logic and a key for setting up a WebSocket connection between the isolator application 105 and the orchestrator server 102. In some cases, the isolator application is pre-configured with the initial logic and is merely provided with the key and, optionally, identification information to facilitate setting up the secure connection. As parts of its standard execution loop, the isolator application 105 executes the logic in the initial file, which includes logic to start up the WebSocket connection. In some instances, the key for this connection is directly hardcoded into the initial html page returned. In other instances, a separate request is made by the isolator application 105 for the key as a result of executing the html and potentially JavaScript on the initial page. The purpose of this WebSocket connection is to facilitate setting up the secure WebRTC connection using the orchestrator server 102 as the "signal server" (known broker) for establishing a peer to peer connection between application 105 and the instantiated secure container 103 with the remote application instance 107 using the WebRTC negotiation protocol.

Meanwhile, after receiving the initial request for the home page, the orchestrator server 102 determines which application instance to instantiate in a secure container 103 and sets up a WebSocket connection to this instance (using for example another key). The orchestrator in its return of the initial page to the load balancer 106 can also include an identifier of this remote application instance so that the web server 101 can direct further requests to the correct secure container. Once both WebSocket connections have been made—to the isolator application 105 and to the secure container 103 in which the remote application instance 107 is running—then the orchestrator can act as the signal server. A negotiation can then take place between the isolator application 105 (for example, performed as a result of executing the logic on the initial or subsequent pages or as a result of obtaining the key or identification information associated with the secure container 103 or the remote application instance 107) and the secure container 103 for the WebRTC connection using the orchestrator server 102 as the broker. This negotiation generally succeeds (subject to servers going offline) because the orchestrator has working (WebSocket) connections to both parties.

Of note, this is but one technique for initiating a secure connection directly between the isolator application 105 and the secure container 103 with the remote application instance 107. Other techniques using other protocols and/or other types of connections can be similarly incorporated. For example, the isolator application may be pre-configured with the initial logic for initiating the secure connection and is merely provided with the key and, optionally, identification information to facilitate setting up or negotiating the secure connection.

In conjunction with configuring a corresponding remote application instance 107 within the secure container 103, the orchestration server 102 causes resources (for example, one or more updates to one or more locally stored graphics libraries, instructions to select one or more locally stored graphics libraries, or other resources) to be downloaded to the isolator application 105 running on the client device 104a via communications paths 110 and 111. Specifically, the resources for the isolator application 105 on the client device 104a are determined by the orchestrator server 102, sent via path 110 (using HTTP) to the load balancer 106 running on web server 101, which responds to the client request via path 111 using HTTPS. In one instance, these resources are sent as a result of executing logic pre-configured in the isolator application 105 based on information in the initial file, object, or other connection information that directs the isolator application 105 to request these resources or to provide an indication of the present status or version of one or more locally stored graphics libraries to facilitate the orchestrator server 102 determining whether one or more resources (for example, graphics libraries or graphics library updates) should be provided to the isolator application 105. In some scenarios, additional and separate computing systems are used to provide these resources, giving another step of indirection hence more security but potentially increasing latency. Another advantage to using separate servers for delivering these resources is to use different providers based upon the determined rendering level, determine interception techniques, or the like.

The orchestrator server 102 determined resources are then provided to the running isolator application 105 such that the isolator application 105 becomes up-to-date or otherwise synchronized with the remote application instance and can communicate with the remote application instance 107 running in the secure container 103 (the isolated execution environment). The initiation of an isolation session with the isolator application 105 is described further below with respect to FIG. 4. The initialization resources often include updates for one or more graphics libraries for rendering output within the isolator application 105 and connection information for forwarding user inputs to the remote application instance 107.

Once the secure connection 120 is established, the general flow of data between the isolator application 105 and the remote application instance 107 in the secure container 103 is that input received at the isolator application 105, such as keystrokes, mouse, and other cursor and input events, is detected by the one or more cohesive application-isolation interfaces of the isolator application 105 (for example, one or more cohesive isolation user interfaces) and forwarded to the remote application instance 107 via the secure connection 120 (for example, forwarded by one or more cohesive isolation programming interfaces). The remote application instance 107 then performs whatever execution is being requested, including, for example, downloading web pages or content via a third party website 130, applying stylesheet definitions (.css), and executing JavaScript for web browser applications, to generate rendering output. The rendering output is then packaged, including optional encoding, optimization, and enhancing, and forwarded via the secure connection 120 back to the isolator application 105 to be rendered on a display of the client device 104a using the remoting code cohesively pre-configured in the isolator application 105 (for example, one or more cohesive isolation programming interfaces and a cohesive remoting-enabled graphics engine that render the rendering output obtained by the one or more cohesive isolation programming interfaces). The client device 104a is therefore a rendering computing device, for example.

Because the one or more application-isolation interfaces are cohesively pre-configured in the isolator application 105, the one or more application-isolation interfaces facilitate detecting and notifying the remote application instance of local actions that a web application, extension, or plug-in provided to a local web browser application would be unable to detect. Also because the one or more application-isolation interfaces are cohesively pre-configured in the isolator application 105, the one or more application-isolation interfaces facilitate obtaining function resources (for example, files, objects, information, or other resources) from the remote application instance based on the detected local actions and performing corresponding local actions (for example, locally saving, printing, adding to a local clipboard buffer, or other actions) that a web application, extension, or plug-in provided to a local web browser application would be unable to perform. Accordingly, not only does the ARAIS prevent infection of the client computing device 104a by isolating the remote application instance, yet the ARAIS also achieves the practical application of providing a user experience that is typically available only during non-isolation sessions.

Multiple paths exist for directing the initial client communication to the web server 101 instead of directly to the target server associated with the initial client request. For example, using web browsing as an example use case for the isolator application 105, if the user tries to open the "www.cnn.com" page via the isolator application 105, then this request must be somehow redirected to web server 101 instead. In some example ARAIS environments, this redirection is done transparently to an end user. For example, a system administrator in an enterprise may push a domain policy that configures a proxy client on all of its employees' machines to point to the remote web server 101. The enterprise might also employ a gateway that automatically routes all traffic to the web server 101. As another example, the isolator application 105 may be pre-configured to route traffic to the web server 101 (either by default or upon a user selection of an isolation-session mode) based on the isolator application's internal proxy settings pointing to web server 101 or intercepting any URLs entered by a user of the client device 104a and reformatting them to point to the web server 101. As yet another example, code can be installed to intercept traffic at a network gateway and redirect it to the web server 101. Alternatively, this redirection can be performed manually. Different ones of these solutions may require different levels of configuration and result in different amounts of transparency to the end user.

Although the techniques of an Adaptive Rendering Application Isolation System are generally applicable to isolating any type of application, including web applications such as web browsers and more enterprise-friendly applications, one goal of the ARAIS is to provide an environment wherein the execution tasks of the application are performed in an isolated environment separate from where the output is rendered and the input is received. Further, transfer of the rendering output data from the remote application instance to the local isolator application may be performed using as high a level of rendering output as possible such that the fidelity of information is not lost and that rendering is performed on the local application with as small a data transmission size and as little latency as possible while providing a highly secure environment that minimizes security vulnerabilities. A higher level of graphics rendering data, such as using draw commands from a library such as SKIA or Cairo (which uses vector graphics), generally uses less bandwidth and a smaller size of transmitted data than transfer of lower level graphics, especially pixel transfers. As well, vector based rendering is more easily amenable to things such as scaling. Thus, it can be advantageous to transport vector commands (draw commands), or even commands translated to a lower level in the graphics pipeline (such as using OpenGL, WebGL, DirectX, Vulkan, or other GPU commands) which draws in points, lines, and vertices and loses information such as curve information. These assumptions vary with need. For example, vector based rendering cannot easily represent high quality pictures (such as those taken from a camera) or video, so typically these types of data are 'passed through' and rendered as is (not as a vector image).

Although the examples described herein often refer to a remotely isolated application based upon the (open source) Chromium browser engine and technology, the techniques described herein can also be used by other browser engines and with graphics libraries other than SKIA. For example, the techniques described herein may be applicable to any application that renders using the SKIA graphics library or that is based upon Chromium, including but not limited to Electron based applications, such as Slack, Microsoft Teams, or Skype, to name a few. In addition, the techniques described here may be applied to Android applications that render to SKIA, although modifications may be required to intercept SKIA commands. Also, similar techniques may be used with other vector graphics libraries such as Cairo (used by WebKit based browsers and web applications). In addition, when application source code is available it is possible to enhance the application more easily to accommodate ARAIS isolation mechanisms. Yet, even when source code is not available, isolation-enabled applications can still be made possible by hooking draw calls of existing applications to intercept the graphics to render output in an ARAIS compatible format which can be determined by running and analyzing applications (either manually, automatically or a mixture of using a computer and manual analysis) to determine their rendering pipeline. In a more difficult case (or where the tradeoffs indicate that pixel data is the best option, for example for performance or quality), pixel pushing can be resorted to. Further, ARAIS can employ an adaptive remoting scheme based upon a rules engine that incorporates potentially dynamic factors as described further below with respect to FIG. 7. So, for example, applications that use GDI can also be isolation-enabled by capturing and forwarding rendered output at the level of GDI calls using an open source version of GDI or using a compatible library (which can be compiled and run as well on the local application). The rules engine may determine the appropriate interception technique for intercepting draw commands based on an evaluation of one or more hierarchical rules against one or more characteristics of the remote application instance 107, one or more characteristics of the client device 104a, and/or one or more characteristics of the isolator application 105. One or more data objects may define the hierarchical rule(s) in a tabular format that defines relationships between (a) one or more appropriate interception techniques or available rendering libraries and (b) one or more characteristics of one or more remote applications, client devices, or isolator applications. The rules engine may employ one or more data objects (e.g., tables) that define locations at which different applications may be intercepted or may employ heuristics (for example, machine learning, artificial intelligence, or others) to dynamically determine the locations for interception (for example, different defined or discovered interception locations or methods may be employed for EXCEL, WORD, or other applications or versions of those applications).

Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures, and other support to implement an Adaptive Rendering Application Isolation System to provide a more secure environment for running applications while providing a user experience that is typically available only during non-isolation sessions. Other embodiments of the described techniques may be used for other purposes, including for enhancing performance of remotely executing applications. In the following description, numerous specific details are set forth, such as data formats and code sequences, etc., in order to provide a thorough understanding of the described techniques. The examples described also can be practiced without some of the specific details described herein, or with other specific details, such as changes with respect to the ordering of the logic, different logic, etc. Thus, the scope of the techniques, block descriptions, and/or functions described are not limited by the particular order, selection, or decomposition of aspects described with reference to any particular routine, module, component, and the like.

Figure 2:
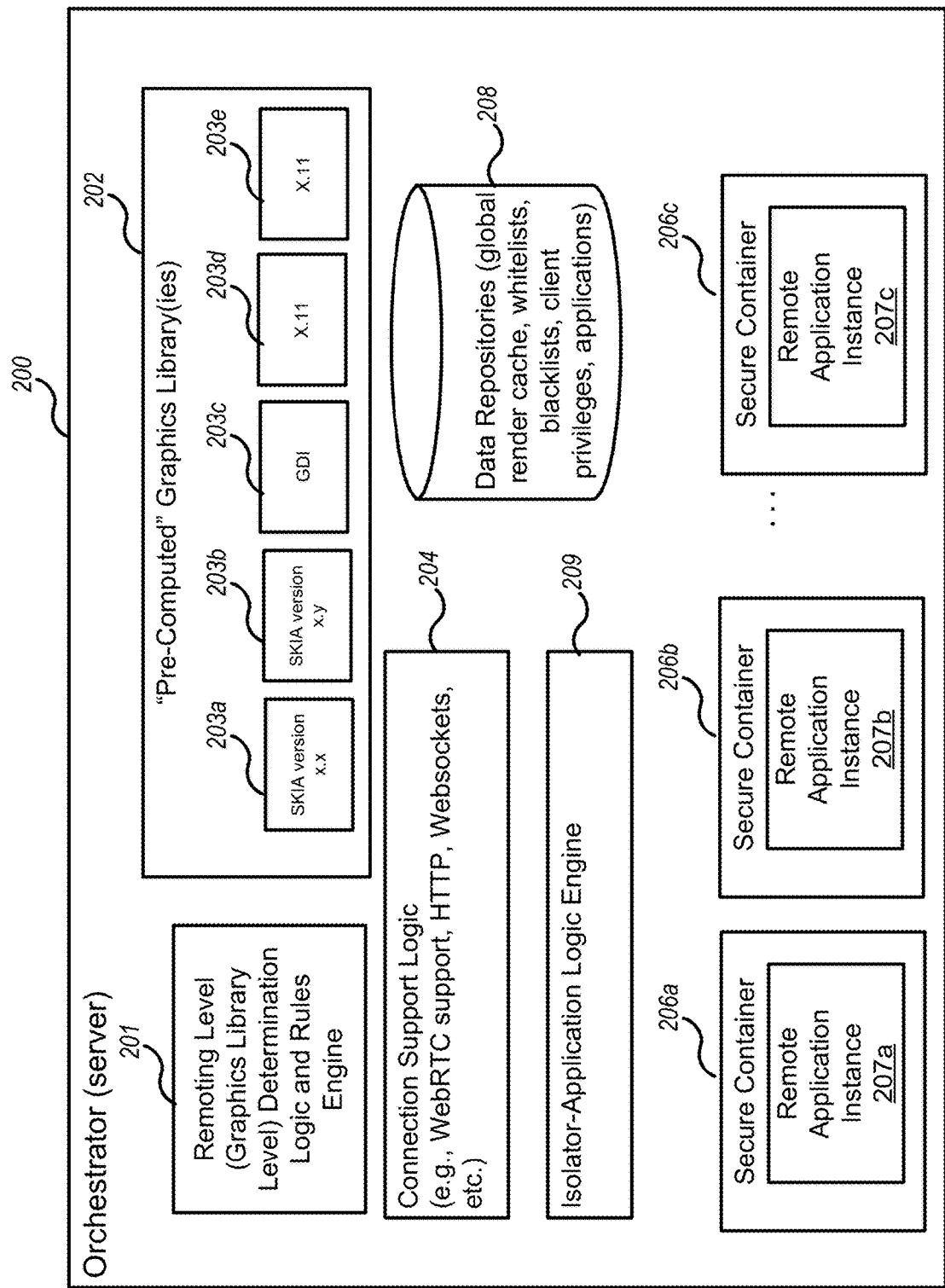
FIG. 2 is an example block diagram of components of an example orchestrator server computing system for performing application isolation in an example Adaptive Rendering Application Isolation System.

FIG. 2 is an example block diagram of components of an example orchestrator server computing system for performing application isolation in an example Adaptive Rendering Application Isolation System. The remoting orchestrator server 102 may take the form of the orchestrator server 200. In one example embodiment, an orchestrator server (such as the orchestrator server 200) includes one or more functional components/modules that work together to deliver remote-enabling technology to client applications. For example, an orchestrator server 200 may comprise remoting level determination logic and rules engine 201; pre-computed graphics libraries 202 or other rendering logic such as different versions of SKIA, GDI, X11, etc. (203a-e); connection support logic 204; data repositories (storage) 208 for objects such as a render cache, whitelists, blacklists, client privileges, and application information; and one or more secure containers running remote application instances.

The connection support logic 204 is responsible for making a secure connection (such as the secure connection 120) to each client application that is requesting a remote-enabled application (e.g., web browser) either explicitly or transparently and for communicating with the load balancer 106 of the web server 101 to initiate a remote-enabled application. The connection support logic may be implemented for any type of secure connection over a network/

Internet, including for example WebRTC, which provides peer-to-peer connectivity, and/or WebSockets, which uses TCP and provides client/server style connectivity. Other protocols can be similarly implemented.

The orchestrator 200 is also responsible for pre-computing one or more resources (for example, pre-computed graphics libraries 202, updates to locally stored rendering code, or other resources) for delivery to isolator applications that are pre-configured to be remote enabled. In some examples, one or more resources are generated offline during a building process in which a graphics library (or an update to a graphics library) is compiled, and the orchestrator 200 delivers the compiled library or library update to the client. In one example ARAIS, the "pre-computed" resources are pre-compiled to configuration files (for example, configuration files in formats such as JSON, INI, YAML, TOML, or other configuration-file formats). These pre-computed files contain the code or information that is used to update or configure parameters (for example, features enabled by the remote application instance corresponding to potential user inputs or soft user input controls provided by the one or more cohesive application-isolation interfaces of the isolator application, mapping of rendering commands output by the remotely isolated application instance to rendering commands used by the one or more cohesive application-isolation interfaces of the isolator application based on one or more characteristics of the client computing device or the user's preferences input to the isolator application, or other configuration information) of the client (local) isolator application to prepare the isolator application for an isolation session with the particular requested remotely isolated application. Libraries 202 can include other types of rendering code libraries other than what are shown in files 203a-e. For example, they can include code that renders pixels, video, WebGL, OpenGL, etc. The one or more resources are delivered to the local isolator application "on demand" so that the isolator application can utilize exactly the same version as what is being used to render on the isolation execution environment (the remote application) side or what is expected to be used by the isolator application to complete the rendering process of the output of the remote application instance. This insures compatibility between the isolation execution environment and the local rendering environment even between different versions of libraries or where the user has set particular preferences in the isolator application. For example, in C++, preprocessor defines are typically used to influence program behavior at build time, and the pre-compiled rendering code can be built with the same settings that would have been used on the server to ensure that the same code is executed during the rasterization process on the client computing device that would traditionally happen on the server or that the code executed on the client computing device maps to the code that would traditionally happen on the server in a predictable fashion. In effect, everything rendered on the client device may be rendered the same as on the execution environment or in a manner that predictably maps to the rendering on the execution environment. This is distinct from solutions such as RDP which do not guarantee that what is rendered on the local desktop is consistent with what is rendered (computed to be rendered) remotely. For example, if the remote server is using a different version of GDI than the client device, then the computed rendering output to be displayed on the client device may look unpredictably different than what was computed, which could lead to annoying behavior or even look like defects. Using the ARAIS techniques, a Chrome browser, for example, which uses the size of the font to compute layer information, will calculate a same or predictable result on the isolation execution environment as on the client device. Having different versions of pre-computed libraries, such as 203a and 203b, also allows the orchestrator 200 to accommodate different client computing systems and/or users without the application/browser having to concern itself with compatibility between versions or with mapping to client-selected libraries. Because the locator application is preconfigured to be remote enabled with the one or more cohesive application-isolation interfaces, the locator application is able to notify the orchestrator 200 of the configuration settings, libraries, or other parameters that will be utilized by the isolator application during the isolation session, thereby facilitating the orchestrator 200 implementing the same or mapped versions of those parameters to ensure a harmonized execution in both the execution and rendering environments.

In some scenarios it may be desirable that the rendering code in the execution environment of the remote application instance is different than the rendering code sent to the client. These scenarios also can be accommodated by the ARAIS techniques.

The remoting level determination logic and rules engine 201 is responsible for determining the logic, files, or other resources to forward to the client computing system to harmonize the isolator application. It is also responsible for determining the "level" of rendering interception and hence the characteristics of a corresponding remote application to be instantiated for intercepting rendering calls to forward rendering output at the determined level. As discussed further below with respect to FIGS. 4, 7, and 8, this determination may be based upon any one or more characteristics of the client device, the local isolator application, as well as the user, or other factors. Further, this determination may be made manually, automatically by the orchestrator, or a mixture of both. In some instances, it may include a rules engine which uses machine learning tools to determine the appropriate graphics level for interception and logic/files to forward to the client computing system to harmonize the isolator application.

Once a determination of appropriate rendering interception level is determined, the orchestrator 200 is responsible for instantiating and containerizing a remote application instance such as the remote application instances 207a-c in secure containers 206a-c. In one example ARAIS, each secure container 206a-c is a Docker instance (a secure container), which operates as a lightweight virtualization mechanism because it shares a single operating system kernel across all containers. In order to provide the desired isolation, there is at least a separate container and remote application instance for each local isolator application process of a single client. Thus, for example, a web browser with multiple tabs (or what resolves to a single application process) associated with a first client computing device will execute in container 206a, whereas a browser associated with a different client computing device or another running browser process in the same client will execute in container 206b. In other configurations, a separate container is instantiated for each tab as well to provide an even great level of security. One advantage to using a single secure container for all tabs of a web browser application, is that the user experience between tabs can be shared. Upon instantiating and creating a secure connection to the client computing system, a "cookie" or similar identifier or tag is used to identify the client-application process pair. This identifier is then used by the orchestrator 200 to identify the appropriate container when a new tab for an existing process, for example, is launched.

The orchestrator 200 uses data repositories 208 to store a variety of information. In a system that supports web browsers or other web applications (that request content using URLs), one such item is a rendering output cache that stores, for example, frequently visited web pages. This cache of pages can speed up the rendering process for all clients taking advantage of multiple client behaviors across usages. Pages that are visited more frequently can have their corresponding rendering output data (such as drawing command regions such as drawing command quads) cached for quick recall. In addition, the cache can be tailored to weight the storage of rendering output corresponding to particular web pages based upon certain characteristics like the importance of a user within an enterprise, frequency of use, or other factors. In addition to caching on a per orchestrator instance, each secure container may cache its own rendering output data using a local cache as described below with respect to FIGS. 3A and 3B.

In addition, the data repositories 208 may be used to store other information related to performance and/or security of the execution environments running in the secure containers 206a-c. For example, the data repositories 208 may store whitelists and/or blacklists of users, third party websites or content, privileges associated with client computing systems and/or users, and application information for isolator applications that are able to harmonized for an application-isolation session. Other information may also be stored.

The isolator-application logic engine 209 is responsible for cooperatively working with the one or more cohesive application-isolation interfaces of the isolator application (for example, one or more cohesive isolation programming interfaces) to provide a user experience that is typically available only during non-isolation sessions. The isolator-application logic engine 209 is responsible for detecting that the local application is an isolator application (as opposed to a generic web browser or thin client that must become remote-enabled by the orchestrator 200 providing remote-enabling files). The isolator-application logic engine 209 is also responsible for obtaining indications of local actions or values or other data associated with the local actions from the one or more cohesive application-isolation interfaces of the isolator application (for example, one or more cohesive isolation programming interfaces) and causing the orchestrator 200 to perform one or more corresponding actions that are typically unavailable for applications other than the isolator application (for example, thin clients, browsers having a web application, extension, or plug-in, or other applications), such as providing revised output or providing files or other information to the isolator application that cause the isolator action to perform one or more corresponding local actions (for example, locally saving, printing, adding to a local clipboard buffer, or other actions) that a web application, extension, or plug-in provided to a local web browser application would be unable to perform.

As shown in FIG. 2, the isolator-application logic engine 209 is positioned outside of the secure containers 206a-c to facilitate identifying and potentially filtering sensitive information from the client computing devices before it is passed to any of the secure containers 206a-c because the secure containers have the potential to become compromised by malicious attackers, as discussed further below regarding FIGS. 3A and 3B. In some cases, one or more portions or actions of the isolator-application logic engine 209 may be executed on one or more different computing devices, such as a client computing device 104a-d. For example, one or more portions of the isolator-application logic engine 209 may be cohesive to the isolator application by being preprogrammed in the isolator application 105. In some cases, as discussed further below regarding FIGS. 3A and 3B, one or more portions or actions of the isolator-application logic engine 209 may be executed in one or more of the secure containers 206a-c.

Figure 3B:
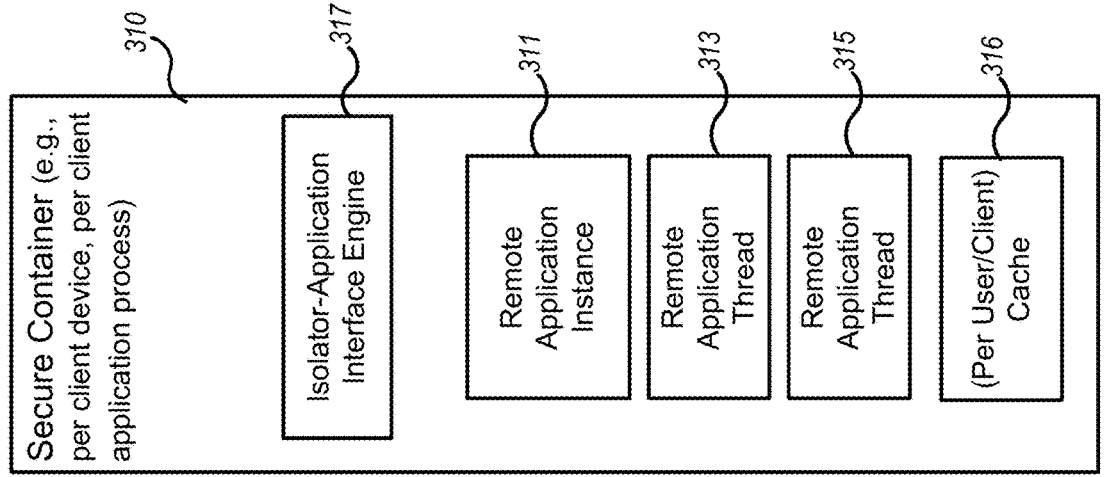
FIG. 3B is an example block diagram of an isolated remote application instance running in an example execution environment of an example Adaptive Rendering Application Isolation System.
Figure 3A:
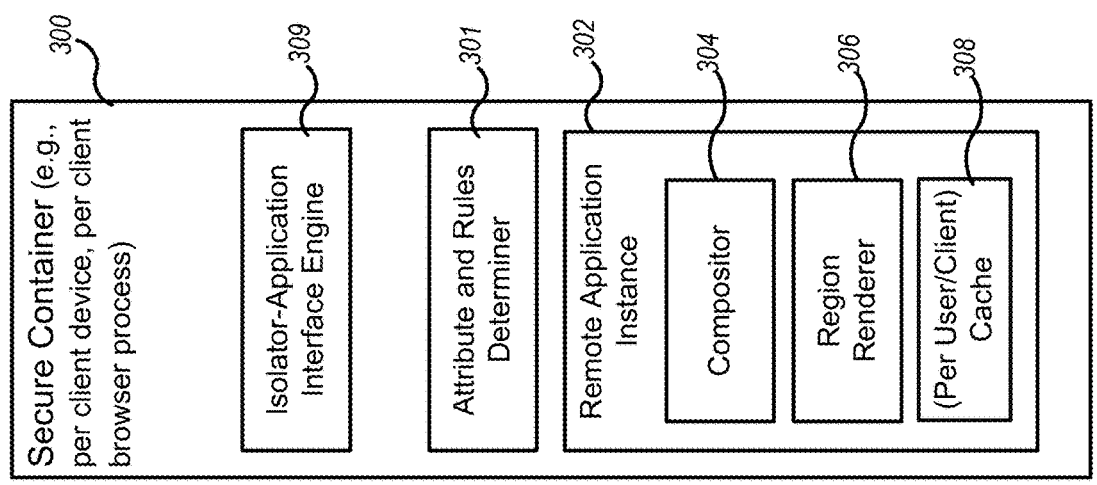
FIG. 3A is an example block diagram of an isolated remote browser instance running in an example execution environment of an example Adaptive Rendering Application Isolation System.

FIG. 3A is an example block diagram of an isolated remote browser instance running in an example execution environment of an example Adaptive Rendering Application Isolation System. As explained with respect to FIGS. 1 and 2, secure container 300 provides an isolated execution environment for a remote instance of a web browser (e.g., the remote application instance 107) providing outputs that are rendered by an isolator application running on a client computing system. Separating the execution actions of the web browser from the rendering allows the ARAIS to minimize vulnerabilities potentially caused by downloading web pages or content via a third party website, execution of code such as JavaScript (embedded or as separately provided as a downloaded code file) or applying stylesheet definitions (.css). Any malicious tinkering with the executable code in the remote browser instance is then restricted to affecting the secure container. Further, when the client isolator application exits, the secure container is removed so that any malware is not perpetuated by the orchestrator server. For non-web-based applications, separation of code execution provides similar benefits.

In an example ARAIS, secure container 300 contains an attribute and rules determiner 301 (module, engine, code logic, or the like), and a remote application instance 302 which may correspond to the intercepted request for a page by the client isolator application as explained with respect to FIG. 1. This instance runs in the isolation environment provided by the secure container 300 to restrict any malicious code or effects from the remote application instance 302 to that container. Thus, other client computing systems' remote instances are not infected by anything that may occur in remote application instance 302. The remote application instance 302 may contain one or more portions of rendering code, for example, compositor 304 and region renderer 306 (for example, quad renderer or a renderer associated with a region of the output wherein the region has a predefined or dynamically defined shape), for rendering the output generated by the executing code. These portions of rendering code constitute a rendering (or graphics) pipeline and often differ between different web browsers such as those built on Chromium (which currently employs the SKIA library) versus those built on WebKit (which currently employs the CAIRO graphics library). Thus, the compositor 304 and region renderer 306 represent placeholders for portions of code that are used in the remote browser's rendering pipeline. The portion of code representing the compositor is upstream from the portion of code representing the region renderer in the rendering pipeline (that is, the portion of code representing the region renderer is downstream from the portion of code representing the compositor). Which remote application instance 302 to instantiate in the secure container 300 is determined based upon the attribute and rules determiner 301. This determination is described further with respect to FIG. 4. In one example, when remoting Chromium based applications, an enhanced version of the Chromium browser is used. Because Chromium is open source, the rendering pipeline can be modified to accommodate the determined interception and remoting performed by ARAIS. Similar modifications can be made to any web-based application for which source code is available, although the logic and places for interception in the web-based application may vary and may be tuned for that application.

Figure 5:
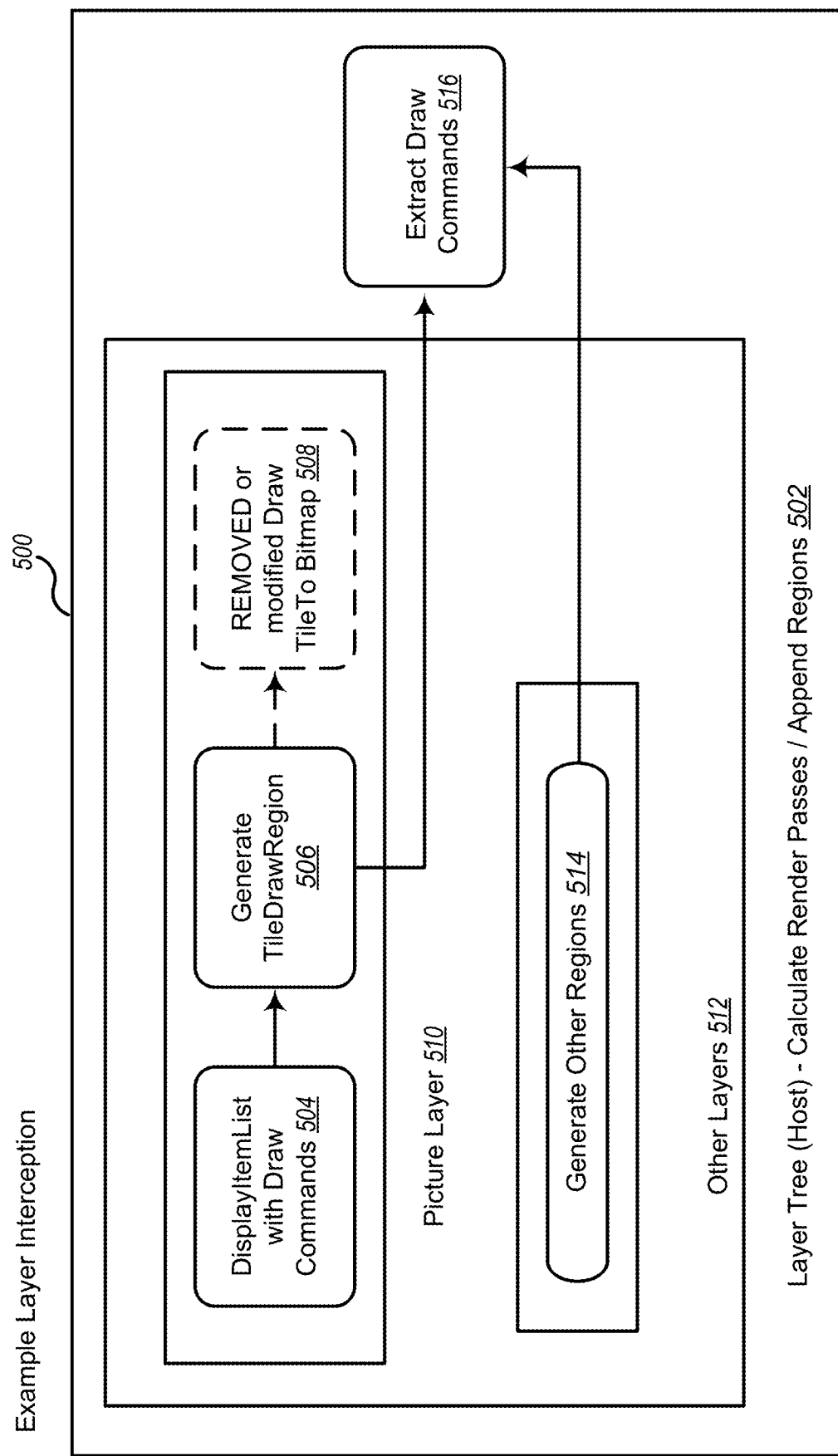
FIG. 5 is an example block diagram illustrating remote side code interception for adapting content in an isolated web browser application for delivery as draw commands to a corresponding rendering endpoint in an example Adaptive Rendering Application Isolation System.
Figure 6:
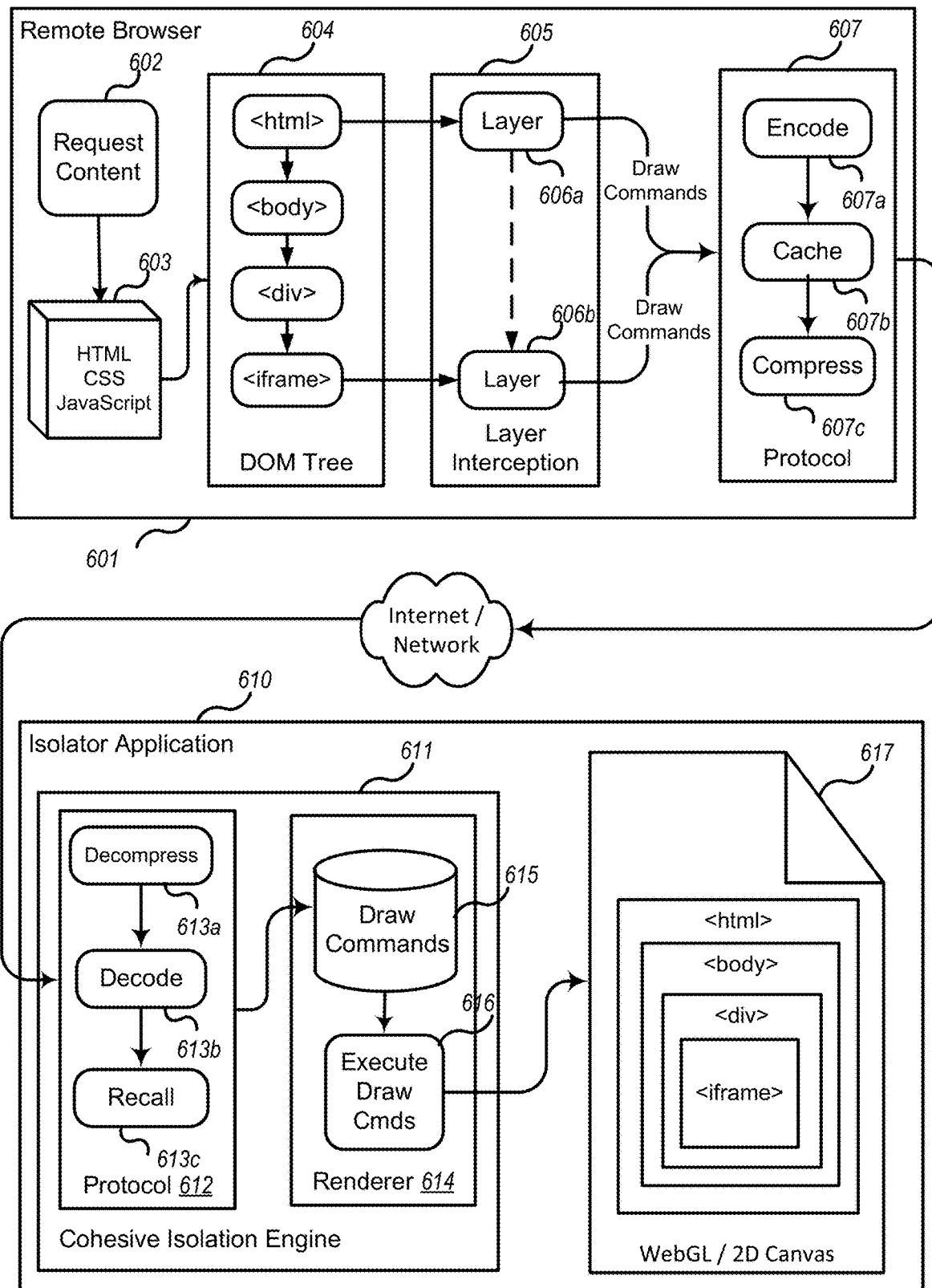
FIG. 6 is an example block diagram illustrating adapted web page data flow from an isolated web browser application to render a page on a corresponding rendering endpoint in an example Adaptive Rendering Application Isolation System.

For example, as described further with reference to FIGS. 5 and 6, in Chromium, the rendering output data may be captured before bitmaps are generated by the default Chromium rendering code. In one example ARAIS, the Chromium code is altered to capture the draw calls that relate to "tiles" that are being composited and would otherwise be rasterized (into pixels/bitmaps) and the draw calls for other regions (regions of outputs wherein the regions have pre-defined or dynamically defined shapes such as rectangles or others) (e.g., quads that are associated with or define rectangles) produced during compositing. These occur in response to "executing" the layers produced as a result of the compositing process (traversal of the DOM produces a layout tree which is traversed by the compositor to generate a layer tree and ultimately a display list) to generate regions (e.g., quads) to be painted and then rasterized. Interception alterations are made to the default rendering pipeline to extract draw commands that correspond to the portions of the page that would otherwise be rasterized. This type of interception results in a system that can forward packets of drawing commands (high level of graphics interception) instead of pixel pushing. Other configurations can yield other optimizations and advantages.

Secure container 300 also contains a cache 308, which can store for example draw commands on a per user (or per client browser) basis for frequently accessed content, the initial site visited (the home page), and other frequently visited sites. In addition, the remote application instance 302 may track resources that are cached on the corresponding client (local) isolator application, for example, by keeping copies in its own cache 308 or through other mechanisms.

In an example ARAIS, secure container 300 contains an isolator-application interface engine 309, which includes one or more portions or actions of the isolator-application logic engine 209 or causes one or more portions or actions of the isolator-application logic engine 209 to be executed in the secure container 300. This arrangement facilitates a new instantiation for the isolator-application interface engine 309 with each instantiation of a secure container and thereby facilitates instance-specific configuration of the isolator-application interface engine 309, with a tradeoff of the isolator-application interface engine 309 potentially being exposed to compromising code or actions in the secure container 300. Instance-specific configuration provides benefits such as facilitating simpler loading of rules specific to the user or the client computing device, as discussed further below regarding FIGS. 10-19. As shown in FIG. 3A, the isolator-application interface engine 309 executes independently of the remote application instance 302. In other cases, one or more portions of the isolator-application interface engine 309 are included in the remote application instance 302, either by pre-configuring or programming the remote browser application corresponding to the remote application instance 302 or by providing an extension or plug-in to the remote application instance 302. For example, the draw commands may cause the isolator application to render one or more layers to a cache (e.g., a resource cache), with one or more portions of the cache being rendered on a display of the client device and one or more other portions of the cache not being rendered until one or more subsequent events, such as a user input command (for example, a scroll event). Examples of resources that may be rendered to the resource cache include textures, fonts, shapes, curves, draw commands, predefined combinations thereof, or others, as is apparent from this paragraph and the above and below paragraphs of this disclosure. As is also apparent from this paragraph and the above and below paragraphs of this disclosure, the resource cache facilitates the isolated remote application instance providing the isolator application smaller amounts of data than the resources themselves, such as identifiers that correspond to respective resources in the resource cache.

FIG. 3B is an example block diagram of an isolated remote application instance running in an example execution environment of an example Adaptive Rendering Application Isolation System. Secure container 310 is similar to secure container 300, but contains one or more instances of remote application instances 311 depending upon the level of security between applications desired. In some cases, multiple remote application threads 313 and 315 of the remote application instance 311 run in the same secure container 310. In other cases, each remote application thread 313 and 315 is instantiated in its own secure container. The level of graphics interception and the various components of the graphics rendering pipelines are not shown as they could vary significantly from application to application. Techniques for such determination are described with reference to FIGS. 7 and 8. Secure container 310 also can contain a per user/per client cache 316 similar to that described for cache 308, but not specific to web based applications. Cache 316 may contain frequently used application resources for example. Isolator-application interface engine 317 is configured to operate in the same or similar manner as explained regarding the isolator-application interface engine 309 of FIG. 3A.

Figure 4:
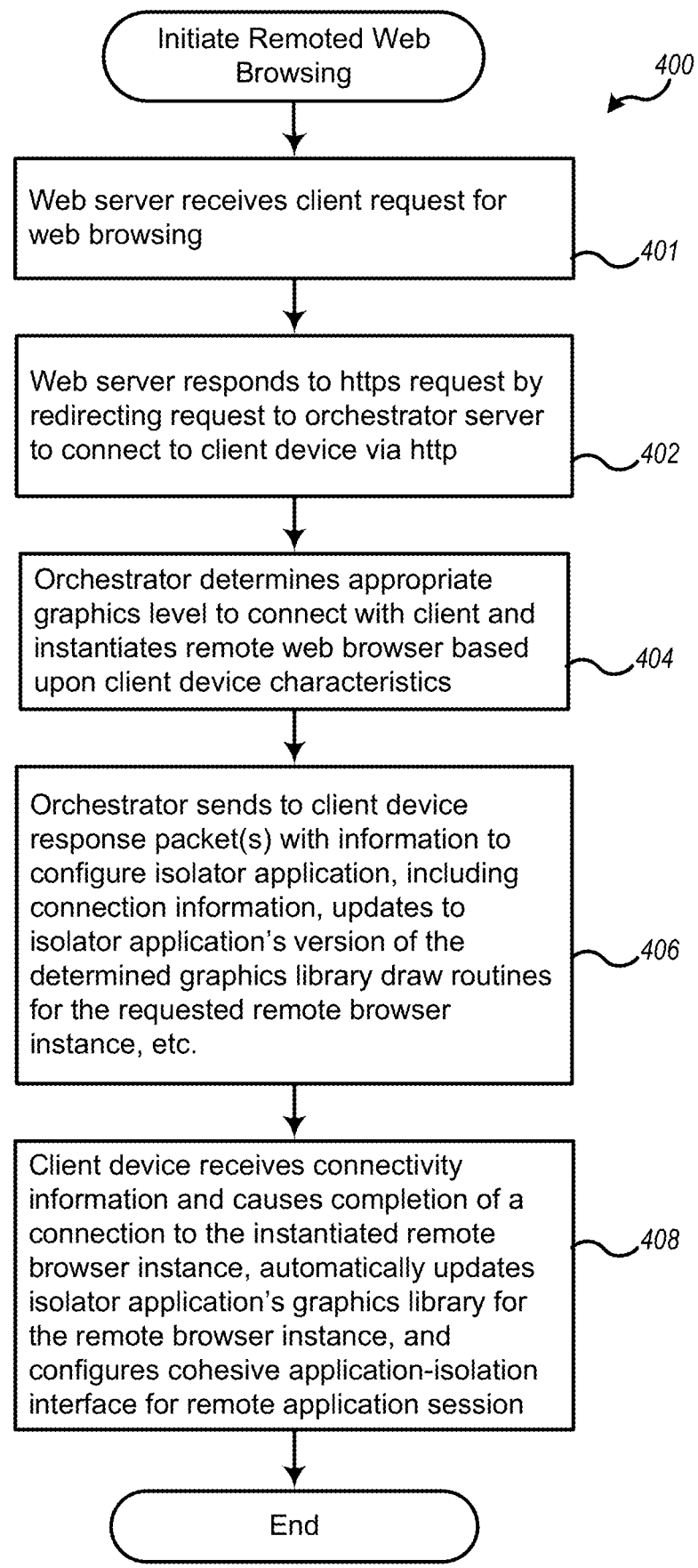
FIG. 4 is an example overview flow diagram of the logic for initiating an isolated remote web browser session using an example Adaptive Rendering Application Isolation System.

FIG. 4 is an example overview flow diagram of the logic for initiating an isolated remote web browser session using an example Adaptive Rendering Application Isolation System. In block 401, a web server (for example, Web Server 101) receives a client request for web browsing from a client computing device (for example, one of client devices 104a-104d). The request may be an HTTP/HTTPS request. The request may be initiated by the user visiting or logging into a particular web page that results in the client computing device transmitting or forwarding of the request to the web server, by initializing the isolator application 105 that transmits or forwards the request to the web server, or by selecting an isolation mode in a cohesive application-isolation interface of the isolator application 105 that transmits or forwards the request to the web server. For example, an administrator associated with the client computing device (also referred to as an endpoint) may configure settings associated with a network on which the client computing device resides to automatically redirect browsing requests to the web server. The request typically includes one or more of: a URL associated with a web page that the user intends to browse, an indicator of an operating system of the client computing device, an indicator that the isolator application is an isolator application instead of a type of generic browser or other application through which the user initiated the request, an indicator of a current status or state of one or more caches on the client computing device or content in the one or more caches (for example, a resource cache or others), an indicator (e.g., a cookie) that identifies whether the user or client computing device is associated with one or more browsing sessions contemporaneously executed on the web server or previously executed on the web server and now terminated, or an indicator of one or more portions of settings or configuration information of the client computing device, the isolator application on the client computing device, or the network in which the client computing device resides (for example, IT network administrator settings or configurations).

In block 402, the web server (such as Web Server 101), using load balancer 106, redirects the request (e.g., the HTTP/HTTPS request) to an orchestrator server (such as the orchestrator server 102) to respond to the client computing device's request for the web page. The redirect may include the load balancer 106 forward the request to the orchestrator server 102. As an example, if the request from the client device is sent using HTTPS, the load balancer 106 may convert the HTTPS request to an HTTP request when forwarding to the orchestrator server 102.

In block 404, the orchestrator server determines the appropriate graphics level to use for transporting rendering data to the client computing device (see, for example, FIG. 7) and instantiates a remote web browser application in a secure container (such as secure containers 206a-c) based upon one or more characteristics of the client computing device (for example, the client operating system, client isolator application version or configuration settings, network settings or configurations enforced by an IT network administrator for the network in which the client computing device resides, bandwidth of the connection with the client computing device, or others). The characteristics may be based on one or more portions of the request. For example, the orchestrator may determine a version of the client isolator application and may instantiate a remote web browser application that employs the same graphics engine type or version. As another example, the orchestrator may determine an operating system of the client computing device and may instantiate the container used to execute the remote web browser application based on the same operating system. Further examples include determining a graphics library type or version employed by the client isolator application or a state of a cached library on the client computing device and using these characteristics to instantiate the remote web browser application in the secure container. As is apparent from this paragraph and the above and below paragraphs of this disclosure, the local cached library may include various resources such as textures, fonts, shapes, curves, draw commands, predefined combinations thereof, or others. As is also apparent from this paragraph and the above and below paragraphs of this disclosure, the local cached library facilitates the isolated remote application instance providing the isolator application smaller amounts of data than the resources themselves, such as identifiers that correspond to respective resources in the local cached library. A local cached library or a resource cache may be reusable across different domains, isolated application instances, or applications or may be specific to a particular domain, isolated application instance, or application and unusable for different domains, isolated application instances, or applications. Local cached libraries and resource caches can be different in that resources are rendered to the resource caches (whether displayed or not), whereas commands to render the resources are stored in or identified by data stored in the local cached libraries. As is apparent from the disclosure in this paragraph and the above and below paragraphs, the teachings herein related to local cached libraries also disclose the same or similar teachings regarding resource caches, and the teachings herein related to resource caches also disclose the same or similar teachings regarding local cached libraries.

In block 406, the orchestrator sends to the client computing device via an existing connection (e.g., the established HTTP/HTTPS connection between the client computing device and the load balancer) one or more response packets based on the client request for the web page with one or more resources that are automatically employed by the one or more cohesive application-isolation interfaces of the isolator application to configure the client isolator application for the particular isolation session, as described elsewhere. The one or more resources typically include connection information (for example, a cookie), one or more updates for one or more graphics libraries, one or more indications of which one or more graphics libraries to employ, one or more indications of one or more features enabled or disabled for the remote application instance or the isolation session, one or more user interfaces employed by the isolated application, or other information.

For isolation sessions employing a client application other than the isolator application, four objects are typically provided: a JavaScript file, a rendering file such as a WebAssembly file (.wasm file), an HTML file, and a cookie. The JavaScript file typically is configured to interface with an application programming interface (API) of a client web browser application to cause the client web browser application to load and hook the rendering file into the event loop, is configured to intercept events from an event loop to listen for events associated with the client web browser application and invoke the draw handling code in the rendering file (for example, using callbacks from the browser's internal event loop), and is configured to initiate a secure connection (e.g., via WebRTC or other secure connection) from the client web browser application to the remote web browser application. The rendering (WebAssembly) file typically includes the draw handling code in a compiled instance of a graphics library of the remote web browser application. The compiled instance of the graphics library is typically configured to cause draw commands to be rendered in the same manner on the client web browser application as on the remote web browser application to ensure consistent rendering on the client web browser application and on the remote web browser application. The HTML file is typically configured to cause the client web browser application to generate a drawing canvas, which if it incorporates HTML5, may interface to one or more GPUs. The cookie typically includes connection information to facilitate persistent remote browsing sessions with intermittent terminations of the connection (for example, shutting down the client computing device or closing the client web browser application and reconnecting to the same remote browsing session).

In contrast, the isolator application is preconfigured to be isolation-session enabled and has one or more cohesive application-isolation interfaces that facilitate performing the actions that the four objects cause a client web browser to perform and also performing actions that such a web browser cannot perform during an isolation session, thereby providing a user experience that is typically available only during non-isolation sessions. For example, a web browser having loaded the four objects cannot notify the orchestrator of user actions other than user actions that are detected by a scripted event listener, such as click events, keystroke events, or others that are directed toward a displayed web page in the web browser. Accordingly, user actions that are undetectable by a scripted event listener (for example, actions directed toward a menu bar of the web browser) are not provided to the orchestrator.

As another example, a web browser having loaded the four objects cannot enable the user to copy content from a displayed web page during an isolation session because the content is only rendered at the client web browser application and, for the same reason, cannot save, print, create shortcuts, bookmark, or perform other actions that are typically available only during non-isolation sessions. Accordingly, the isolator application can, in cooperation with the orchestrator during an isolation session, execute functions that are typically available only during non-isolation sessions. Therefore, the isolator application having the one or more cohesive application-isolation interfaces facilitates reducing the complexity of the initialization process by reducing the amount of information and number of objects that must be provided by the orchestrator to initialize an isolation session while also improving the user experience to be the same as or similar to a user experience that is typically available only during non-isolation sessions.

In other examples, one or more portions of the one or more resources may be embodied in one or more C++ files or objects (for example, JavaScript, WebAssembly, HTML, or another programming language or file formats, such as JSON) that are provided to the client computing device to achieve the same or similar purposes. For example, WebAssembly files may instead be provided as "asm.js" files using different tools to compile the respective drawing libraries for running on the client side. The orchestrator typically determines the one or more resources based on one or more portions of the information evaluated or determined in one of the preceding blocks, such as block 404.

In block 408, the client computing device receives connectivity information and causes completion of a connection to the instantiated remote browser application (for example, the client may engage in a WebSocket exchange via the web server, including passing one or more private keys, to establish a WebRTC connection with the remote application instance), automatically updates one or more graphics libraries (optional), and automatically configures one or more portions of the one or more cohesive application-isolation interfaces to harmonize with the orchestrator or remote application instance (optional). The connectivity information, update information, or harmonizing configuration information is typically included in the one or more resources.

Before the one or more resources are provided to the client computing, the client isolator application is configured to rasterize visual output of the remote web browser application based on draw commands received from the remote web browser application without bitmap rasterizations of the draw commands. After the one or more resources are loaded in the client computing device, the isolator application connects to and harmonizes with the remote application instance. Accordingly, the user of the client computing device has a local browsing experience (low latency and low or zero artifacts) while the client computing device is completely isolated from malicious code associated with content loaded in the remote web browser application. In this manner, the process 400 provides the user experience benefits of DOM mirroring and the security benefits of pixel pushing, without the drawbacks of either of those approaches while also providing a user experience that is typically available only during non-isolation sessions without requiring the orchestrator to provide remote-enabling files.

FIG. 5 is an example block diagram illustrating remote side code interception for adapting content in an isolated web browser application for delivery as draw commands to a corresponding rendering endpoint in an example Adaptive Rendering Application Isolation System. Block 500 represents modules of code logic in the standard (unmodified) Chromium rendering process to show one way to intercept draw commands at a high level of interception in the graphics pipeline. Because Chromium is open source, the rendering pipeline can be modified to accommodate the determined interception and remoting performed by ARAIS. Similar modifications can be made to any web-based application for which source code is available, although the logic and places for interception in the web-based application may vary and may be tuned for that application.

According to its standard behavior, Chromium separates a web page into a set of layers, that are traversed to eventually generate what is drawn on the screen. It uses SKIA as its software rendering library, which contains commands for vector based drawing. These layers are generally parts of the page that are separate—transformations on one do not typically effect the other. Title bars, scroll bar regions, sidebars, etc. are examples of this. Multiple types of layers exist, such as picture layer 510 and other layers 512. The remote application instance 107 may include a layout engine that generates the picture layer 510. During compositing, each layer is processed by its own logic and thus may perform different behaviors and is responsible for producing regions (e.g., "quads") which are rectangles ultimately rendered to a display device (using for example a GPU and associate graphics library like OpenGL) in a final position relative to the page. For example, the execution of the picture layer, typically eventually produces "tiles", "tile regions", or "tile quads" (e.g., 256×256 rectangles, a type of quad) which are rasterized to bitmaps for easy display and reuse. The picture layer generally produces the most rendering code based upon vector draw commands. As another example, other layer 512 may be a video layer which is responsible for rendering and decoding video and produces video regions (e.g., quads). Another layer 512 may be a background, which is a solid color layer than results in rendering a solid color region (e.g., a solid color quad). The regions (e.g., quads) corresponding to the layers are typically rendered in "stacking" or z-order. The standard behavior of Chromium's picture layer processing code loses the drawing command information that resulted in the bitmaps to be rendered, once the bitmaps are created. As explained, remoting bitmaps can increase the size of data forwarded to a client application as well as cause additional latency.

Example ARAIS configurations of the remote Chromium web browser intercept the layer tree produced by Chromium in one or more locations so as to capture many or all of the draw commands used to render the page. At least some of these commands are then potentially optimized, enhanced, encoded, augmented, compressed, etc. and forwarded using a secure connection (e.g., the secure connection 120) to the local isolator application. One or more of these commands may not be forwarded to the local isolator application. Typically, it is desirable that the remote web browser performs as much of the rendering work as possible for laying out the page (e.g., determining where text, images, etc. are located on the page—this includes, but is not limited to, measuring the area a block of text takes based on its font and text size). The browser's rendering path may be completed all the way up to the point where the web page is going to be drawn on the screen. This avoids incompatibility issues because the page is just drawn on the local isolator application based on the layout as calculated by the remote browser.

In the configuration illustrated in FIG. 5, block 500 shows interception at the picture layer 510 and generally for other regions 514 (e.g., other quads) to extract the draw commands at the generation of TileDrawRegion 506 (e.g., TileDrawQuad) and in the generation of other regions 514 into extracted draw commands 516. In some cases, one or more of the other regions 514 correspond to a cursor. In other cases, the isolated application instance is devoid of any cursors. The draw commands that are intercepted in block 506 may be those that correspond to tiles being rendered. It may not include all of the draw commands listed in the DisplayItemList with Draw Commands 504. Some of the draw commands that are not intercepted may include a right click menu command. Other configurations may instead extract and forward the entire or a different portion of the DisplayItemList to the client browser. In one example configuration, the code for Draw Tile to Bitmap 508 is eliminated or altered to avoid the sending of the TileRegions (e.g., TileQuads) to the GPU for rasterization. This alternative may result in memory and speed optimizations and thus lower latency in responding to the client. Another configuration may intercept one or all of the draw commands and ignore one or more of the draw commands when determining which draw command(s) to send to the client device for rendering.

The intercepted draw commands may have corresponding position information that is captured. For instance, the compositor may intercept one or more draw commands corresponding to one or more tiles being rendered, and the region renderer may capture position information for the one or more tiles that correspond to these draw command(s). The position information may be modified upon a determination that the position of the tile(s) that are to be rendered will be in a different position than indicated in the draw command(s). As another example, the region renderer may intercept one or more draw commands corresponding to one or more regions to be rendered, and the region renderer may capture position information for the one or more regions that correspond to these draw command(s). The position information may be modified upon a determination that the position of the region(s) that are to be rendered will be in a different position than indicated in the draw command(s).

In Chromium, interception can occur in a variety of ways, for example, by hooking messages called between the layers and, for example, by modifying code (such as when LayerTreeHost calls CalculateRender Passes and in the AppendRegions (e.g., AppendQuads) code for each layer 502). Interceptions can also be made at other points in the code, in one or more portions or without preventing the rasterization of tiles to bitmaps. For example, instead of extracting the draw commands during the compositing process, they could instead be extracted prior to compositing and the work to perform compositing done on the client side. This would result in less compute time for the remote browser, but would require compilation of more of the rendering pipeline code to be preconfigured in the isolator application or placed into a (WebAssembly) file delivered to the client side isolator application to enhance the isolator application's rendering capabilities for isolation sessions. Additional optimizations may be made to the modified rendering pipeline described for Chromium. For example, the layers produced by Chromium could be divided into smaller portions, and extracting draw commands corresponding to only the portions that are currently visible.

Similar techniques to those described also may be used with other web browsers. For example Safari's browsing engine uses the WebKit renderer which makes calls to the Cairo vector rendering library. These drawing calls could be intercepted in a similar manner to that shown in FIG. 5.

FIG. 6 is an example block diagram illustrating adapted web page data flow from an isolated web browser application to render a page on a corresponding rendering endpoint in an example Adaptive Rendering Application Isolation System. As shown and discussed with respect to FIG. 1, remote browser 601 is connected to and communicates with local client isolator application 610 over a secure connection (such as secure connection 120). After the local isolator application 610 has connected to the remote application instance based on the one or more resources received from the orchestrator server (e.g., server 102), for example, in the form of a cookie, then input to the client device, such as such as keystrokes, mouse and other cursor and input events, can be captured by the one or more cohesive isolation user interfaces that, along with the one or more cohesive isolation programming interfaces, are preconfigured in the isolator application 610 prior to initiating the isolation session with the original request (for example, the HTTP request of block 401 of FIG. 4). The receipt of such event information (e.g., key value, mouse position, etc.) is then forwarded by the one or more cohesive isolation programming interfaces to the remote browser 601 across the secure connection. The remote browser 601 then performs whatever actions are necessary based upon the received input and renders output data.

Additionally, the remote browser 601 could also look for other relevant input events when it is aware of the structure of the page, for example, by having access to the DOM tree. In this case, the remote browser 601 could hook into code right before button input is processed. For example, the remote browser 601 could perform specialized actions upon receiving notification that the submit button (on a form) is depressed and provide a before-processing hook or an after-processing hook as desired.

The blocks of FIG. 6 illustrate how the process of rendering output by the remote browser 601 includes modifying and transmitting back to the local isolator application 610 draw command information and corresponding position information to be handled by the cohesive isolation engine 611 that is preconfigured in the isolator application 610 prior to initiating the isolation session with the original request (for example, the HTTP request of block 401 of FIG. 4). The cohesive isolation engine 611 may be similar to a browser engine such as Chromium except that the cohesive isolation engine 611 is preconfigured (e.g., "out-of-the-box", prior to initiating the isolation session) to extract remotely acquired draw commands from incoming messages and render corresponding graphics via renderer 614. In some cases, the output of the remote browser 601 is rendered to a canvas, such as the WebGL canvas 617. The WebGL canvas 617 may be preconfigured in the isolator application 610 or may be provided to the local isolator application 610 when it is being harmonized by the web server. HTML5 canvases have the added benefit of being able to incorporate GPU acceleration.

Specifically, in block 602, while executing a page, a request for content is made by the remote browser 601. This content is typically received, for example by a third party content provider (e.g., based upon a URL) such as third party website 130 in the form of HTML, CSS, or Javascript 603. The remote browser 601, in block 604 builds the DOM tree for the received content through its normal processing and produces a series of layers 606a-b. In one example remote browser 601, the layer code for layers 606a-b is intercepted, as described above with respect to FIG. 5, to extract draw commands for what is to be rendered based upon the content and potentially the current viewport (what is currently visible). These draw commands correspond to the regions (e.g., quads) that would normally be rasterized and sent as bitmaps to the local isolator application 610 if one were to use pixel pushing technology. The remote browser 601 then potentially encodes the rendering output (the draw commands for regions such as quads to be rendered) in block 607a, caches desired encoded rendering output in block 607b, and compresses the encoded output in block 607c. This encoding, caching, and/or compressing can be performed according to a protocol 607 to be used to transport the rendered output across the secure connection.

In some example remote browsers 601, this protocol is proprietary. Other example remote browsers 601 use known remoting marshalling and unmarshalling procedures and known ways to encode, optimize, and/or compress data. For example, one remote browser 601 uses Google Protocol Buffers to apply compression to the draw commands and uses gzip or other similar compression technique to minimize the size of the data being transmitted. Each draw command is embedded in a message that contains the minimal amount of data needed to replicate that draw command on the local isolator application 610. For example, images and fonts are only transferred once and stored in a cache identified by an identifier on both the remote and local computing systems. Thereafter, use of the font/image resource will be transmitted using only the identifier, and then recalled from the local isolator application's cache later. Identifying images and other content that is reused early in the remoting process allows for optimal compression and caching of content. Alternatively, images and other content may be transmitted to the local isolator application 610 in their original requested/downloaded form.

The corresponding protocol 612 on the local isolator application 610 is also either a proprietary protocol or uses known remoting marshalling and unmarshalling procedures and known ways to decode, decompress, and/or recall data such as in blocks 613a-c. Specifically, a cache (for example, a resource cache or a local cached library) on the local isolator application 610 (not shown) stores resources, such as images, textures, fonts, shapes, curves, draw commands, predefined combinations thereof, or others, that are reusable. Once the local isolator application 610 receives an identifier in one of the decode and decompressed (and depacketized) messages, it can retrieve the corresponding cached item from its cache.

While a web page is loading, additional caching can occur. For example, items not immediately visible on the page on the local client that would be visible if the content is scrolled can be cached ahead of time to reduce latency when scrolling the page. This is possible because draw commands are sent for an entire layer (or multiple portions of a layer when the layer is subdivided), which is more than what is just viewable using current viewport settings. Other information can also be cached. In addition, scroll bars may be locally simulated on the local isolator application 610 to reduce perceived latency by modifying the unpacketized (and decoded/decompressed) draw commands 615 received by the rendering code in the local isolator application 610 to additionally draw the scrollbars with them. The local isolation-application's renderer 614 then executes the modified draw commands 616 using the isolator application's preconfigured rendering code to render composited draw commands 616 to the WebGL or other canvas 617. Further, because the remote browser in the described configuration has access to all of the draw commands, it can inject additional commands or modify existing commands in the draw command sequence. Other configurations may modify the draw commands in other manners.

The techniques described with respect to FIG. 6 may also be incorporated in remoting applications that are not web browser based. For example, proprietary protocols can also be constructed to handle draw calls at the highest-level rendering library available for libraries other than SKIA to optimize bandwidth. If an application, for example used GDI then instead of sending the pixels that GDI produces, the GDI commands could be packetized and transmitted in a smaller amount of data.

Figure 7:
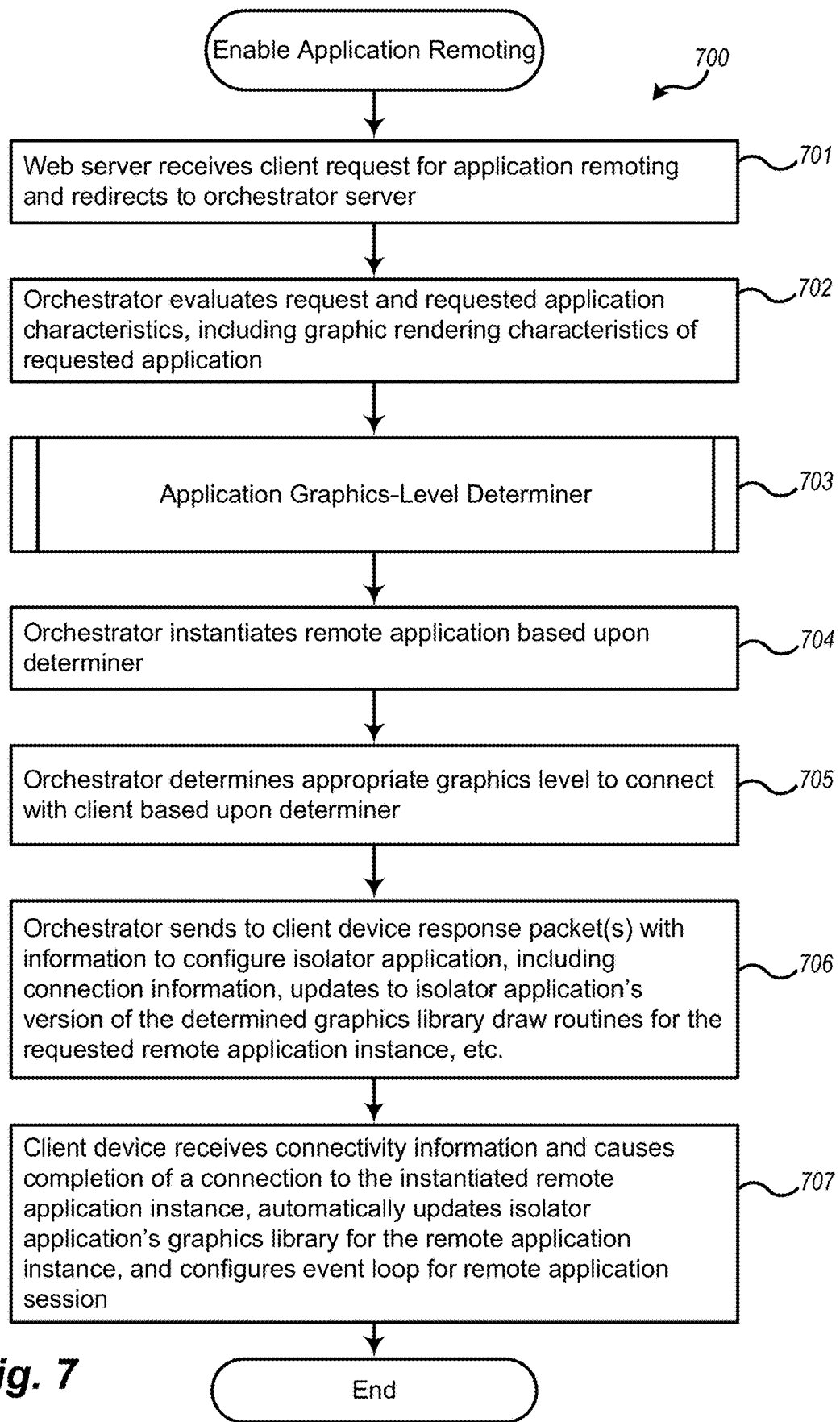
FIG. 7 is an example flow diagram of example logic for remote-enabling an isolated application using an example Adaptive Rendering Application Isolation System.

FIG. 7 is an example flow diagram of an example logic provided by an example Adaptive Rendering Application Isolation System to determine a level of data transfers and injection techniques for an application to be isolation-ready. This logic may be employed for all applications and not just web-based applications.

In block 701, a web server (for example, web server 101) receives a client request for application remoting from a client computing device (for example, one of client devices 104a-104d). The request typically includes one or more of the same or similar indicators as described regarding block 401 of process 400, including one or more of an indicator of an application or application type that the user intends to remotely use or an indicator of the isolator application or version of the isolator application through which the user initiated the request. Also in block 701, the client request is redirected to an orchestrator server (such as orchestrating server 102) to respond to the client computing device's request for application remoting. The redirection is typically performed in the same or similar manner as described regarding block 402 of process 400.

In block 702, the orchestrator evaluates characteristics of the request and characteristics of the requested application. The request may include one or more characteristic indications, such as the identity of the isolator application or a version of the isolator application that the client computing device intends to use to display the local rendering, the operating system of the client computing device, or one or more graphics engines or libraries included in or cached by the client computing device or the local isolator application. The request may also identify the application or application type that the user intends to remote. The application characteristics may include one or more indications, such as the identity of one or more applications or application versions available for the requested application or application type, one or more graphics engines or libraries included in each of those applications or application versions, whether those applications or application versions (or their graphics engines or libraries) are open source, or whether alternative graphics engines or libraries are compatible with those applications or versions or can be mapped to the graphics engines or libraries of those applications or versions. In some cases, the requested application may have previously been remoted by the ARAIS or may have been manually evaluated, and a data object (for example, a table) may include indicators of one or more of the application characteristics.

In other cases, the requested application may not have been previously remoted by the ARAIS, and, optionally, the request may include an executable file to install the application or may include an indicator of a location from which the ARAIS may retrieve the application, such as a URL. In those cases, the evaluation of the application characteristics can be performed in real-time. For example, the application may be installed in the remote environment, and a rules engine may execute rules to inspect the application files, APIs, or source or object code (for example, machine learning tools can crawl the accessible code or libraries, implementing guess-and-check attempts to hook into one or more portions of the files or code, recognizing file or code module names, or implementing other inspection techniques) to dynamically discover application characteristics. The determined characteristics may then be stored for future use by the ARAIS. If application characteristics are unavailable or unsuccessfully determined, default characteristics may be used until the application is manually inspected and the discovered characteristics used to overwrite the default characteristics. For example, if the graphics library or engine of the requested application is not accessible in real time, an equivalent or lower-level graphics library or engine may instead be used (either the highest-level engine or library accessible for the application or, if that is not accessible, an operating system level library or engine).

Figure 8:
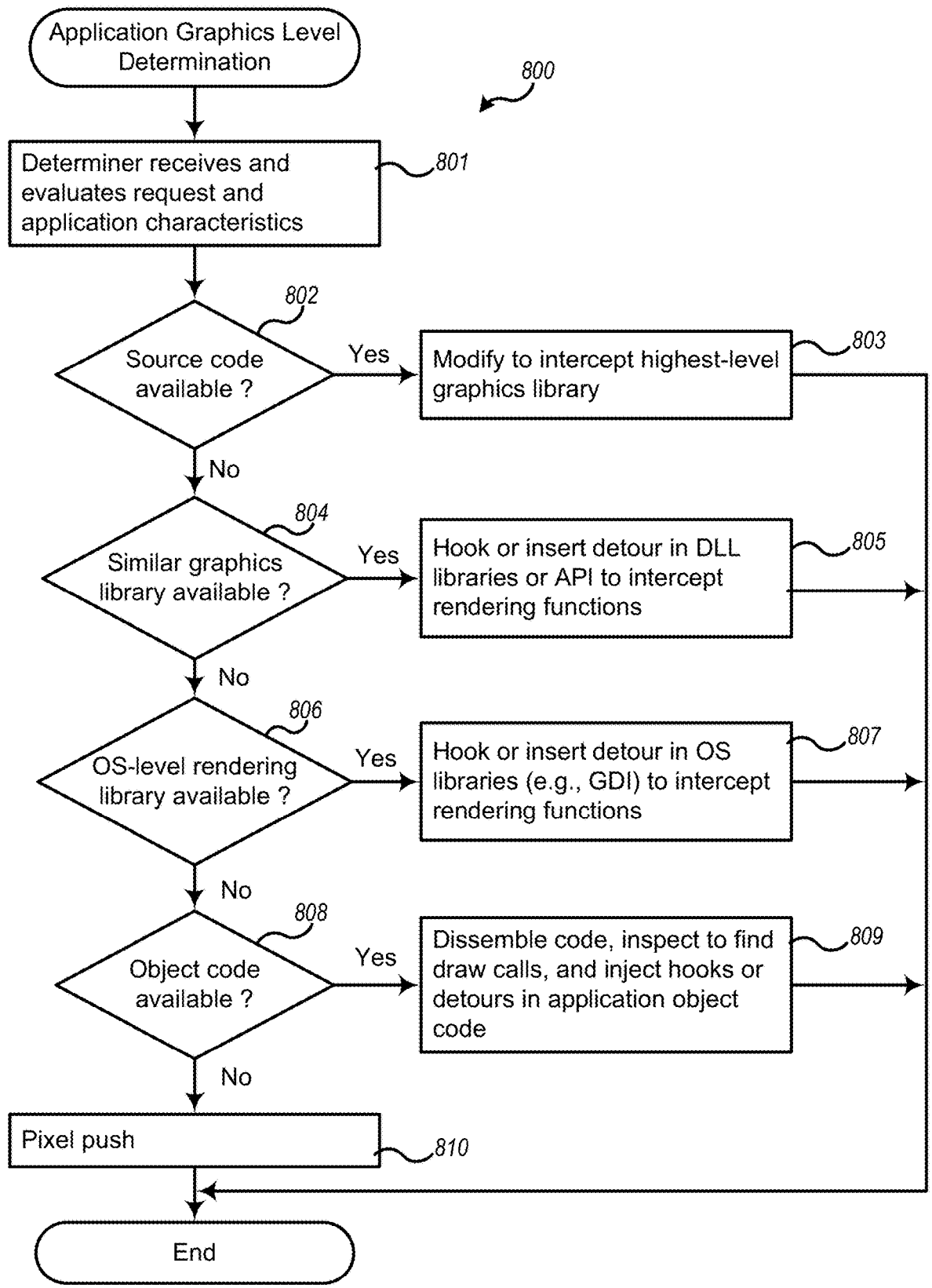
FIG. 8 is an example flow diagram of example logic provided by an example Adaptive Rendering Application Isolation System to determine a level of data transfers and injection techniques for an application to be isolation-ready.

In block 703, logic flows to the application graphics-level determiner to determine the appropriate graphics level to connect with client, as further described with regard to FIG. 8 because different applications may have different characteristics. For example, applications based on Chromium (for example, a Chrome browser application or Electron applications) or applications that employ SKIA libraries (for example, Chromium applications, Electron applications, or Android applications) typically have source code available (they are open source) with similar rendering architectures, whereas enterprise applications may have different rendering architectures (for example, Adobe Air applications use Flash for rendering, Adobe Acrobat uses a proprietary vector library for rendering, and Microsoft Office and Others use GDI for rendering). Accordingly, the mechanisms used to intercept calls and which files to generate and provide to configure the client application for application remoting may vary from application to application.

Generally, the highest-level rendering library within an application may be identified, accessed, and modified to include hooks or detours that facilitate intercepting draw commands and corresponding position information associated with that library. Examples of high-level graphics libraries include SKIA, CAIRO, and GDI, which are used by applications with Chromium, Mozilla, WebKit, or other engines. Within high-level graphics libraries, libraries based on vector-commands (for example, SKIA) are preferred over libraries based on commands that lose vector information (for example, GDI) because employing the vector libraries are less likely to result in intercepting rendering commands that involve pixel information, generally use less bandwidth, and generally cause less latency issues.

In block 704, the orchestrator instantiates a remote application in a secure container (such as secure container 103) based upon one or more portions of the request. One or more portions of block 704 are typically performed in the same or similar manner as described regarding block 404 of process 400. Before or when instantiating the remote application, actions are taken to obtain render commands (e.g., draw commands) and corresponding position information to facilitate providing such information to the client computing device based on the determinations of the application graphics-level determiner. One or more files, engines, or code modules are typically injected into or replace one or more portions of one or more files associated with the remote application to facilitate the determined manner of interception. For example, for open source engines or libraries, the code is typically injected into those engines or libraries as determined in block 703 to facilitate interception of the highest-level draw commands.

In block 705, the orchestrator determines the appropriate graphics level to connect with the client based on the determinations made by the application graphics-level determiner in block 703. One or more portions of block 705 are typically performed in the same or similar manner as described regarding block 404 and 405 of process 400. Typically, the highest-level appropriate library determined in block 703 is compiled (for example, as a WebAssembly file or asm.js file) for use in updating the isolator application's graphics library for rendering the intercepted commands (on the client side) unless pixel pushing is the only option. In some cases, where the graphics commands (for example, draw commands) in the highest-level appropriate library have been mapped to another library, the other library may be compiled for use in rendering the intercepted commands. For example, the remoted application, its graphics engine, or its graphics library may not be compatible with the local rendering environment (for example, the client computing device or the application or application type through which the user initiated the request) while the other library is compatible; the intercepted commands may be translated to the mapped commands in the other library (one to one, one to many, many to one, or many to many mapping); the other library may be compiled; and the mapped commands may be provided to the client computing device for use with the other compiled library. In some cases, the client computing device may already have the appropriate library files, and an update to the appropriate library files may be compiled or an indicator of which graphics libraries to employ is provided to the isolator application.

In block 706, the orchestrator sends to the client computing device one or more response packets with one or more resources. These resources are automatically uploaded on the client computing device to configure the client isolator application to connect for the present isolation session and, optionally, configure one or more portions of the one or more cohesive application-isolation interfaces of the isolator application for the present isolation session. One or more portions of block 706 are typically performed in the same or similar manner as described regarding block 406 of process 400. As with block 406 of process 400, the one or more resources may include connection information (for example, a cookie), one or more graphics libraries or updates to one or more graphics libraries, bitmaps that can be cached on the client computing device to facilitate rendering output from the remote application instance by sending identifiers that are logically associated with those bitmaps, sequences of draw commands (for example, stored procedures) utilized by the remote application, or configuration information that facilitates harmonizing one or more portions of the one or more cohesive application-isolation interfaces of the isolation application with the remote application instance.

In block 707, the client computing device receives connectivity information and causes completion of a connection to the instantiated remote application, automatically updates one or more graphics libraries, and configures one or more portions of the one or more cohesive application-isolation interfaces. One or more portions of block 707 are typically performed in the same or similar manner as described regarding block 408 of process 400. Blocks 705-707 may vary based on one or more of the client characteristics, such as the types of connections that the client computing device supports. The architecture described in FIG. 1 can be applied directly to Electron applications, for example.

After the one or more resources are loaded in the client computing device, the client isolator application is configured to connect to the remote application instance, harmonize one or more cohesive isolation user interfaces that facilitate utilizing one or more features or functions provided by the remote application instance, and harmonize one or more cohesive isolation programming interfaces to provide user-action indications to the remote application instance (or one or more server-side isolator-application engines, such as isolator-application logic engine 209 of FIG. 2 or isolator-application interface engines 309, 317 of FIGS. 3A and 3B) and to obtain corresponding application-action indicators from the remote application instance (or one or more server-side isolator-application engines, such as isolator-application logic engine 209 of FIG. 2 or isolator-application interface engines 309, 317 of FIGS. 3A and 3B). Before the one or more resources are loaded in the client computing device, the isolator application is preconfigured to render visual output of the remote application instance based on draw commands received from the remote application instance without receiving bitmap rasterizations of the draw commands. Accordingly, the user of the client computing device has a local application experience (low latency and low or zero artifacts) while the client computing device is completely isolated from malicious code associated with content loaded in the remote application instance and functions that are typically unavailable during isolation sessions are available to the user. In this manner, the process 700 provides the experience benefits of DOM mirroring and the security benefits of pixel pushing, without the drawbacks of either of those approaches and with the user experience of a non-isolation session. Moreover, the ARAIS can dynamically remote applications. The logic then ends.

FIG. 8 is an example flow diagram of an example logic provided by an example Adaptive Rendering Application Isolation System to determine a graphics level of data transmission and integration techniques for an application to be isolation-ready. In block 801, an application graphics level determiner (for example, the remoting level determination logic and rules engine 201 or attribute and rules determiner 301) receives and evaluates characteristics of a client computing device's request (transparently or explicitly initiated) to remote an application and also receives characteristics of the requested remote application. The receipt and evaluation of the characteristics is typically performed in the same or similar manner as described regarding blocks 701 and 702 of process 700. In an embodiment, the rules engine evaluates multiple candidate graphics levels for intercepting draw commands based on an evaluation of one or more rules against one or more characteristics of the remote application instance, one or more characteristics of the client device and/or one or more characteristics of the isolator application; determines a highest-level rendering library available in the candidate graphics levels based on the rule(s) and the one or more evaluated characteristics; and determines which one of multiple interception techniques for intercepting draw commands based on the determined highest-level rendering library. The one or more rules may define a logical hierarchy for determining the highest performing interception technique of multiple candidate interception techniques. Example candidate interception techniques include (1) modifying source code of the remote application instance to intercept vector draw commands; (2) placing hooks or detours in a graphics library of the remote application instance to intercept application rendering functions; (3) placing hooks or detours in an operating-system-level rendering library to intercept operating system rendering functions; and (4) intercepting pixel information. The highest performing interception technique may be the one that causes the client device to display output of the remote application instance at a higher resolution and/or consume less computational resources of the orchestrator server than the other available interception techniques. For example, based on the evaluated characteristics of the request or the remote application, a manner of intercepting graphics information is determined to provide the highest level of interception based on the outcomes of decision blocks 802, 804, 806, and 808. One reason for attempting to intercept at the highest level of graphics is to allow the native application code on the client side to perform the details of the rendering yet transmit the lowest amount of data across the wire. This also typically results in less latency.

In block 802, the logic determines whether the source code of the remote application is available and, if so, continues to block 803; otherwise, the logic continues to block 804. In some examples, the remote application is open source or publicly available by other means. In other examples, at least a portion of the source code has been available through other mechanisms, such as a licensing agreement or an API.

In block 803, the graphics engines or libraries can be directly inspected or modified, and the highest-level graphics library of the remote application is modified to intercept and output called draw commands and corresponding position information to facilitate providing (forwarding, transmitting, sending, etc.) those draw commands to the client computing device. For example, draw commands for the application's highest-level library can be intercepted when executing the remote application instance, and the remote application can be modified to prevent rasterization of pixels to reduce expensive computations while still obtaining position information for the intercepted draw commands.

In block 804, the logic determines whether the graphics libraries of the remote application are unavailable yet one or more graphics libraries that are similar to one or more of the graphics libraries of the remote application are available and, if so, continues to block 805; otherwise, the logic continues to block 806. For example, a graphics library of the remote application may not be available, yet an open-source graphics library that is similar to the unavailable graphics library may be available. In some cases this assessment can be performed manually, yet in other it can be performed automatically by the computer, or a combination of manual and automated search for similar libraries can be performed.

In block 805, hooks or detours are placed in the remote application's dynamic link library (DLL) or other shared library files to intercept the remote application instance's rendering functions. In some cases, an open-source or custom-built equivalent engine or library can be implemented and used based on the intercepted rendering functions to facilitate intercepting draw commands and corresponding position information.

In block 806, the logic determines whether an operating-system-level rendering library is available (such as those used to remote desktop applications) and, if so, continues to block 807; otherwise, the logic continues to block 808. In some cases, an OS-level rendering library is always available. In other cases, the logic may determine that the OS-level rendering library is unavailable for the remote application based on its characteristics, such as output type, or based on the client characteristics, such as the client computing device having an operating system with rendering libraries that have not been mapped to the rendering libraries of the remote OS.

In block 807, hooks or detours are placed in one or more OS libraries (for example, a GDI library) or emulated OS libraries (for example, libgdiplus) to facilitate intercepting rendering functions. In some cases, an open-source or custom-built equivalent engine or library can be implemented and used based on the intercepted rendering functions to facilitate intercepting draw commands and corresponding position information.

In block 808, the logic determines whether object code for the remote application is available and, if so, continues to block 809; otherwise, the logic continues to block 810. In some cases, the application object code can be dissembled and inspected (manually, automatically, or both) to find draw calls in the dissembled object code.

In block 809, the dissembled object code is inspected in the same or similar manner as discussed with regard to block 702 of process 700. Hooks or detours can be injected in the application object code to facilitate intercepting draw commands and corresponding position information.

Finally, when no other options are available, in block 810, pixel pushing is implemented. For web based applications like SKIA, a renderer's compositor is essentially using the GPU to draw rectangular areas of the remote application output (e.g., all compositing layers, positioned relative to the viewport according to a layer tree's transform hierarchy) into a single bitmap, and the bitmap is captured as pixel information that can be passed to the client computing device. For other applications, for example those that use hardware rendering, transmitting the pixels may be the only option. The logic then ends.

Although the decision blocks are shown as being in a serial logic flow, they can be executed in parallel. In some cases, the logic evaluates the effectiveness of the action blocks 803, 805, 807, 809, and 810 that correspond to the positively satisfied decision blocks based on one or more of the client characteristics or remote application characteristics. The logic may execute rules or thresholds to evaluate performance data measured for the client computing device or the remote application for each of the evaluated action blocks to determine the effectiveness of the corresponding techniques and to determine an appropriate level for rendering interception.

For example, the determiner may determine that, based on the client computing device's operating system, local rendering environment, physical characteristics, or connection characteristics (e.g., bandwidth), one of the evaluated action blocks may provide superior results to one or more other evaluated action blocks. Some of the considerations that the logic evaluates to select one of the available blocks include pros and cons of each of the evaluated action blocks and their associated techniques. For example, intercepting the highest-level graphics library by inspection and modification of available source code is typically the ideal technique because of the benefits explained throughout this disclosure, without the drawbacks associated with and described for the other techniques. Breaking down an application's high-level drawing library and extracting the draw calls from the deconstructed library is unconventional, not well known, and not routine, as evidenced at least by the lack of competing products currently in the market using this technique. Transmission and/or compression of vector draw commands is also unconventional, not well known, and not routine.

Intercepting draw commands by hooking a process or otherwise using injection or detour techniques has a benefit of not requiring modification of source code of the remote application. However, these techniques can be challenging to maintain without compromising security. Hooks are typically made at the application level (for example, hooking drawRect in SKIA) and involve creating an external shared library (for example, .so file), forcibly loading the code into the executable of the remote application, and then rewriting the remote application's compiled call to the hooked call, and redirecting it to code that facilitates intercepting the call. The hooks will periodically break as the remote application is updated by the author or provider of the remote application. Injection of code involves rewriting compiled assembly (typically function calls) to redirect to another location, and the assembly is rewritten after loading, making it difficult to verify that all paths result in proper remote application behavior. Tools typically used to catch security flaws (for example, linters or static analyzers) cannot be easily run at the assembly level because this technique overwrites compiled code, and these tools typically run on source code, not overwritten assembly code. This leaves the potential for any modification to introduce a crash or a potential exploit.

Intercepting and providing intermediate render commands (for example, underlying OpenGL, WebGL, DirectX, Vulkan, or other render commands), rather than the highest-level draw commands within the remote application, has a benefit of being at a higher level than pixels and facilitates improved compression relative to pixels. However, intermediate render commands are at a lower level than vector rendering and, thus, will lose some information. For example, curves are lost because they are typically translated into a series of vertices and combined with compiled shaders to draw the curves. The compiled shaders and vertices are larger in data size than the original curves. Moreover, images need to be decompressed and put into a specific format that is consumable by the GPU, losing original information and compression.

Intercepting and providing operating-system level calls also do not require modifying source code of the remote application. However, because calls at this level are at a lower level than the highest-level draw commands within the remote application, some information is lost. This results in compressing images, damaged or dirty rectangles, and viewports of individual layers. For example, GDI often works with pixel data, and using SKIA to draw to a surface with GDI results in a loss of the SKIA vector information, which eliminates lossless scaling and requires more data to transmit the intercepted rendering command. Moreover, GDI is an optimization only on platforms available under the mark WINDOWS, unlike intercepted vector draw commands, which can be platform agnostic.

Pixel pushing is the lowest level of each of these options and requires the most amount of data to be transmitted across the wire.

Based on one or more of the client characteristics, it may be determined that one of the evaluated action blocks provides an experience to the user that most closely matches the native client environment, results in faster rendering on the client computing device, transmits less information across the wire to render a given remote application output (for example, pixel pushing requires sending more information than draw commands, even with advanced video and tiling compression because draw commands have a smaller footprint), or has lower latency (time due to computation or transmission of a given amount of data at a given bandwidth). An example of reducing computational latency is employing high-level draw commands over pixel pushing because this avoids video decoding and algorithms used for video smoothing (for example, jitter buffers), which in turn reduces client-side computations and facilitates less time consumption by the client computing device to display the remote application instance output.

Based on one or more of the remote application characteristics, it may be determined that one of the evaluated action blocks provides performance improvements on the server side, as compared to one or more of the other evaluated action blocks. For example, block 803 facilitates leveraging existing code (for example, code that provides the standard rendering process in the engine of the remote application, such as Chromium). Block 803 also facilitates compiling using rendering technology for the web (for example, WebAssembly or JavaScript). Hooking in at different levels in block 805 facilitates evaluating tradeoffs for different purposes, such as evaluating render commands, determining library level, and the like. Enterprise applications may use many frameworks (for example, ws widgets, Windows Presentation Foundation (WPF), or others), which may require hooking into rendering code at a lower level, which may require more computational resources than other techniques. Some applications record a screen and do not necessarily invoke a graphics library at all, leaving block 810 as the only appropriate option. Accordingly, the user's experience can be optimized based on characteristics of the remote application and the client computing device while providing increased levels of security.

The hooking of interception code described in the logic of flow diagram 800 can be performed by a variety of possible known mechanisms, such as by callback mechanisms that take advantage of known or discovered architectures and attributes of the remote application; hooking known or discovered application programming interface ("API"); object code injection that replaces portions of the local application's executable code with a different portion of executable code; extending the remote application using known plug-in or extension mechanisms; dynamically linking in shared libraries; and the like. Each of these solutions may have advantages and disadvantages based upon how easy it is to integrate into the application to be remote-enabled. For example, injecting code typically involves rewriting compiled code to redirect function calls to another location (where alternative code sequence is defined).

In an embodiment, the orchestrator server 102 evaluates one or more characteristics of one or more of the remote application instance 107 and/or a data channel connecting the client device 104a and the orchestrator server 102 (e.g., the secure connection 120), and determines, based on the evaluation of the characteristic(s), whether providing to the client device 104a (e.g., the isolator application 105) one or more draw commands associated with one or more portions of the current page being rendered facilitates higher performance than providing pixel information associated with the one or more portions of the current page being rendered. If providing pixel information would facilitate higher performance, then the orchestrator server 102 will provide the pixel information. If providing the draw command(s) would facilitate higher performance, then the orchestrator server 102 will provide the draw command(s). The evaluation may include determining a data bandwidth and/or a latency and comparing the data bandwidth and/or the latency to one or more thresholds to determine whether providing the draw command(s) or the pixel information facilitates higher performance.

Figure 9:
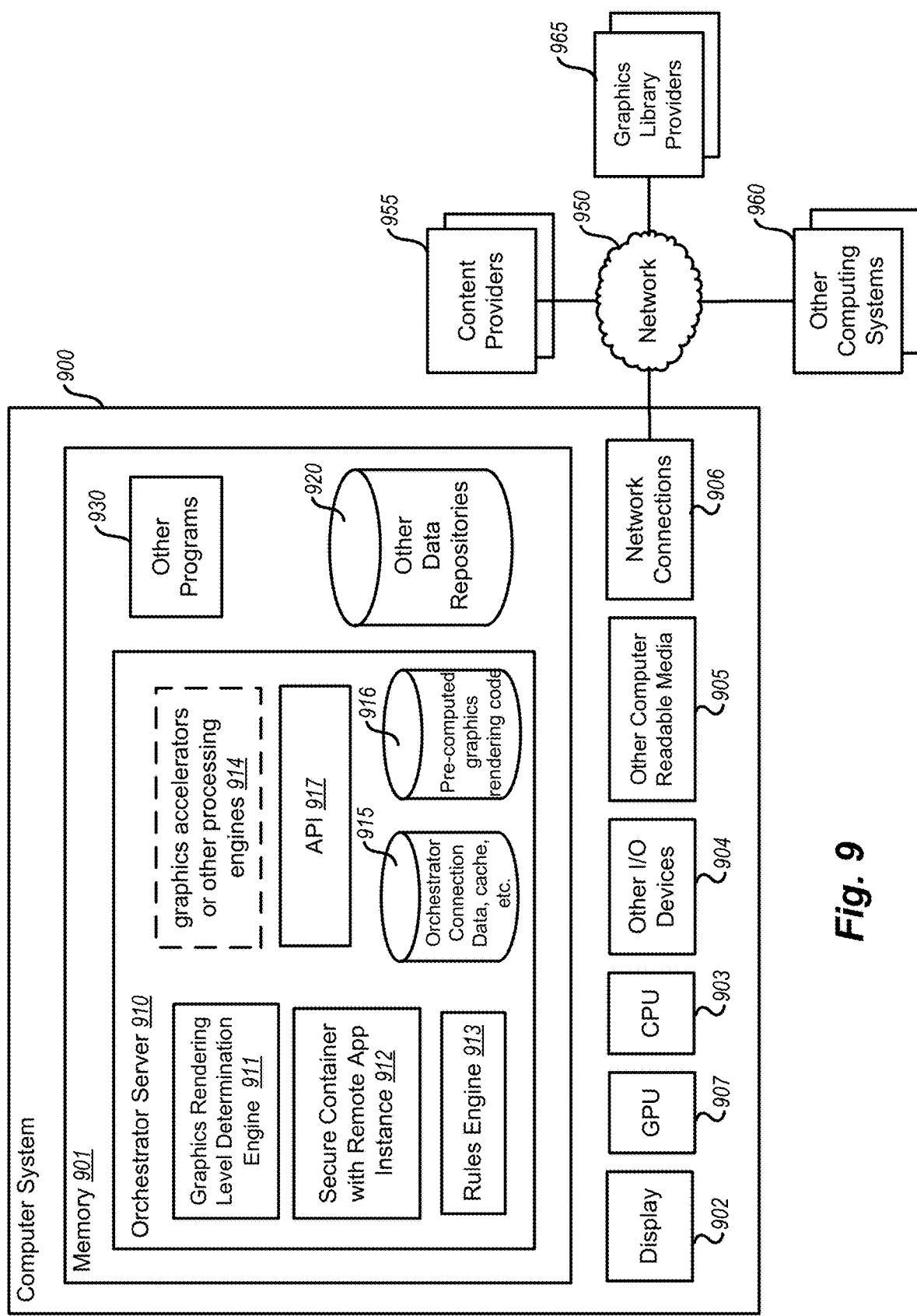
FIG. 9 is an example block diagram of an example computing system for practicing embodiments of an example Adaptive Rendering Application Isolation System as described herein.

FIG. 9 is an example block diagram of an example computing system for practicing embodiments of an example Adaptive Rendering Application Isolation System as described herein. In particular, this example computing system may be used to practice any one or more of the servers 101 and 102 or the client devices 104a—d illustrated in FIG. 1. Note that one or more general purpose virtual or physical computing systems suitably instructed or a special purpose computing system may be used to implement an ARAIS. Further, the ARAIS may be implemented in software, hardware, firmware, or in some combination to achieve the capabilities described herein.

Note that one or more general purpose or special purpose computing systems/devices may be used to implement the described techniques. However, just because it is possible to implement an Adaptive Rendering Application Isolation System or an isolator application on a general purpose computing system does not mean that the techniques themselves or the operations required to implement the techniques are conventional or well known.

The computing system 900 may comprise one or more server and/or client computing systems and may span distributed locations. In addition, each block shown may represent one or more such blocks as appropriate to a specific embodiment or may be combined with other blocks. Moreover, the various blocks of the orchestrator server 910 may physically reside on one or more machines, which use standard (e.g., TCP/IP) or proprietary interprocess communication mechanisms to communicate with each other.

In the embodiment shown, computer system 900 comprises a computer memory ("memory") 901, a display 902, one or more Central Processing Units ("CPU") 903, Graphics Processing Units ("GPU") 907, Input/Output devices 904 (e.g., keyboard, mouse, CRT or LCD display, etc.), other computer-readable media 905, and one or more network connections 906. As an example of the computing system used to practice the orchestrator server of the ARAIS, the orchestrator server 910 is shown as an example component residing in memory 901. In other embodiments, some portion of the contents, some of, or all of the components of the orchestrator server 910 may be stored on and/or transmitted over the other computer-readable media 905. The components of the orchestrator server 910 execute on one or more CPUs 903 and manage the isolation and remoting mechanism, as described herein. Other code or programs 930 and potentially other data repositories, such as data repository 920, also reside in the memory 901, and execute on one or more CPUs 903. Of note, one or more of the components in FIG. 8 may not be present in any specific implementation. For example, some embodiments embedded in other software or solely used as a remote server may not provide means for end user input or display.

In a typical embodiment, the orchestrator server 910 includes one or more graphics rendering level determination engines 911, one or more secure containers with remote application instances running 912, one or more rules engines 913 for interfacing to the determination engines 911 and for other purposes, logic for handling the secure connections to client devices (not shown), connections logic for communication with the ARAIS web server (not shown), and graphics accelerators or other processing 914. In some versions, one or more rules engines 913 include, are similar to, are the same as, or cause instantiation of one or more portions of the isolator-application logic engine 209 of FIG. 2 or the isolator-application interface engines 309, 317 of FIG. 3. In at least some embodiments, the graphics rendering level determination engine 911 and/or rules engine 913 is provided external to the ARAIS and is available, potentially, over one or more networks 950. In addition, data repositories 915 and 916 may be configured to hold connection data, a cache, and pre-computed graphics rendering code. These components/modules are described in detail with reference to FIG. 2. Other and/or different modules also may be implemented. In addition, the ARAIS may interact via a network 950 with third party websites or content 955 or graphics library providers 965 that provides content such as updated versions of libraries or other tools, and one or more other computing systems 960 within the ARAIS such as other server computing systems that are part of ARAIS. Also, of note, some portions of data repository 916 may be provided external to the ARAIS as well, for example accessible over one or more networks 950.

In an example embodiment, components/modules of the orchestrator server 910 are implemented using standard programming techniques. For example, the orchestrator server 910 may be implemented as a "native" executable running on the CPU 903, along with one or more static or dynamic libraries. In other embodiments, the orchestrator server 910 may be implemented as instructions processed by a virtual machine. A range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the orchestrator server 910 (e.g., in the data repositories 915 and 916) can be available by standard mechanisms such as through C, C++, C#, and Java APIs; libraries for accessing files, databases, or other data repositories; through scripting languages such as XML; or through Web servers, FTP servers, or other types of servers providing access to stored data as consistent with the security desired. For example, in a typical orchestrator server of an ARAIS, this data would not be accessible to any systems outside of the web server/load balancer 101/106. However, as used to represent a client computing system, other data may be visible to others by one of the mechanisms described (that is one of the reasons they are vulnerable to malicious attacks). The data repositories 915 and 916 may be implemented as one or more database systems, file systems, or any other technique for storing such information, or any combination of the above, including implementations using distributed computing techniques.

Also the example orchestrator server 910 and other server and/or client computing systems described herein may be implemented in a distributed environment comprising multiple, even heterogeneous, computer systems and networks. Different configurations and locations of programs and data are contemplated for use with techniques of described herein. In addition, the server and/or client may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.), WebRTC, WebSockets, and the like. Other variations are possible. Also, other functionality could be provided by each component/module, or existing functionality could be distributed amongst the components/modules in different ways, yet still achieve the functions of an orchestrator server.

Furthermore, in some embodiments, some or all of the components of the orchestrator server 910 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device). The contents (e.g., machine-readable software instructions) may be provided to one or more processors to enable the orchestrator server to perform at least some of the described techniques. Some or all of the components and/or data structures may be stored on tangible, non-transitory storage mediums including non-transitory computer-readable mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 10:
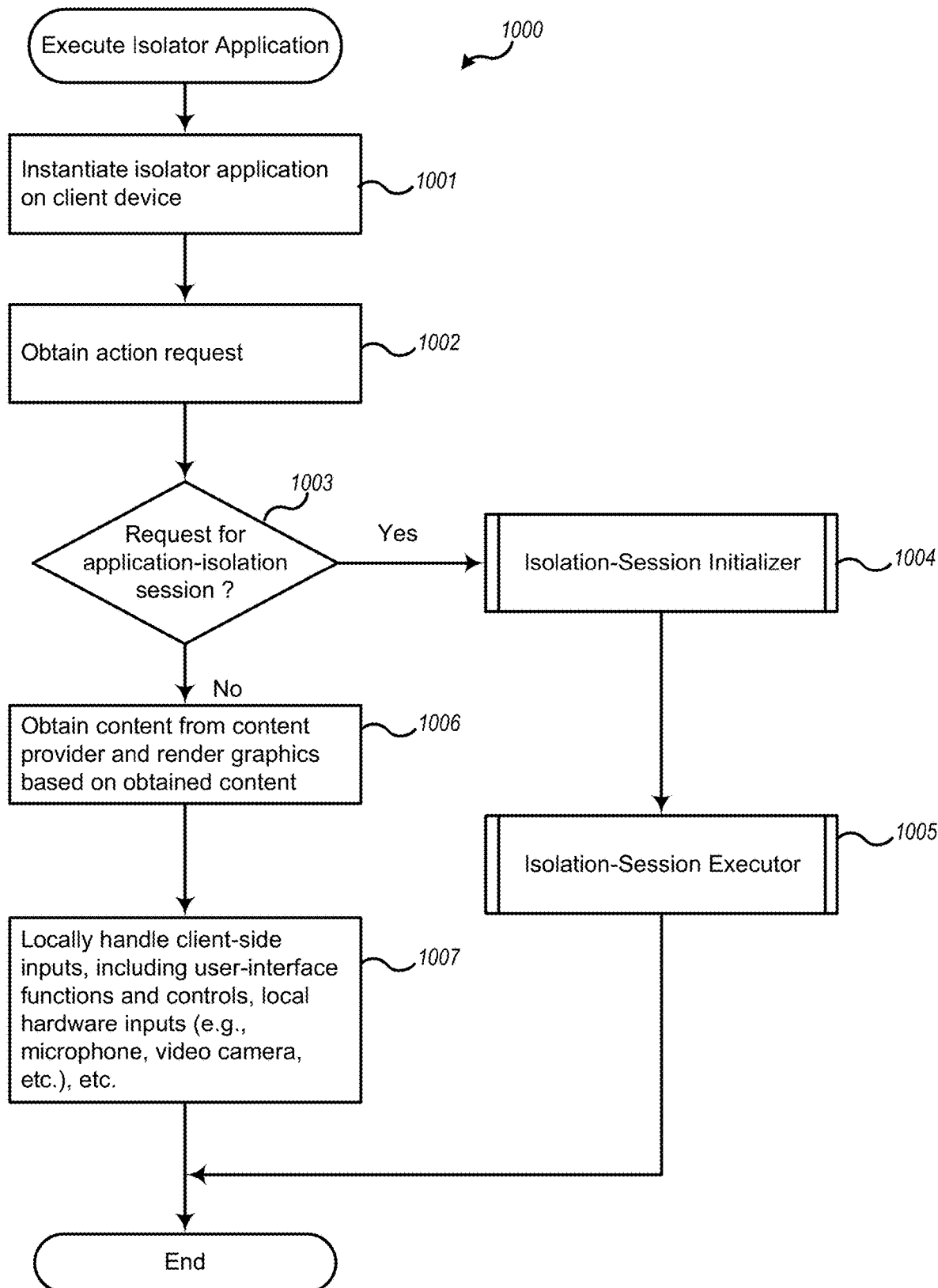
FIG. 10 is an example flow diagram of example logic provided by an example Adaptive Rendering Application Isolation System to provide an example isolator application.

FIG. 10 is an example overview flow diagram of the example logic for providing an example isolator application using an example Adaptive Rendering Application Isolation System. In block 1001, the logic instantiates the isolator application on a client computing device, typically responsive to a triggering event, such as a user opening an executable file, the client computing device being powered up, or the user logging into the client computing device. When the isolator application is instantiated, the client computing device may display an output of the isolator application instance, such as that shown in FIG. 17. Accordingly, before an isolation session is initiated or requested, the isolator application may provide one or more cohesive application-isolation interfaces, such as one or more cohesive isolation user interfaces that include one or more user interface controls, as discussed further regarding FIGS. 17 and 18. In some versions, the isolator application is configured to request an isolation session automatically responsive to instantiation and does so before or in parallel to providing the one or more cohesive isolation user interfaces.

In block 1002, the logic obtains an action request, typically from the user. Examples of action requests include the user entering a uniform resource locator (URL) into a search bar and hitting the enter key, indicating that the user intends to initiate an application-isolation session, indicating that the user intends to configure one or more parameters of the isolator application, or other actions that cause the isolator application instance to perform one or more actions.

In block 1003, the logic determines whether the obtained action request includes a request for an isolation session and, if so, continues to block 1004; otherwise, the logic flows to block 1006. Examples of requests for an isolation session include selecting a user interface control that initiates an isolation session, entering a URL that points to an isolation service such as the web server 101, or entering a URL that points to any remotely located application or web page if the isolator application or local network are configured to route to an isolation service by default. Examples of action requests that are not requests to initiate an isolation session include entering a URL that points to a web page if the isolator application or local network are not configured to route to an isolation service by default, entering a URL that points to a non-whitelisted or a blacklisted web page, executing one or more local non-isolated applications via the isolator application, or indicating that the user intends to configure one or more parameters of the isolator application.

In an embodiment, the isolator application is configured to request/initiate an isolation session automatically after the isolator application is running and/or opened at the client device. In such an embodiment, the isolator application optionally may not transmit a request to the web server to request/initiate the isolation session but instead may communicate directly with the orchestrator server 102 to establish an isolation session.

Figure 11:
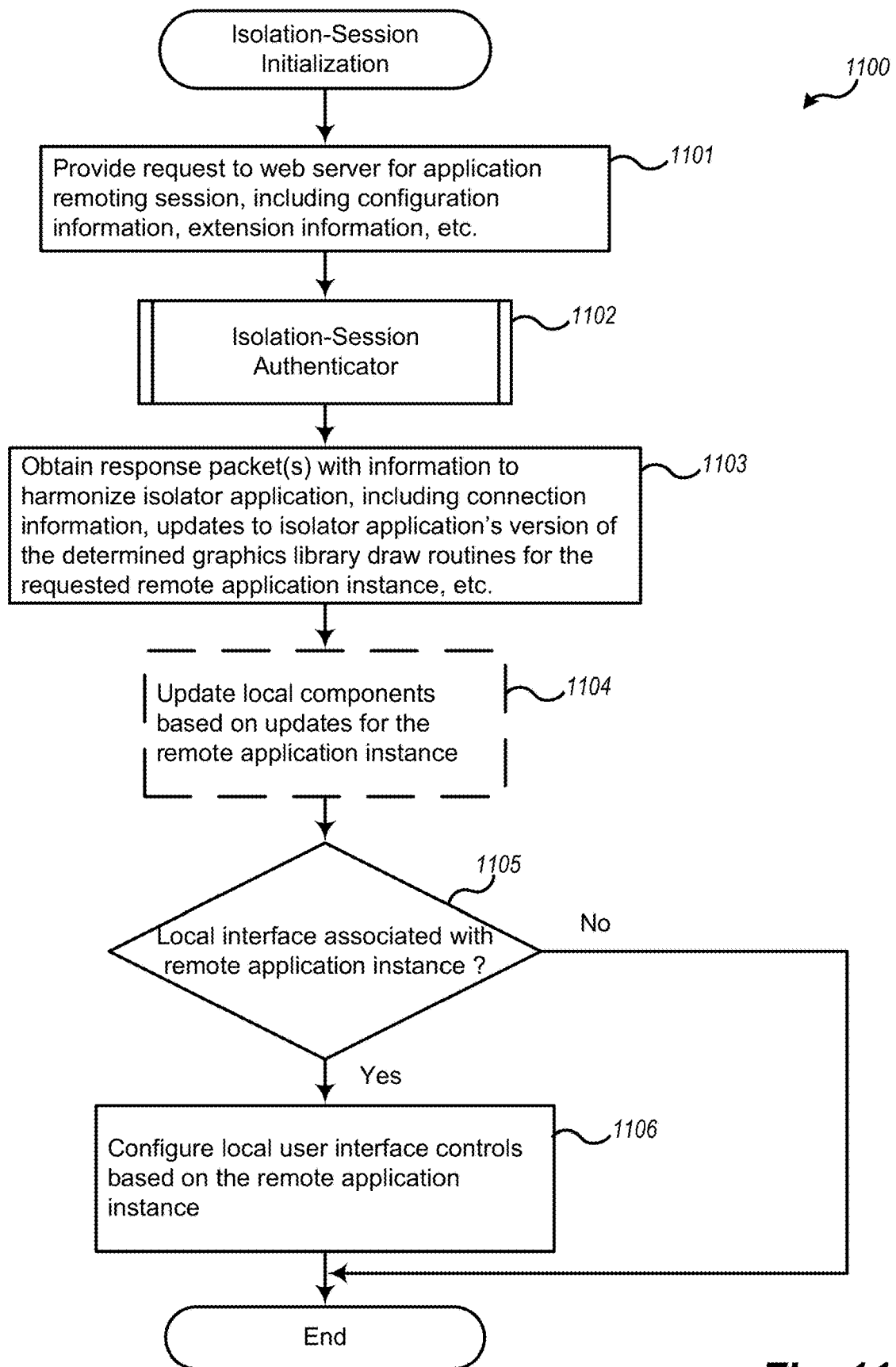
FIG. 11 is an example flow diagram of example logic provided by an example Adaptive Rendering Application Isolation System to initialize an isolation session with an example isolator application.

In block 1004, the logic flows to an isolation-session initiator to initiate the requested isolation session, as further described regarding FIG. 11. Initiating the isolation session typically involves establishing a secure connection with an isolation service such as the web server 101 or the orchestrator server 102 and, optionally, harmonizing one or more cohesive components of the isolator application (for example, one or more cohesive application-isolation interfaces, cohesive isolation engines, or graphics libraries or mappings) with a remotely isolated application initiated responsive to the isolation-session initialization.

Figure 13:
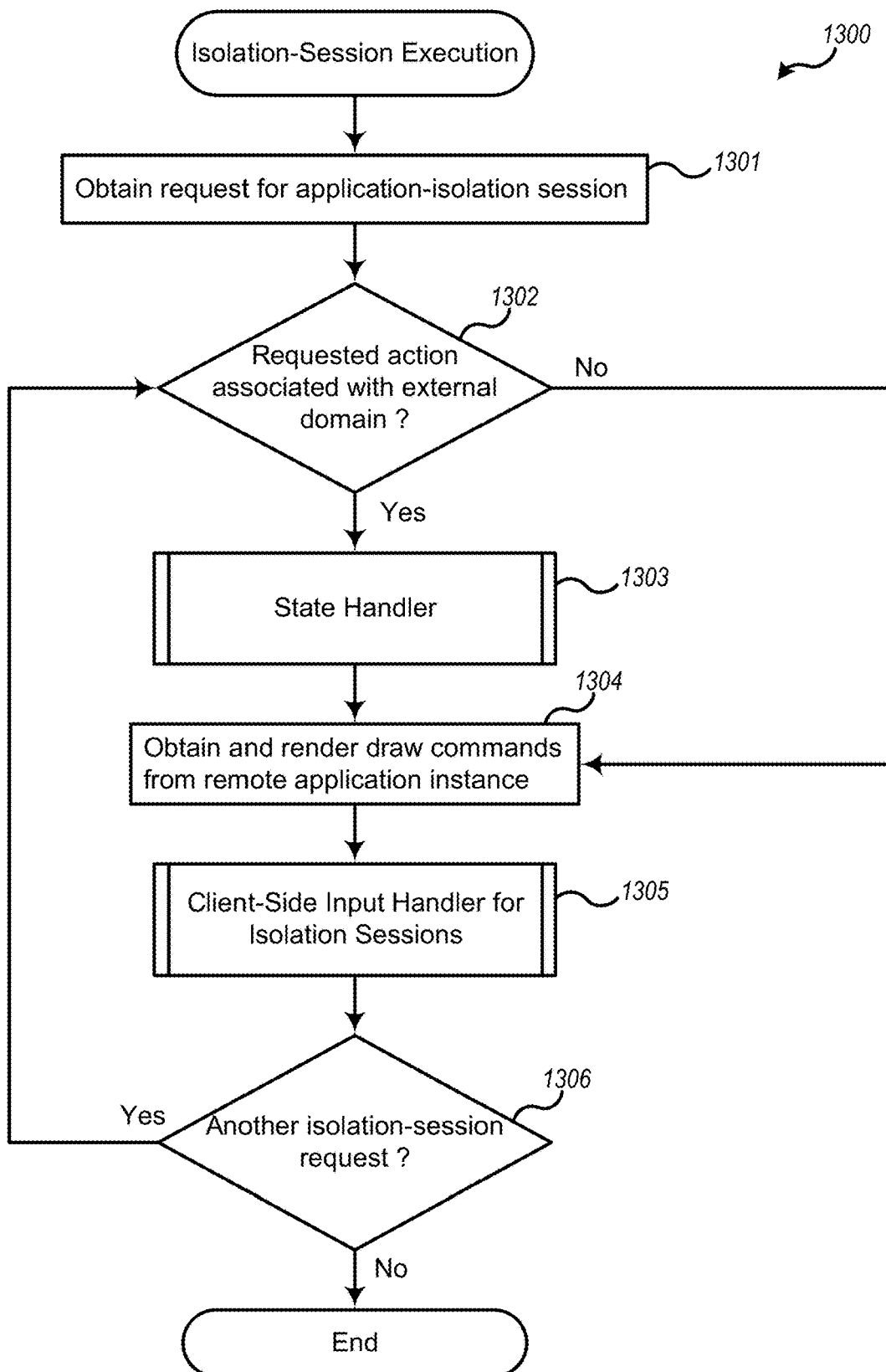
FIG. 13 is an example flow diagram of example logic provided by an example Adaptive Rendering Application Isolation System to provide an isolation-session.

In block 1005, the logic flows to an isolation-session executor to execute the requested isolation session, as further described regarding FIG. 13. Executing the isolation session typically involves obtaining and rendering draw commands from the remotely isolated application instance and handling client-side inputs for the isolation session. The logic then ends.

In block 1006, the logic obtains content from one or more content providers (for example, one or more web pages) and renders graphics on the client computing device based on the obtained content. Examples include rendering a web page in manners known for web browsers, such as Chrome.

In block 1007, the logic locally handles client-side inputs, including user-interface functions and controls, and local hardware inputs (for example, microphone, video camera, or other inputs), to facilitate the user engaging in a typical non-isolation session. Accordingly, in some cases, the isolator application optionally acts as a typical web browser outside of without requiring isolation session. The logic then ends.

FIG. 11 is an example flow diagram of an example logic provided by an example Adaptive Rendering Application Isolation System to initialize an isolation session with an example isolator application. In block 1101, the logic provides a request to a web server of an isolation service (for example, the web server 101) for an application remoting session. The request may include various information that facilitates harmonizing an instance of the requested remote application with the isolator application, such as an indication of the application that the user requests to be remoted, content that the user requests the remote application instance to load (e.g., uniform resource locator (URL) pointing to a web page to load or a file to open), configuration information associated with the isolator application (for example, operating system of the client computing device, version of the isolator application, graphics libraries (or their versions) employed by the isolator application, or other configuration information), extension or plug-in information (for example, extensions or plug-ins load on the isolator application or requested to be loaded on the remote application instance), indication of whether the user is attempting to continue a previous isolation session, or other information.

Figure 12:
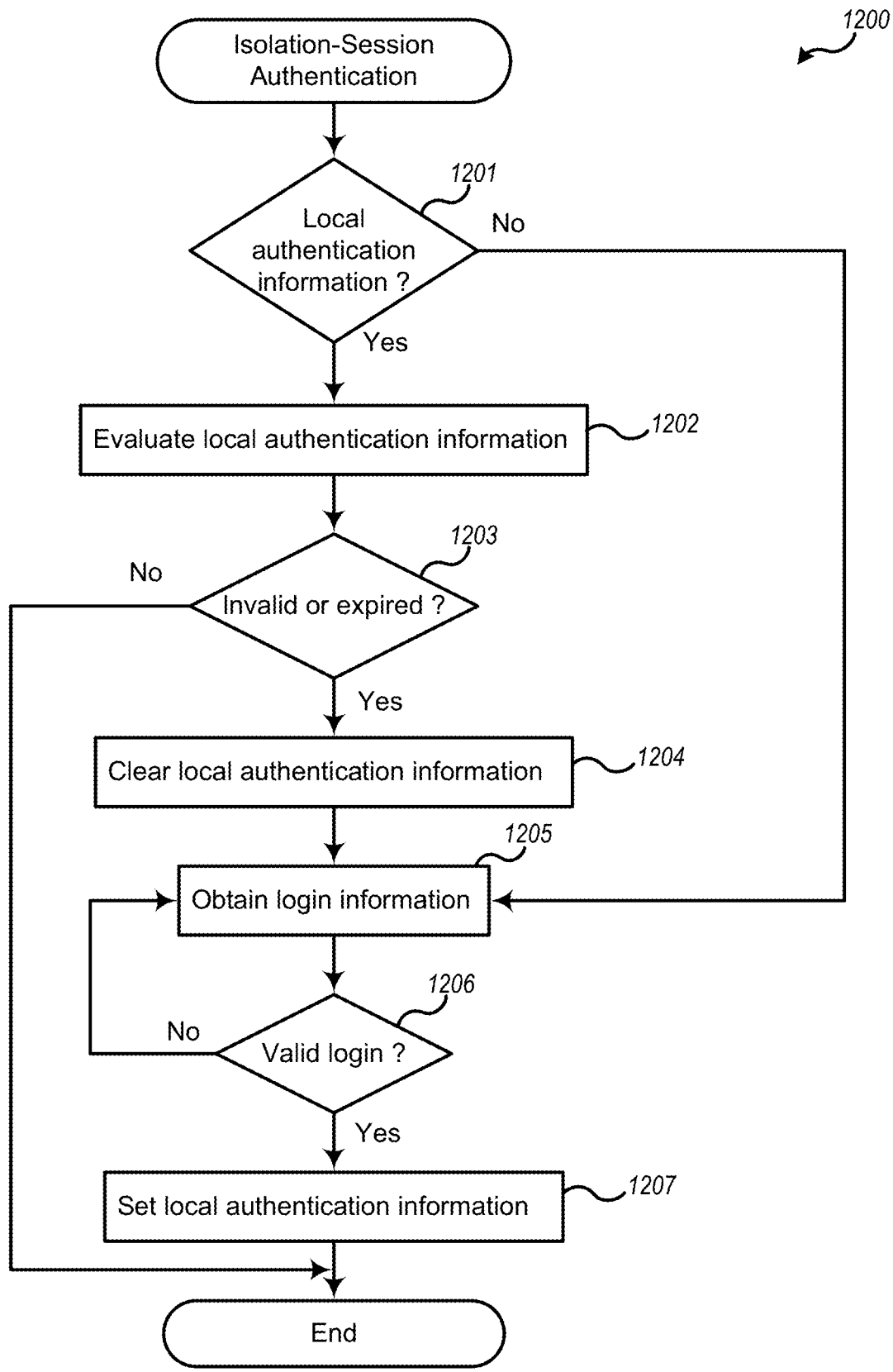
FIG. 12 is an example flow diagram of example logic provided by an example Adaptive Rendering Application Isolation System to provide authentication for an isolation session.

In block 1102, the logic flows to an isolation-session authenticator to provide authentication for the isolation session, as further described regarding FIG. 12. Providing the authentication for the isolation session typically involves having the user provide login information to set local authentication information for the isolation session if local authentication information is rejected by the remote end point (for example, the load balancer). An example may include the load balancer rejecting the authentication information because the authentication information has not yet been set or has expired.

In block 1103, the logic obtains one or more response packets with information that facilitates harmonize the isolator application with the remote application instance. For example, one or more portions of one or more features, functions, configuration settings, resources (for example, one or more engines, libraries, or others), cohesive application-isolation interfaces, or others of the isolator application may be synchronized with, configured to work with, or mapped to one or more corresponding aspects of the remote application instance. The one or more response packets may include connection information (for example, a cookie) that facilitates establishing a secure connection (for example, secure connection 120) with the orchestrator server 102. In some cases, the one or more response packets include one or more graphics libraries, updates to one or more graphics libraries of the isolator application, or maps (e.g., one or more maps that logically associate elements of the remote application instance with corresponding elements of the isolator application (for example, mapping elements such as draw commands in different graphics libraries to each other, mapping fonts, or others) based on the configuration of the isolator application or the characteristics of the remote application instance). In some cases, the one or more response packets include one or more indications of one or more features or functions of the remote application instance and which of those features or functions are hardware-access functions, remote-only functions, or hybrid (local and remote) functions to facilitate the isolator application harmonizing one or more portions of one or more cohesive application-isolation interfaces (for example, one or more cohesive isolation user interfaces or cohesive isolation programming interfaces) based on those one or more features or functions.

Examples of such features or functions may include forward/backward buffers, stop commands, refresh commands, bookmark commands, clipboard buffers, save or print functions, streaming media to or from the client computing device, or others of a remote web browser application instance, remote enterprise application instance (for example, a word processing application), remote video game instance, or other remote application instance. In some cases, the isolator application harmonizes one or more soft user interface controls of the one or more cohesive isolation user interfaces in accordance with those buffers and corresponding functions (for example, configuring a soft user interface control to correspond to a forward button, backward button, or others). In some cases, the isolator application harmonizes one or more portions of the one or more cohesive isolation programming interfaces to facilitate communicating corresponding information between the isolator application and the remote application instance (for example, notifying the remote application instance of a local action invoking a feature or function, obtaining information, objects, or files responsive to invocation of a feature or function, or others). In some cases, one or more portions of the one or more cohesive application-isolation interfaces are preconfigured to facilitate utilizing those one or more features or functions before providing the request for the isolation session.

The logic may also set up a secure connection (for example, secure connection 120) with an isolated execution environment (for example, secure container 103) based on the obtained connection information as discussed further above.

In block 1104, the logic optionally updates one or more local components of the isolator application, such as one or more graphics libraries, files that define fonts, one or more portions of the one or more cohesive application-isolation interfaces, or other components of the isolator application, based on the one or more response packets obtained in block 1103. Block 1104 is optional because updates may not be provided in every isolation session and, instead, may be provided only when the last-update date for a given component (which may be provided in the isolation-session request) is expired, when a new version or update is available, or responsive to user input instructing the isolator application to check for or accept one or more updates.

In block 1105, the logic determines whether one or more portions of the one or more cohesive isolation user interfaces are associated with one or more features or functions of the isolated application instance and, if so, continues to block 1106; otherwise, the logic then ends. In some cases, the one or more cohesive isolation user interfaces include one or more soft user interface controls (a user interface control that is flexibly programmable to invoke any of a number of functions rather than being associated with a single fixed function or a fixed set of functions) or hard user interface controls (a user interface control that is associated with a single fixed function or a fixed set of functions), and the logic determines whether the isolated application instance has one or more features or functions that should be linked with the one or more soft or hard user interface controls. In some cases, the one or more cohesive isolation user interfaces include one or more user interface controls that can be transitioned between a visible configuration (or an enabled configuration) and a hidden configuration (or a disabled configuration) based on whether the isolated application instance has one or more features or functions that correspond to the one or more user interface controls.

In block 1106, the logic configures one or more portions of the one or more cohesive isolation user interfaces based on one or more characteristics of the isolated application instance. For example, one or more user interface controls may be transitioned between a visible configuration (or an enabled configuration) and a hidden configuration (or a disabled configuration) based on whether the isolated application instance has one or more features or functions that correspond to the one or more user interface controls. As another example, one or more soft or hard user interface controls may be linked with one or more features or functions of the isolated application instance. As discussed further regarding FIGS. 17 and 19, the one or more cohesive isolation user interfaces are cohesive with the isolator application and, therefore, in the case of a remote web browser application instance, persist before and after the output of a web page from the remote web browser application instance being modified or cleared.

As a result of the one or more cohesive isolation user interfaces being cohesive with the isolator application, the isolator application facilitates reducing the computational and bandwidth expenses in comparison to, for example, injecting script in a web page loaded in the remote web browser application instance to create the appearance of one or more such user interface controls existing in the output of the remote web browser application and re-rendering one or more such user interface controls each time the web page is loaded or refreshed in the remote web browser application instance. Also because the one or more cohesive isolation user interfaces are cohesive with the isolator application, the isolator application can associate one or more hot keys with the one or more cohesive user interface controls and notify the remote application instance of activation of the one or more cohesive user interface controls responsive to detecting actuation of the one or more hot keys, which would otherwise lost during fully secure isolation sessions absent the one or more cohesive application-isolation interfaces of the isolator application.

Moreover, because the one or more cohesive isolation user interfaces are cohesive with the isolator application, the isolator application can associate hybrid functions (functions that are cooperatively performed locally on the client computing device and remotely at the orchestrator) with the one or more cohesive user interface controls, thereby facilitating executing functions that are otherwise unavailable during fully secure isolation sessions absent the one or more cohesive application-isolation interfaces of the isolator application. Examples of such functions may include providing the remote application instance access to certain hardware the client computing device such as microphone or video camera streaming from the client computing device, obtaining data from the remote application instance and placing the obtained data in a local clipboard buffer or browsing or other history of the client computing device, obtaining files from the remote application instance and providing them to hardware locally connected to or included in the client computing device such as printers or hard disk drives. The logic then ends.

FIG. 12 is an example flow diagram of an example logic provided by an example Adaptive Rendering Application Isolation System to provide authentication for an isolation session. This example logic can be used with an isolator application as described herein or with web applications loaded on client computing devices as described in the cross-referenced related applications that are incorporated herein in entirety. An example use case for process 1200 is provided in sub-sequence 1601 of sequence 1600 in FIG. 16. In block 1201, the logic determines whether authentication information is stored locally on the client computing device and, if so, continues to block 1202; otherwise, the logic flows to block 1205. The authentication information may be included in a cookie, JSON web token, or other object. Examples of authentication information include usernames, passwords, pins, keys, hashes of authentication information, or other information that facilitates authenticating a user, device, or application. In some cases, local authentication information is cleared when a user logs out of or otherwise terminates an isolation session or the isolator application.

In block 1202, the logic evaluates the local authentication information. The evaluation may include comparing the authentication information to one or more known values or hashes of known values, application of validation algorithm to the authentication information, comparison of a timestamp for or age of the authentication to one or more thresholds, or other evaluations that facilitate determining the validity or expiration status of the authentication information. The evaluation may be executed in accordance with an authentication standard such as an Open Authentication standard (for example, OAuth 1.0 or OAuth 2.0).

In block 1203, the logic determines whether the evaluated local authentication information is invalid or expired based on the evaluation and, if so, continues to block 1204; otherwise, the logic then ends. The determination typically includes determining whether the authentication information matches or provides an expected value or whether the timestamp or age is older or greater than a predetermined value.

In block 1204, the logic clears the local authentication information, such as by setting a null value for or deleting the authentication information.

In block 1205, the logic obtains login information. A single-sign-on service (for example, a single-sign-on service available under the mark MICROSOFT®) may be used to obtain credential information from the user.

In block 1206, the logic determines whether the login information is valid and, if so, continues to block 1207; otherwise, the logic flows to block 1205. In some versions, the logic makes the determination based on one or more result values provided by the single-sign-on service. In other versions, the logic makes the determination by evaluating the login information in manners generally known in the art of credential validation or login security.

In block 1207, the logic sets one or more values in or for local authentication information. The setting may be executed in accordance with an authentication standard such as OAuth 1.0 or OAuth 2.0. The setting may include generating one or more authentication values and providing a cookie, JSON web token, or other object that includes the one or more authentication values or updating such an object to include the one or more authentication values. The logic then ends.

One or more portions of process 1200 may be executed by a web application as described in the cross-referenced related applications, the isolator application, a proxy server, or the load balancer. In some versions, the isolator application facilitates reducing the computational or bandwidth expenses in comparison to, for example, a web application because the isolator application facilitates local evaluation of the authentication information or the login information, thereby reducing a quantity of messages that are transmitted over the network to one or more server computing devices, such as the proxy server, the load balancer, the orchestrator, or the single-sign-on service.

FIG. 13 is an example flow diagram of example logic provided by an example Adaptive Rendering Application Isolation System to execute an isolation session. In block 1301, the logic obtains a request for an application-isolation session. The obtained request is may be the request obtained in block 1002 of process 1000.

In block 1302, the logic determines whether the requested action is associated with a domain external to the Adaptive Rendering Application Isolation System and, if so, continues to block 1303; otherwise, the logic flows to block 1304. An example of a requested action associated with an external domain is a request for a third-party website during an isolation session.

Figure 14:
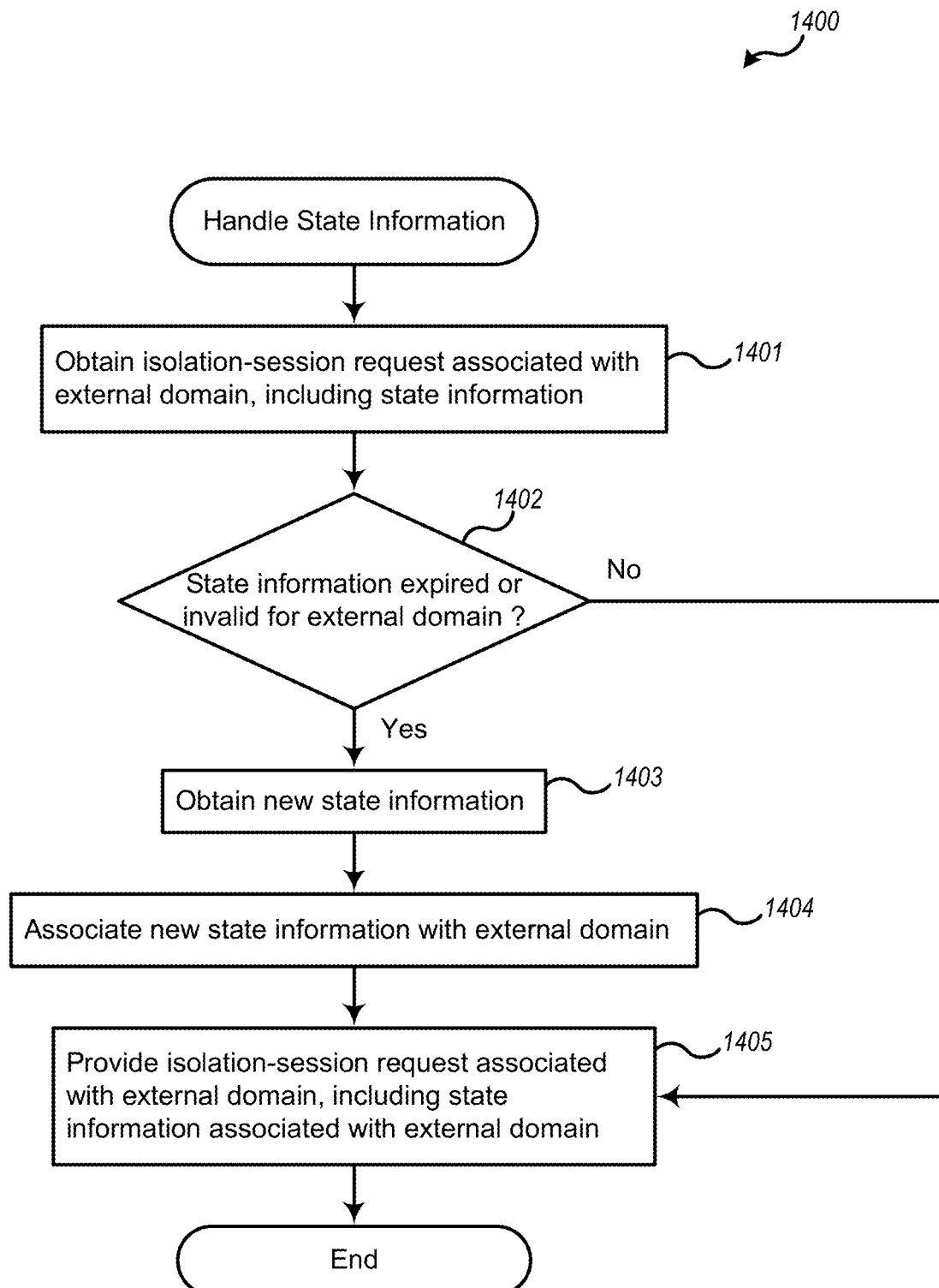
FIG. 14 is an example flow diagram of example logic provided by an example Adaptive Rendering Application Isolation System to provide state information for external domains.

In block 1303, the logic flows to a state handler to facilitate providing state information to the external domain, as further described regarding FIG. 14. Providing the state information to the external domain typically involves obtaining state information, associating the state information with or mapping the state information to the external domain, and providing one or more messages that include the state information.

In block 1304, the logic obtains draw commands, typically with corresponding position information associated with those draw commands and without any bitmaps associated with those draw commands, from the remote application instance and locally renders the draw commands based on the position information to provide one or more portions of an output of the isolated application instance. In some cases, the isolation service is unable to provide draw commands without bitmaps and instead employs another rendering technique, such as providing draw commands with bitmaps, pixel pushing, DOM mirroring, RDP, or others. Accordingly, because the isolator application is preconfigured to be isolation-enabled with the one or more cohesive application-isolation interfaces, the logic facilitates the isolator application causing the client computing device to display the one or more portions of the output of the isolated application without obtaining files responsive to the isolation request to isolation-enable the isolator application.

Figure 15:
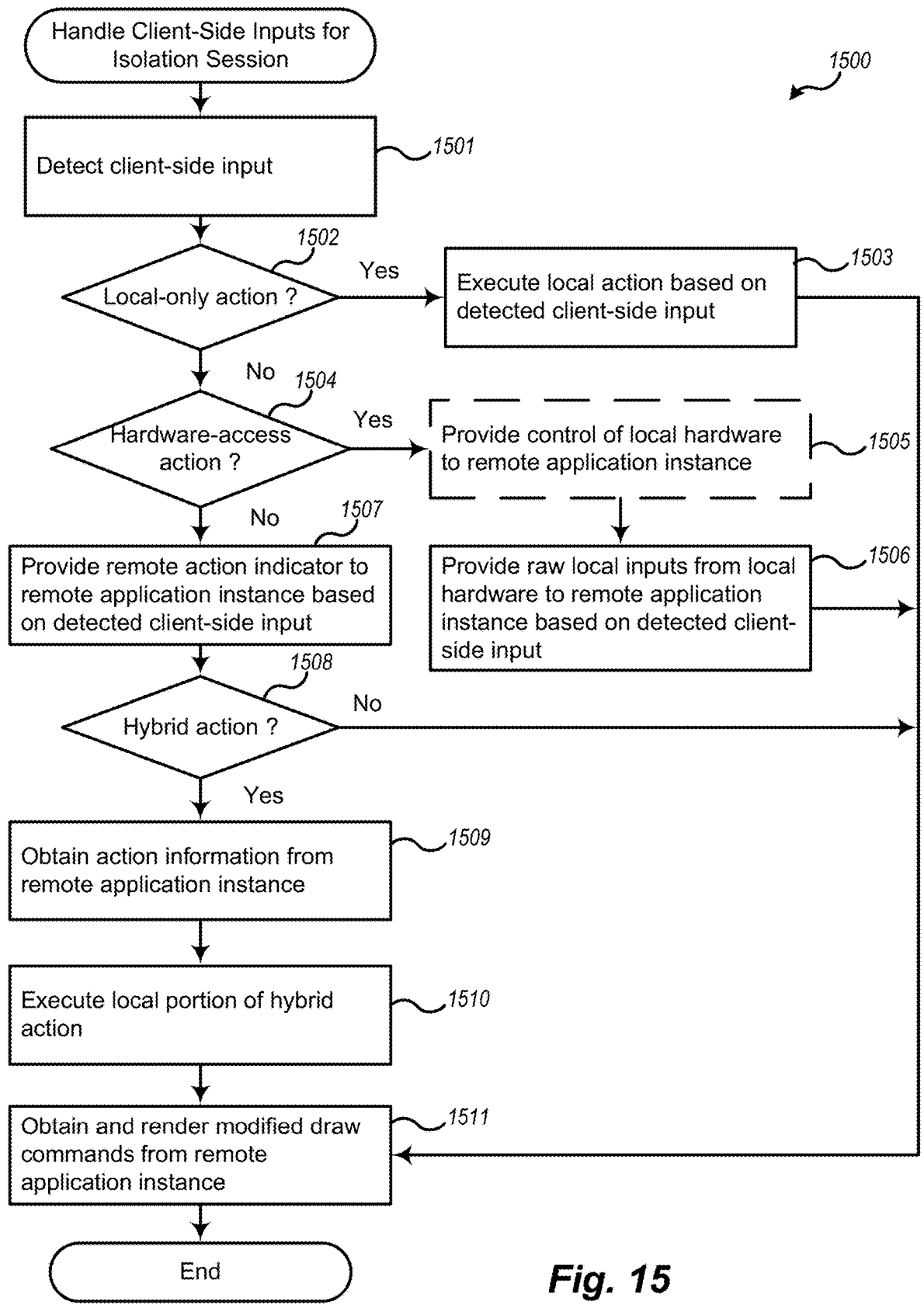
FIG. 15 is an example flow diagram of example logic provided by an example Adaptive Rendering Application Isolation System to handle client-side inputs for an isolation session with an example isolator application.
Figure 17:
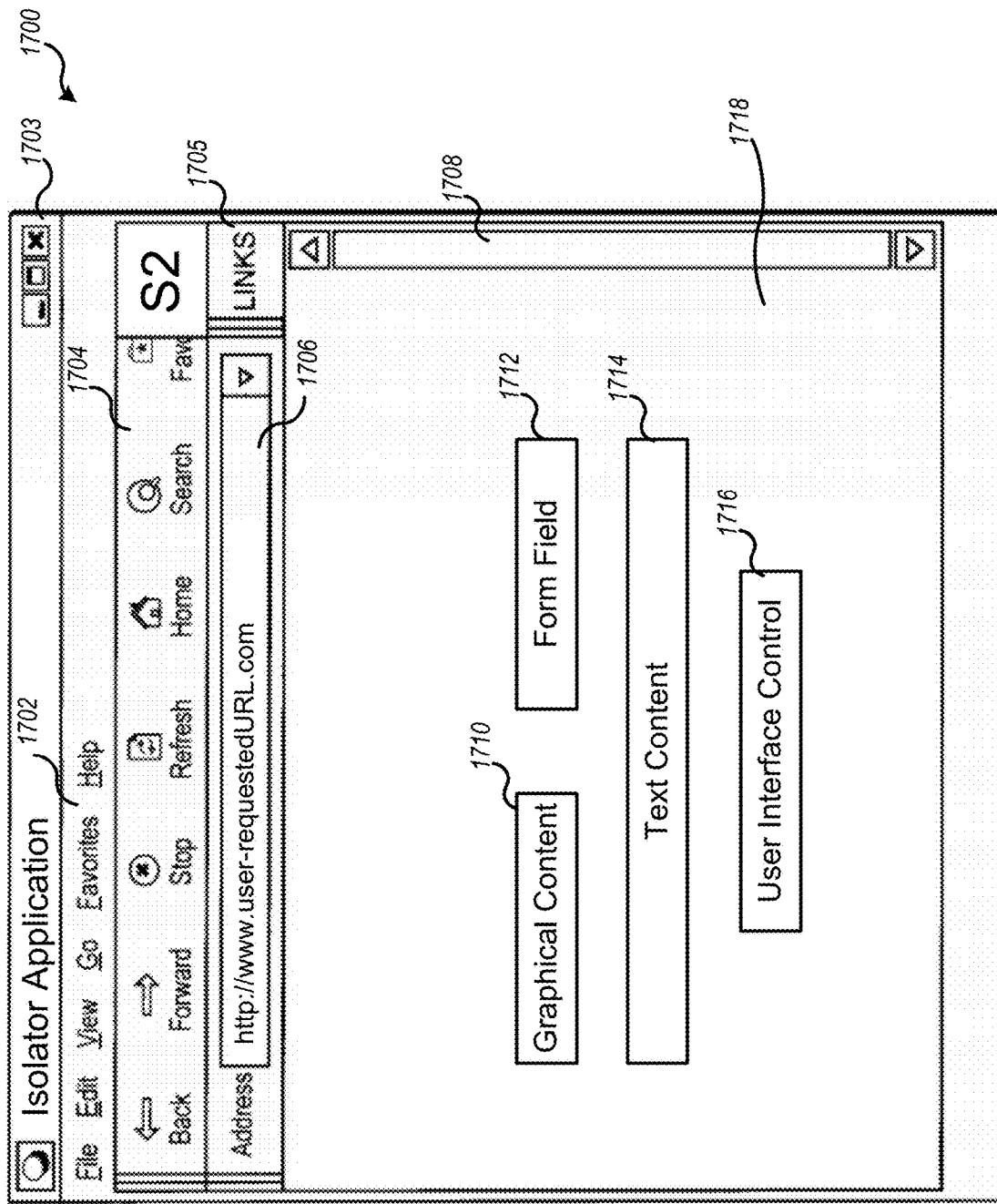
FIG. 17 is an example user interface of an example isolator application.
Figure 18:
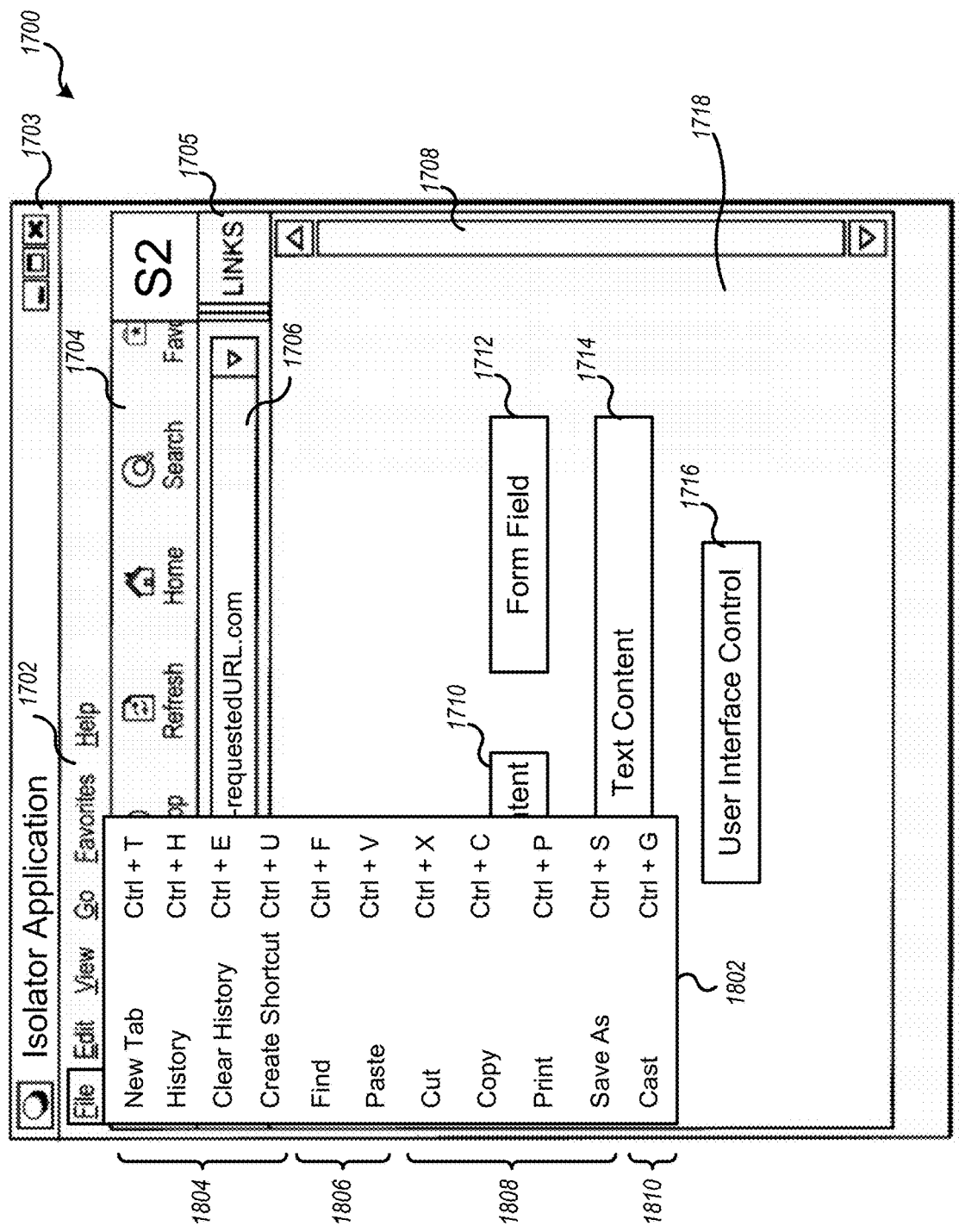
FIG. 18 is an example user interface of an example isolator application.

In block 1305, the logic flows to a client-side input handler for isolation sessions, as further described regarding FIG. 15, to facilitate providing a user experience that is typically available only during non-isolation sessions by notifying the isolation service (for example, the web server 101 or the orchestrator server 102) of one or more client-side actions that are otherwise lost during fully secure isolation sessions absent the one or more cohesive application-isolation interfaces of the isolator application, as discussed further regarding FIGS. 17 and 18. Blocks 1304 and 1305 continue until the isolation session terminates or another isolation-session request is provided.

In block 1306, the logic determines whether another isolation-session request has been made and, if so, continues to block 1302; otherwise, the logic then ends.

FIG. 14 is an example flow diagram of example logic provided by an example Adaptive Rendering Application Isolation System to provide state information for external domains. This example logic can be used with an isolator application as described herein or with web applications loaded on client computing devices as described in the cross-referenced related applications that are incorporated herein in entirety. An example use case for process 1400 is provided in sub-sequence 1602 of sequence 1600 in FIG. 16. In block 1401, the logic obtains an isolation-session request associated with an external domain (for example, a third-party website), including any corresponding state information. The state information may be included in or appended to a uniform resource identifier ("URI") (for example, a uniform resource locator ("URL")) string, cookie, JSON object (for example, a JSON web token), or other object.

In block 1402, the logic determines whether the state information is expired or invalid and, if so, continues to block 1403; otherwise, the logic flows to block 1405. The determination typically includes determining whether one or more portions of the state information matches or provides an expected value or whether a timestamp or age of the state information is older or greater than a predetermined value.

In block 1403, the logic obtains new state information. In some versions, the new state information is included in or appended to a URI (for example, a URL) string, cookie, JSON object (for example, a JSON web token), or other object.

In block 1404, the logic associates the new state information with the external domain. The association may include mapping the new state information to the external domain in a data object (for example, a table) that maps domains and state information to each other, with the data object being stored on the client computing device.

In block 1405, the logic provides an isolation-session request associated with the external domain, including the new state information associated with the external domain, based on the obtained isolation-session request of block 1401. Providing the request may include a hypertext transfer protocol (HTTP) request, such as a GET request or a POST request, with the new state information being included in or appended to one or more portions of the request. The logic then ends.

One or more portions of process 1400 may be executed by a web application as described in the cross-referenced related applications, the isolator application, a proxy server, or the load balancer. In some versions, the isolator application facilitates reducing the computational or bandwidth expenses in comparison to, for example, a web application because the isolator application facilitates local evaluation of the state information, local generation of new state information, or association of the new state information with the external domain without first sending a request to a proxy server, thereby reducing a quantity of messages that are transmitted over the network to one or more server computing devices, such as the proxy server.

FIG. 15 is an example flow diagram of an example logic provided by an example Adaptive Rendering Application Isolation System to handle client-side inputs for an isolation session with an example isolator application. In block 1501, the logic detects a client-side input to the isolator application. The isolator application typically has a cohesive event loop that listens for client-side inputs to one or more cohesive application-isolation interfaces of the isolator application to facilitate this detection. Examples of such inputs include user actuation (for example, clicking, gestures, typing, or others) of one or more portions of one or more cohesive application-isolation interfaces (for example, one or more cohesive isolation user interfaces), raw data from one or more local hardware devices (for example, one or more cameras, microphones, or other devices), or others.

In block 1502, the logic determines whether the detected client-side input initiates one or more local-only actions and, if so, continues to block 1503; otherwise, the logic flows to block 1504. Examples of local-only actions may include opening a new tab in the isolator application (before transmitting a request for a new remote-application output to render in the new tab), viewing browsing history that is stored locally at the isolator application, clearing the browsing history that is stored locally at the local isolator, creating a shortcut that, when opened, causes the isolator application to initiate an isolation system with a target of a web page or remote application that the isolator application locally associates with the shortcut, or others. In some cases, one or more of these functions are instead implemented as hybrid (cooperatively executing local and remote actions) or remote-only actions, as discussed further below.

In block 1503, the logic executes the one or more local actions based on the detected client-side input. For example, a new tab may be opened in the isolator application without sending an instruction to the remote application instance to do the same until the user confirms that this is the purpose of the new tab by, for example, entering a new URL in an address bar of the isolator application or taking another action. In the case of the remote application instance being a web browser application instance, the orchestrator may provide the isolator application an indicator of the address of each web page loaded in the remote application instance or each remote application that is utilized in each isolation session to facilitate the isolator application storing and maintaining a browsing or remote usage history that can be locally viewed without transmitting further requests to the remote application instance for that information. This alleviates burden from the orchestrator of storing that information remotely. Also in that case, the isolator application can delete one or more portions of the locally stored history without providing notification to the orchestrator. In some cases, the isolator application may facilitate creating and locally storing shortcuts that identify one or more applications, configurations, states, files open in those one or more identified applications, URLs of one or more web pages loaded in those one or more identified applications, or other dynamic characteristics of those one or more identified applications to facilitate initializing an isolation session that returns the user experience to where it was when the user provided the client-side input that caused the isolator application to create the shortcut.

In block 1504, whether the detected client-side input initiates one or more hardware-access actions and, if so, continues to block 1505; otherwise, the logic flows to block 1507. An example of a hardware-access action may include providing to the orchestrator or the remote application instance control over or raw data from one or more local hardware devices (for example, one or more cameras, microphones, or other devices).

In block 1505, the logic optionally provides control of one or more local hardware devices to the orchestrator or the remote application instance based on the detected client-side input. This facilitates providing features or functions that are otherwise unavailable during fully secure isolation sessions absent the one or more cohesive application-isolation interfaces of the isolator application, such as providing the orchestrator or the remote application instance control over a local camera, microphone, display, haptic device, industrial equipment, or other hardware. Control may be provided through one or more known techniques yet initiated or otherwise facilitated by the isolator application (for example, the isolator application may modify one or more configuration parameters of the hardware device, the local client computing device, a local router, or other component to facilitate the direct control or may provide to the orchestrator or the remote application instance information that facilitates such control such as a username and password or other credentials, address information (for example, an IP address of the hardware device), or other access-enabling information). Block 1505 is optional because providing remote access to the local hardware devices may be disabled by the user or the network administrator.

In block 1506, the logic provides raw data from one or more local hardware devices to the orchestrator, the remote application instance, or another target based on the detected client-side input. Examples of such raw data include a raw video or audio feed from a camera or microphone, measurement values output from one or more sensors, status indicators from various components (e.g., a local display, haptic device, video game controller, or others). In some cases, the isolator application provides the raw data in messages, continuous streams, or other forms.

In block 1507, the logic provides one or more remote action indicators to the remote application instance based on the detected client-side input. Because the logic determined in the negative at blocks 1502 and 1504, the one or more actions associated with the detected client-side input include one or more remote actions. The one or more remote action indicators notify the orchestrator or the remote application instance that the one or more remote actions are requested and may indicate or include one or more parameter values, objects, files, or other information associated with the one or more remote actions. For example, the isolator application may provide the remote application instance one or more indicators of a cursor location at a mouse-down event (mouse button or finger depressed), a cursor location at a mouse-up event (mouse button or finger released), and a user request to cut or copy information (for example, files, objects, graphics, text, or other information) between those two locations to facilitate the isolated application instance providing a copy of the requested information to the isolator application to provide to the client computing device's clipboard buffer and, in the case of cutting, deleting the information from its present location.

As another example, the isolator application may provide the remote application instance one or more indicators of information (for example, files, objects, graphics, text, or other information) that the user requests to be found and may be highlighted by the remote application instance, such as text in the output of the remote application instance, to facilitate the remote application instance selecting and highlighting the first or next instance of the information requested to be found and returning updated render commands (for example, new draw commands and corresponding position information). As a further example, the isolator application may provide the remote application instance one or more indicators of information that the user requests to be pasted from a local clipboard buffer into a remote location (for example, character location or position in a field in the output of the remote application instance) and the remote location. Another example includes the isolator application providing the remote application instance one or more indicators of information in the output of the remote application instance that the user requests to be locally printed or saved and one or more settings parameters associated with that request.

In block 1508, the logic determines whether the detected client-side input initiates one or more hybrid actions (one or more actions that cooperatively include one or more remote actions and one or more local actions) and, if so, continues to block 1509; otherwise, the logic continues to block 1511. As used herein, the term "hybrid actions" does not refer to local rendering output of the remote application instance. Examples of hybrid actions may include history-related actions, cut or copy actions, printing, or saving actions. An example use case for a remote-only action is provided in sub-sequence 1604 of sequence 1600 in FIG. 16. An example use case for a hybrid action is provided in sub-sequence 1604 of sequence 1600 in FIG. 16.

In block 1509, the logic obtains action information from the remote application instance or another location indicated by the remote application instance (for example, directly from a third-party web host) in association with the one or more detected hybrid actions. The obtained action information includes one or more indicators of one or more local portions of the one or more hybrid actions for the isolator application to perform or information with or on which the isolator application should perform the one or more local portions of the one or more hybrid actions. In the example of some cases where history-related actions are hybrid actions, the obtained action information may include a file or list of the user's history. In the example of cur or copy actions, the action information may include the information that the isolated application instance cut or copied from its output or a remote storage system. In the example of printing or saving, the action information may include a file (for example, an image file, a portable document format (PDF) file, or other file) that provides a visual representation or actual copy of the information requested to be cut or copied.

In block 1510, the logic executes the one or more local portions of the one or more hybrid actions based on the obtained action information. In the example of some cases where history-related actions are hybrid actions, the local portion of the hybrid action may include storing the obtained file or list of the user's history locally at the client computing device, providing a graphical user interface control that facilitates the user manipulating the history information contained in the file or list, modifying the file or list based on the user manipulations, and storing the modified file or list locally or providing the modified file or list to the orchestrator or the remote application instance. In the example of cur or copy actions, the one or more local portions of the one or more hybrid actions may include providing the obtained cut or copied information to the client computing device's clipboard buffer. In the example of printing or saving, the one or more local portions of the one or more hybrid actions may include formatting the obtained file based on configuration settings that the user selected at the time that the user provided the detected client-side input (unless the orchestrator or the remote application instance already performed such formatting or the printer or storage device performs such formatting) and providing the file to a local printer or storage device to be printed or saved based on the configuration settings or the detected client-side input.

In block 1511, the logic obtains and renders modified draw commands and corresponding position information from the remote application instance based on the one or more actions that caused the remote application instance to generate a new or modified output. The logic then ends.

Figure 16:
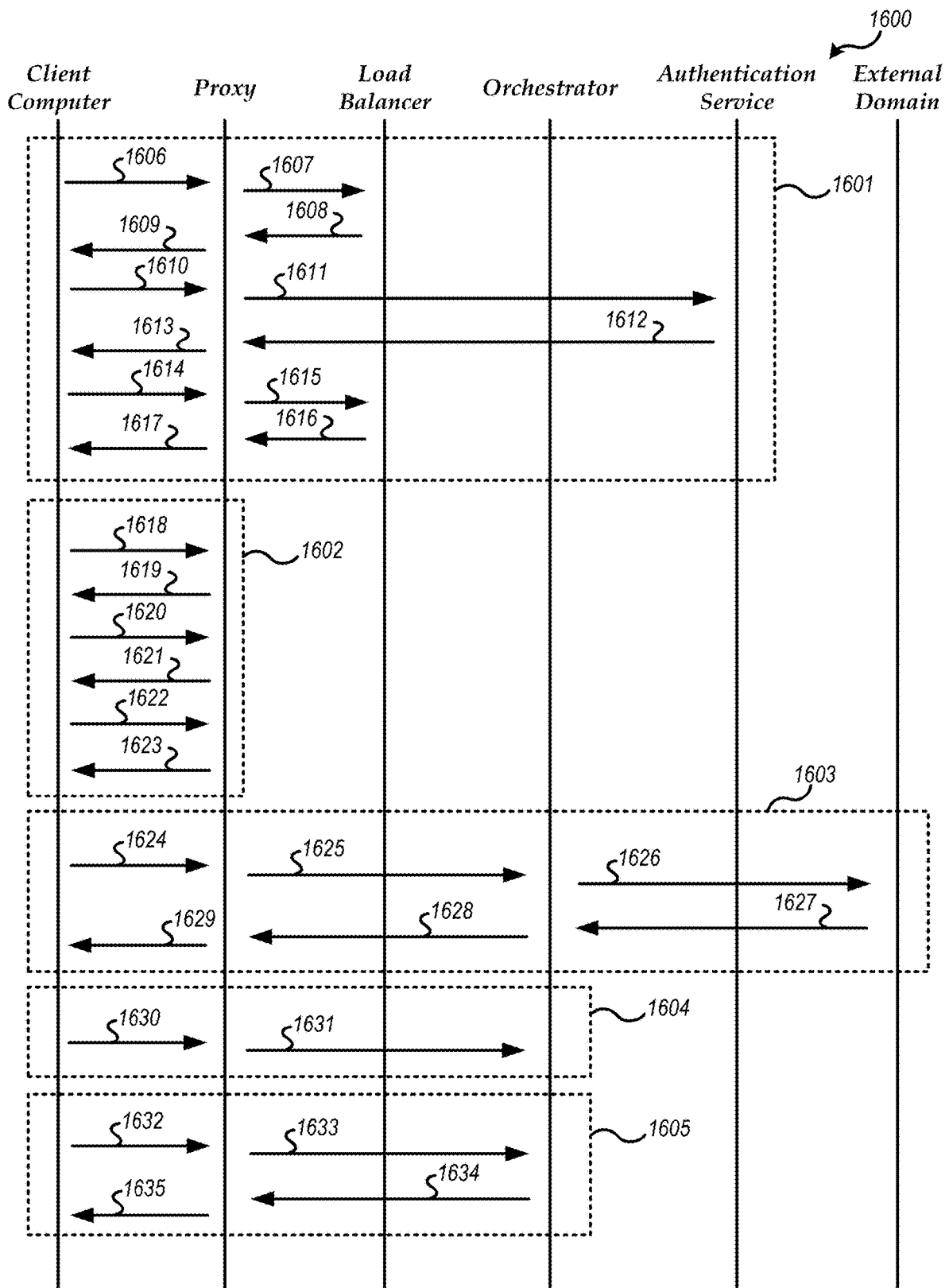
FIG. 16 is an example sequence diagram of example messages provided by an example Adaptive Rendering Application Isolation System for a use case in an isolation session.

FIG. 16 is an example sequence diagram of example messages provided by an example Adaptive Rendering Application Isolation System for a use case in an isolation session. This same sequence or similar sequences can be used with an isolator application as described herein or with web applications loaded on client computing devices as described in the cross-referenced related applications that are incorporated herein in entirety. This use case includes an example authentication sub-sequence 1601, an example state handler sub-sequence 1602, an example request-and-render sub-sequence 1603, an example remote-only-action sub-sequence 1604, and an example hybrid-action sub-sequence 1605.

In authentication sub-sequence 1601, a local application (for example, isolator application or web browser) on a client computing device sends a request to a proxy server. In this use case, the request is provided in message 1606 as a hypertext transfer protocol (HTTP) GET request, such as a search query via a search engine for the term "rhino", with an invalid authentication cookie: GET google.com/?q=rhino; Cookies[AUTH]=invalid. The request can be provided to the proxy server automatically because of the local network configuration provided by the local network administrator, configuration of the isolator application, or because the user directed the request directly or indirectly to the load balancer (for example, opening a shortcut, providing a uniform resource identifier (URI) directed toward the load balancer, or toggling a configuration setting). The proxy server may provide message 1607 to the load balancer as an HTTP REWRITE: REWRITE s2.systems/?d=google.com/ ?q=rhino; Cookies[AUTH]=invalid. Because the authentication cookie is invalid (either expired or the user hasn't logged in), the load balancer provides message 1608 to instruct the proxy server to redirect the local application to a single-sign-on ("SSO") service, such as the SSO service available under the mark MICROSOFT®: 301 microsoft.com. The proxy server provides the redirect in message 1609 to the local application and instructs the local application to clear the authentication cookie: 301 microsoft.com; Set-Cookie: AUTH=null.

The local application provides message 1610 to initiate the login process based on the obtained redirect, which may be an HTTP GET request that identifies the service for which the login is intended, such as an isolation session available under the mark S2 SYSTEMS: GET microsoft/ ?r=s2.systems/oauth2/idresponse. The proxy provides the request to the SSO service in message 1611. The SSO service takes action to authenticate the user, the client computing device, or the local application and, if the authentication is successful, provides message 1612 to instruct the proxy server to redirect the local application back to the load balancer: 301 s2.systems/oauth2/idresponse. The proxy provides the redirect in message 1613.

The local application may be redirected to an authentication endpoint (for example, the load balancer), such as an Open Authentication endpoint (for example, an OAuth 2.0 endpoint), and provides message 1614 indicating that the user is logged in, along with the rewritten request and any state information: GET google.com/?q=rhino/ ?r=s2.systems/oauth2/idresponse. The proxy provides the request and appended state information to the authentication endpoint in message 1615. The load balancer provides message 1616 as a redirect with the rewritten URL and instructions to associate the authentication cookie with the external domain of the rewritten URL: 301 s2.systems/ ?d=google.com/?q=rhino; Set-Cookie: AUTH=valid. The proxy provides message 1617 to the local application to cause the local application to remove the isolation-session domain to display the rewritten URL in the address bar in the same way that the user would view the URL if the user were taking the same actions during a non-isolation session (for example, normal web browsing outside of an isolation session), along with an instruction to set the authentication cookie for the isolation-session domain: 301 google.com/ ?=rhino; Set-Cookie: AUTH=valid.

In some versions, the isolator application facilitates reducing the computational or bandwidth expenses in sub-sequence 1601 compared to, for example, a web application because the isolator application has the one or more cohesive application-isolation interfaces that facilitate reducing the quantity of messages in sub-sequence 1601 or other efficiency improvements. For example, unlike a web application loaded in a web browser, the isolator application may be preconfigured to display any text in the address bar, thereby facilitating omission of messages that cause the local application to revise what is displayed in the address bar. The isolator application may perform the authentication either on its own or with one or more other components yet without notifying the user, thereby providing a more transparent experience. The isolator application may perform the rewrite actions on its own, without real-time received instructions, thereby facilitating omission of messages 1606-1609 and starting directly with message 1610. The isolator application may facilitate local authentication instead of engaging in remote messages under a network authentication standard such as Open Authentication or facilitates associating authentication globally and not merely on a per-domain basis, thereby facilitating omission of messages 1610-1613 for all external-domain actions or for every external-domain action subsequent to an initial login.

In state handler sub-sequence 1602, the local application provides message 1618 with the original request yet with a null value for the authentication cookie because the local application does not have the authentication cookie associated with the requested external domain (for example, the cookie associated with the external domain was cleared in sub-sequence 1602 (see message 1609), or the external domain is a newly requested external domain): GET google.com/?q=rhinos; Cookies[AUTH]=null. The proxy server responds with message 1619 to redirect the local application with an instruction to provide all cookies associated with any isolation sessions in the local application's next response: 301 s2.systems/setauthcookie/?r=google.com/ ?q=rhinos. The local application provides message 1620 with the request information, all state information, and all cookies associated with any isolation sessions, including all accessed domain cookies and the isolation-session authentication cookie: GET s2.systems/setcookie/?r=google.com/ ?q=rhinos; Cookies[AUTH]=JWT. In this example, "JWT" stands for JSON web token. At this stage, a local application with an address bar would typically display that the local application has loaded the isolation-session domain, not the requested external domain. Accordingly, at this stage, the local application would typically not have the cookies associated with the requested external domain because the local application typically has a local mapping of domains and cookies that is set responsive to a request for the respective domains (here, the browser sees the cookies as being set responsive to a request for the isolation-session domain at this stage). The proxy server may be stateless, so the local application typically includes all state information with each message, including indications that everything included in the message is a result of the listed request. The proxy server provides message 1621 with a cookie to associate the requested external domain as provided in the previous state information of message 1620 and with instructions for the local application to include requested state information (for example, state information following the "?q" in message 1621): 301 google.com/ ?q=rhinos&s2setcookie=JWT.

The local application responds with message 1622 to provide the requested state information with the original request, thereby providing instructions for the cookies to be associated with the requested external domain during the isolation session: GET google.com/ q?=rhinos&s2setcookie=JWT; Cookies[AUTH],null. The proxy server identifies the requested state information (for example, "s2setcookie") and responds with message 1623 with the temporary placeholder of "s2setcookie" removed to instruct the browser to generate a persistent association between the provided cookie and the requested domain and to instruct the local application to remove reference to the isolation-session service from the URL displayed in the address bar of the local application to provide the user with a transparent experience: 301 google.com/?q=rhinos; Set-Cookie: auth=JWT. The local application then associates the obtained cookie with the requested external domain (for example, google.com) responsive to receiving this series of instructions based on the request for the external domain. Without sub-sequence 1602, the local application would typically execute sub-sequence 1601 for each newly requested external domain. However, after executing sub-sequence 1602, the local application can skip sub-sequences 1601 and 1602 each time requesting the external domain because the cookie is persistently associated with that domain. Because the cookie and other state information are persistently locally stored and associated with the requested external domain, the state can be restored the next time the local application is launched after termination of the present isolation session while permitting the isolation-session domain to delete the remotely stored state information and subsequently obtain the persistent state information from the local application. State handler sub-sequence 1602 will execute for each new external domain that the local application requests or if the persistently associated cookie is expired or otherwise invalid at the time of the next request for the external domain.

In some cases, when the URL meets or exceeds a predetermined length, different local applications behave in different ways. For example, some web browsers may truncate the URL string by cutting off all characters after the first 2000 characters. Accordingly, in an embodiment the alternative messages 1619-1621 are used and messages 1622 and 1623 are eliminated, thereby facilitating further reducing the computational and bandwidth expenses in sub-sequence 1602. Alternative message 1619 may include a web page that causes the local application to provide a fetch request for a text list of the cookies provided in message 1618. Example JavaScript for the web page may include the following.

```
const result = await (await fetch("s2.systems/getcookies")).text( )
for(cookie of result.split(';')) {
    document.cookie = cookie
}
window.location.reload( )
```

Upon loading this example web page, the local application may provide the fetch request as alternative message 1620: FETCH s2.systems/getcookies. Instead of automatically proceeding, "await" inside the parenthesis causes the local application to wait for the response to the fetch, which is provided in message 1621. The "await" outside of the parenthesis causes the local application to parse the obtained message 1621 as text in accordance with the for loop. The message 1621 may include a list of the cookies provided in message 1618. The local application may parse the cookies into multiple different cookies and reloads the web page with all of the now locally stored cookies. Accordingly, alternative messages 1619-1621 facilitate eliminating messages 1622 and 1623 and also eliminate the risk of error or unpredictable error when URLs exceed the predetermined length, which is a reasonable probability given all the state information that may be appended to those URLs.

In some versions, the isolator application facilitates reducing the computational or bandwidth expenses in sub-sequence 1602 compared to, for example, a web application because the isolator application has the one or more cohesive application-isolation interfaces that facilitate reducing the quantity of messages in sub-sequence 1602 or other efficiency improvements. For example, unlike a web application loaded in a web browser, the isolator application facilitates global association of cookies, instead of the traditional domain-specific association of cookies (for example, the authentication cookie in this use case would only be associated with the isolation-session domain, not the requested external domain, which is why the HTTP redirect in message 1619 is used to cause the local application to provide all cookies associated with the isolation-session domain for subsequent association with the requested external domain), thereby facilitating bypassing the entirety of sub-sequence 1602.

In request-and-render sub-sequence 1603, the local application provides message 1624 to make the original request with the persistently associated obtained cookie along with any state information: GET google.com/?q=rhinos Cookies [AUTH]=JWT. The proxy server provides the request in message 1625 to the orchestrator based on the secure connection (for example, secure connection 120) established based on authentication sub-sequence 1601. The remotely isolated application instance in the orchestrator provides message 1626 to the requested domain to cause the remote application instance to take the requested action based on information obtained from the external domain in message 1627. The remote application instance provides draw commands and corresponding position information in message 1628. The proxy server provides message 1629 to provide the draw commands and corresponding position information. Based on the draw commands and corresponding position information, the local application renders one or more portions of the output of the remote application instance.

In remote-only-action sub-sequence 1604, the local application provides message 1630 with state information indicative of the requested remote-only action. The proxy server provides the request in message 1631. The remote application instance executes the requested remote-only action. In some cases, remote-only actions may cause the output of the remote application instance to change, thereby resulting in a response with draw commands and corresponding position information (not shown in sub-sequence 1604).

In hybrid-action sub-sequence 1605, the local application provides message 1632 with state information indicative of the requested hybrid-action. The proxy server provides the request in message 1633. The remote application instance executes its portion of the hybrid action and responds with message 1634, along with any relevant state information, files, or other data to facilitate the local application completing the hybrid action. The proxy server provides the data to the local application in message 1635. The local application then completes the hybrid action.

The portions of sequence 1600 that are executed on the client computing device may be executed by a web application as described in the cross-referenced related applications or the isolator application. In some versions, the isolator application facilitates reducing the computational or bandwidth expenses in comparison to, for example, a web application loaded in a web browser because the isolator application has the one or more cohesive application-isolation interfaces that facilitate reducing the quantity of messages in sequence 1600, elimination of the proxy server, or other efficiency improvements. For example, the isolator application may locally performs all the actions of the proxy server, thereby facilitating reducing the number of network communications, reducing the number of steps, and optionally engaging in SSO authentication via normal web application authentication flows and processes without rewrites and redirects to manipulate the URLs, certificates, cookies, or other state information because there is no intermediate stateless proxy server that requires the numerous back-and-forth messaging to handle the statelessness of the proxy server. The isolator application may facilitate receiving everything that the remote application instance stores or updates as cookies or state information to facilitate the isolator application mirroring the remote application instance, thereby providing a more transparent experience to the user and reducing network traffic by facilitating persistent states, which is not normally available during isolation sessions that employ web applications loaded in local web browsers, and facilitating querying the local application for cookies or state information to send to a requested external domain. In cases where the proxy server is used with the isolator application, the isolator application may engage in authentication with the remote application instance before sending requests to the proxy server, thereby providing a hybrid approach that provides relatively simple means of control for network administrators while reducing network traffic.

Although the blocks of FIGS. 4-8 and 10-15 and the messages of FIG. 16 are shown as being in a serial logic flow, they can be executed in parallel with one or more portions of each other or one or more other blocks or messages described herein.

FIGS. 17 and 18 are an example user interface 1700 of an example isolator application. As shown in FIGS. 17 and 18, the remote application instance is a remote web browser instance with an output of a web page loaded by the remote web browser instance, and the isolator application rendered one or more portions of the output. In this example, the user interface 1700 includes a plurality of user interface controls in a menu bar 1702, a window-control bar 1703, a ribbon bar 1704, a links menu 1705, an address bar 1706, and a scroll bar 1708. Also in this example, the displayed portion of the web page includes a variety of fields or objects, including graphical content 1710, a form field 1712, text content 1714, and a user interface control 1716 that each overlay a background 1718. One or more portions of the user interface 1700 or the displayed portion of the web page are outputs of the remote application instance. One or more portions of the user interface 1700 may be one or more cohesive isolation user interfaces of the isolator application.

The one or more cohesive application-isolation interfaces of the isolator application, including the one or more cohesive isolation user interfaces, facilitate providing the Adaptive Rendering Application Isolation System indications of user actions that are otherwise lost during fully secure isolation sessions absent one or more cohesive application-isolation interfaces of the isolator application and also facilitates executing functions that are otherwise unavailable during fully secure isolation sessions absent the one or more cohesive application-isolation interfaces of the isolator application. For example, the isolator application may notify the remote application instance when and which drop-down menu is displayed responsive to user actuation of one or more user interface controls in the menu bar 1702 of the one or more cohesive isolation user interface. This facilitates the remote application instance providing an indication to the isolator application of which user interface controls in the displayed drop-down menu are associated with features or functions that are or are not presently available or provide indications of user interface controls to include in the displayed drop-down menu based on one or more characteristics or states of the remote application instance, thereby facilitating the isolator application to dynamically configure the displayed drop-down menu (for example, graying out unavailable user interface controls, generating a new list of user interface controls that correspond to available features or functions, or other configurations).

Also as an example, the remote application instance may instruct the isolator application to modify one or more of the menu regions, such as the menu bar 1702, window-control bar 1703, ribbon bar 1704, links menu 1705, address bar 1706, or scroll bar 1708. Such modifications may include the existence or state (e.g., toggling a check box) of one or more user control interfaces (for example, ribbon buttons or others) in the one or more menu regions or the menu region itself.

As another example, the isolator application may notify the remote application instance when the user interface 1700 is out of view of the client computing device's display responsive to user actuation of one or more portions of the one or more cohesive isolation user interfaces, such as the minimize, maximize, or close user interface controls in the window-control bar 1703. This facilitates the remote application isolation ceasing to generate output to provide to the isolator application responsive to obtaining an indication that the user interface 1700 is out of view, thereby facilitating reducing computational and bandwidth expenses. Also as an example, the isolator application may notify the remote application instance when the user interacts with (for example, selecting, hovering over, or other interactions) one or more user interface controls in the ribbon bar 1704 or in the displayed drop-down menu of the menu bar 1702. This facilitates the remote application instance performing actions corresponding to those one or more actuated user interface controls, such as those actions that are clearly linked to the user interface controls shown in FIGS. 17 and 18 (for example, back, forward, stop, refresh, home, search, favorites, and the user interface controls of the drop-down menus titled "File," "Edit," "View," "Go," "Favorites," and "Help").

As a further example, the isolator application may notify the remote application instance when the user interacts with the links menu 1705 or the address bar 1706. This facilitates the remote application instance providing an indication to the isolator application of information with which to dynamically populate one or more portions of those controls, such as a list of frequent or enterprise-recommended links, automatically populating a remainder of a URL once the user begins typing, or other information. Each of these examples facilitate the remote application instance engaging in predictive computing by preemptively executing one or more actions that the isolated application instance predicts that the user will invoke based on the reported actions and historical learning or configuration. In some cases, one or more of the user interface controls 1702-1706 (and optionally one or more user interface controls within them, such as the user interface controls in the drop-down menus of the menu bar 1702) are a cohesive isolation user interface component of one or more cohesive application-isolation interfaces of the isolator application and may persist before and after the output of the web page from the remote web browser application instance being generated, modified, or cleared. Moreover, the remote application instance would never obtain indications of any of these user actions during fully secure isolation sessions absent the one or more cohesive application-isolation interfaces of the isolator application.

FIG. 18 shows an example drop-down menu 1802 of the menu bar 1702 of the isolator application. The drop-down menu 1802 includes multiple user interface controls, including user interface controls 1804 associated with local-only actions, user interface controls 1806 associated with remote-only actions, user interface controls 1808 associated with hybrid actions (local and remote actions in cooperation), and user interface controls 1810 associated with hardware-access actions. In other examples, the drop-down menus of the menu bar 1702 include user interface controls that are organized in the traditional fashion, unlike the purely illustrative example of FIG. 18.

As shown in FIG. 18, each of those user interface controls 1804-1810 is associated with a corresponding hot key that facilitates executing the underlying actions responsive to the user actuating the hot key. To utilize the hot keys, the user merely needs to select the user interface 1700 generally, such as by clicking the window-control bar 1703, and actuate the hot keys, and the isolator application responds by taking the appropriate action as described further regarding FIG. 15. Such user actions are otherwise lost during fully secure isolation sessions absent one or more cohesive application-isolation interfaces of the isolator application, and the corresponding functions are otherwise unavailable during fully secure isolation sessions absent the one or more cohesive application-isolation interfaces of the isolator application. In particular, during fully secure isolation sessions absent the one or more cohesive application-isolation interfaces of the isolator application, hot key actuation would only be provided to the remote application instance of the rendered output of the isolated application instance was selected, such as by first clicking the background 1718.

Other examples of isolation-session actions that the isolator application is preconfigured to facilitate provide include notifying the remote application instance when the user selects or highlights information in the rendered web page output (for example, the graphical content 1710 or the text content 1714), when the user pastes information into the rendered web page output, when the user requests to print or save the rendered web page output, or other actions that the user would expect to be available during a non-isolation session. In some cases, the remote application instance may insert the pasted information in the output of the remote application instance. In other cases, the remote application may perform one or more other predetermined actions, such as pasting the information in a different field or location, pasting different information in the output of the remote application (for example, a translation of the pasted information), or modifying the output of the remote application instance in another way. Further examples include providing the remote application instance an indication of the geolocation of the isolator application to cause the remote application instance to duplicate that information and thereby provide accurate geolocation-based services for the isolator application, instead of providing services that are based on the geolocation of the remote application instance. In other cases, the user may desire to obscure the geolocation of the isolator application, and the isolator application may provide a user interface control (e.g., a toggle button) that facilitates instructing the remote application whether to use its own geolocation and thereby obscure the geolocation of the isolator application, which is not possible with typical web browsers.

Another example includes the isolator application facilitating the user configuring timeout parameters, and the isolator application providing action indicators to the isolated application instance periodically in accordance with those parameters to thereby prevent the orchestrator from timing out the isolation session, which reduces the need for the user to wait for the session to be restored after timeout. This can occur across tabs so that the user need to wait for a restore to complete when switching between tabs. A further example includes zoom in or out actions based on user input indicating a desire to do so, providing an indicator to the remote application instance to perform a corresponding action, and obtaining modified render information to provide a zoomed-in or zoomed-out output of the remote application instance.

Also as an example, the one or more cohesive isolation programming interfaces of the isolator application may be preconfigured to obtain media streaming action information and cause the isolator application to retrieve streamed media from one or more sources that are different than the orchestrator or remote application instance and that are identified by the obtained media streaming action information, decode the streamed media, and provide (display or otherwise play) the streamed media for the user's consumption at a location identified by the obtained media streaming action information (for example, a position that a video should be located in a web page) so that isolator application combines the streamed media with the output of the remote application instance. This facilitates reducing the computational and bandwidth expenses incurred by the orchestrator because, otherwise, the orchestrator would have to process the streamed media content and provide the processed content to the client computing device. In some cases, the isolator application facilitates streaming media in this manner even where the media is available only to applications having an account logged therein and with which the media has been shared by obtaining mirrored cookies from the remote application instance to facilitate providing the isolator application the necessary credentials to access the media. In some cases, such media may be obtained by, responsive to the isolator determining that such credentials are required (for example, by the isolator application failing to stream the video from the source), the isolator application instructing the remote application instance to stream the media and route the media through the remote application instance to the isolator application. Although it is possible that a locally installed web application could create elements (for example, HTML5<video> elements) that point directly to a source stream, those elements are unlikely to be composited with the remainder of the output of the remote application instance with correctly applied z-ordering (two-dimensional overlapping) or clipping. Moreover, rendering the elements off-screen and subsequently manually compositing the elements into the output of the remote application instance presents performance challenges (for example, large bitmap copies at frequent intervals) and audio-visual synchronization challenges (for example, the local web browser would no longer control when the video would be displayed to the user).

Also as an example, the isolator application may harmonize its locally installed fonts, font settings, page zoom, or other local configuration parameters with those of the remote application instance. This facilitates causing the remote application instance to predictably layout and render output exactly as it would appear in the isolator application in a non-isolation session. In some cases, the isolator application determines which of such configuration parameters will be used for a given render (for example, based on historical information, user settings, local files, or others) and notifies the remote application instance of those configuration parameters before rendering occurs. In another example, the isolator application may provide status information to notify the user of the remote application instance's progress in performing one or more actions, such as sanitizing a file requested in a save or print action, by displaying the status information in locations typically inaccessible to web pages (for example, in or overlaying one or more of the menu bar 1702, window-control bar 1703, ribbon bar 1704, links menu 1705, address bar 1706, or scroll bar 1708 of FIGS. 17 and 18).

Also as an example, responsive to the remote application instance requesting data from the client computing device (for example, situations during a non-isolation session where a local application would display a file dialog), the isolator application instance provides its own file dialog instead of rendering that of the isolated application instance, and provides the inputs to the dialog to the remote application instance for seamless integration. In contrast, locally installed web applications are presently unable to request local file dialogs to open without first prompting the user to click on an extra button hosted by the web application. Another example includes the isolator application providing download status indications during isolation sessions including extra stages such as the remote application instance performing malware scanning on the downloaded information with, in some instances, the status information being in locations typically inaccessible to web pages (for example, in or overlaying one or more of the menu bar 1702, window-control bar 1703, ribbon bar 1704, links menu 1705, address bar 1706, or scroll bar 1708 of FIGS. 17 and 18).

In another example, the isolator application facilitates local debugging tools (for example, source viewing) being made to debug a page loaded in the remote application instance by connecting to exposed debugging endpoints (for example, a debugging window per session or per tab) in the remote application instance and mirroring what is available or shown in the remote debugging endpoints such as source information, element information, and network traffic information. This facilitates the user debugging the remotely loaded page in a manner that the user would expect to be provided when debugging a locally loaded page. Also as an example, the isolator application negotiates with the remote application instance regarding one or more properties (e.g., buffer size, number of audio channels, or others) for media streams to facilitate adjusting the properties of the stream based on detected characteristics (e.g., bandwidth availability, jitter characteristics, number of audio channels supported by the client device, or others) to improve the user-experienced latency or other aspects of the user-experience, the client device performance, or the server performance. For example, for each content type or source, the isolator application or the remote application instance may measure various characteristics associated with the stream (for example, bandwidth availability, jitter, or others) and negotiate the buffer size accordingly. Although controlling video streaming parameters such as a lower buffer for reduced latency could possibly be accomplished in a web application by implementing a video decoder in the web application, such an approach would be computationally expensive and would fail to utilize hardware accelerated decoding and therefore would be prohibitive on less powerful devices such as telephones.

In some examples, the isolator application may be preconfigured to perform one or more portions of sensitive-information theft prevention, which facilitates the prevention analysis utilizing context information that is otherwise unavailable to the remote application instance during fully secure isolation sessions absent one or more cohesive application-isolation interfaces of the isolator application, such as a source from which an input was copied (for example, a password vault, a secure location, or others may indicate that the copied information likely contains sensitive information) or the users domain credentials to facilitate filtering that information by clearing or modifying it.

Also as an example, the isolator application facilitates local Domain Name System (DNS) lookups for the remote application instance, instead of the remote application instance performing DNS lookups, as typically occurs during isolation sessions. This facilitates the local network systems (for example, router or gateway into the local network) viewing the DNS resolution activity in the same manner as performed during non-isolation sessions and thereby facilitates utilizing the security techniques and settings of those systems (for example, blocking DNS resolutions for blacklisted domain names). In another example, the isolator application facilitates utilizing the client computing system for control operations while data processing is performed by the remote application instance (for example, blurring an image in the case of the remote application instance being a photograph editing application), thereby reducing consumption of client computing devices computational resources while leveraging the, practically speaking, infinitely scalable computational resources of the orchestrator.

As a further example, facilitating cooperative or harmonious use of extensions. In some cases, the local isolator application has one or more extensions that the user caused to be loaded therein before initialization of an isolation session. During the initialization of the isolation session, the isolator application provides a list of unique extension identifiers (for example, extension names and versions), and the orchestrator or remote application instance downloads and installs those extensions (for example, from the Chrome extension store). During the isolation session, the isolator application notifies the remote application instance of detected inputs to and outputs of the locally installed extensions to facilitate the remote application instance causing its extensions to mirror the locally installed extensions. In some cases, the remote application instance notifies the isolator application of detected inputs to and outputs of the remotely installed extensions to facilitate the isolator application causing its extensions to mirror the remotely installed extensions.

In some versions, instead of causing the remote application instance to load the extensions, the application programming interface (API) integration points between the extensions and the remote application instance are proxied to the isolator application (for example, the API calls of the extensions on the isolator application are forwarded to the remote application instance) to facilitate the isolator application harmonizing the remote application instance and the locally installed extensions. In some versions, non-whitelisted extensions are precluded from being locally installed, and the remote application instance provides output information associated with the remotely installed extensions (for example, draw commands and corresponding position information) to the isolator application to facilitate the isolator application rendering the graphical output of the extensions in locations typically inaccessible to web pages (for example, in or overlaying one or more of the menu bar 1702, window-control bar 1703, ribbon bar 1704, links menu 1705, address bar 1706, or scroll bar 1708 of FIGS. 17 and 18) while the isolator application detects user inputs directed toward those render locations and notifies the remote application instance of those detected inputs to facilitate the remotely installed extensions processing the detected inputs. In some versions, because local extensions are unable to read HTML in the output of the remote application instance due to the local rendering being based on draw commands, the isolator application may request one or more portions of the HTML or other data to facilitate the local extensions operating as expected (for example, in the case of a password manager, the isolator application may request the remote application instance for an indicator of the target for the credentials such as a particular web page and the identities of the output fields). In some cases, the remote application instance may push one or more extensions to the isolator application and thereby force the isolator application to install or execute the one or more extensions. This action may, for example, facilitate consistency between client devices associated with an enterprise or user or between different sessions that a given uses on different machines that the user had not previously used, thereby allowing the user to have the same experience on any isolator application instance on any client device. This action may, as another example, cause the isolator application to render the extension to appear native (for example, the user interface controls associated with the extension may be embedded in one or more of the menu regions, such as the menu bar 1702, window-control bar 1703, ribbon bar 1704, links menu 1705, address bar 1706, or scroll bar 1708). Accordingly, the isolator application facilitates using extensions in manners that are not otherwise available during fully secure isolation sessions absent the one or more cohesive application-isolation interfaces of the isolator application.

Moreover, the one or more cohesive application-isolation interfaces of the isolator application facilitate notifying the orchestrator or the remote application instance of characteristics of hardware local to the client computing device that are otherwise unavailable to the orchestrator and remote application instance during fully secure isolation sessions absent the one or more cohesive application-isolation interfaces of the isolator application, such as monitor refresh rates, hardware capabilities, and any other hardware characteristics that the user can locally detect.

As a further example, the isolator application facilitates providing the remote application instance access to computing resources of the client device (for example, the graphics processing unit (GPU) (e.g., video rendering), hardware security tokens (e.g., logging in to services or other applications on behalf of the isolator application) that can be interacted with by the remote application instance, multi-threading (e.g., rendering on the client device multiple parts of the output in parallel in different threads, which facilitates video continuing to play while other parts of the screen are updated, such as by scrolling, thereby improving perceived performance), or other actions that are not available to typical web applications or web browsers, even during remote isolation sessions that utilize web applications downloaded to those web browsers (JavaScript in browsers runs all code in a single thread)).

Figure 19:
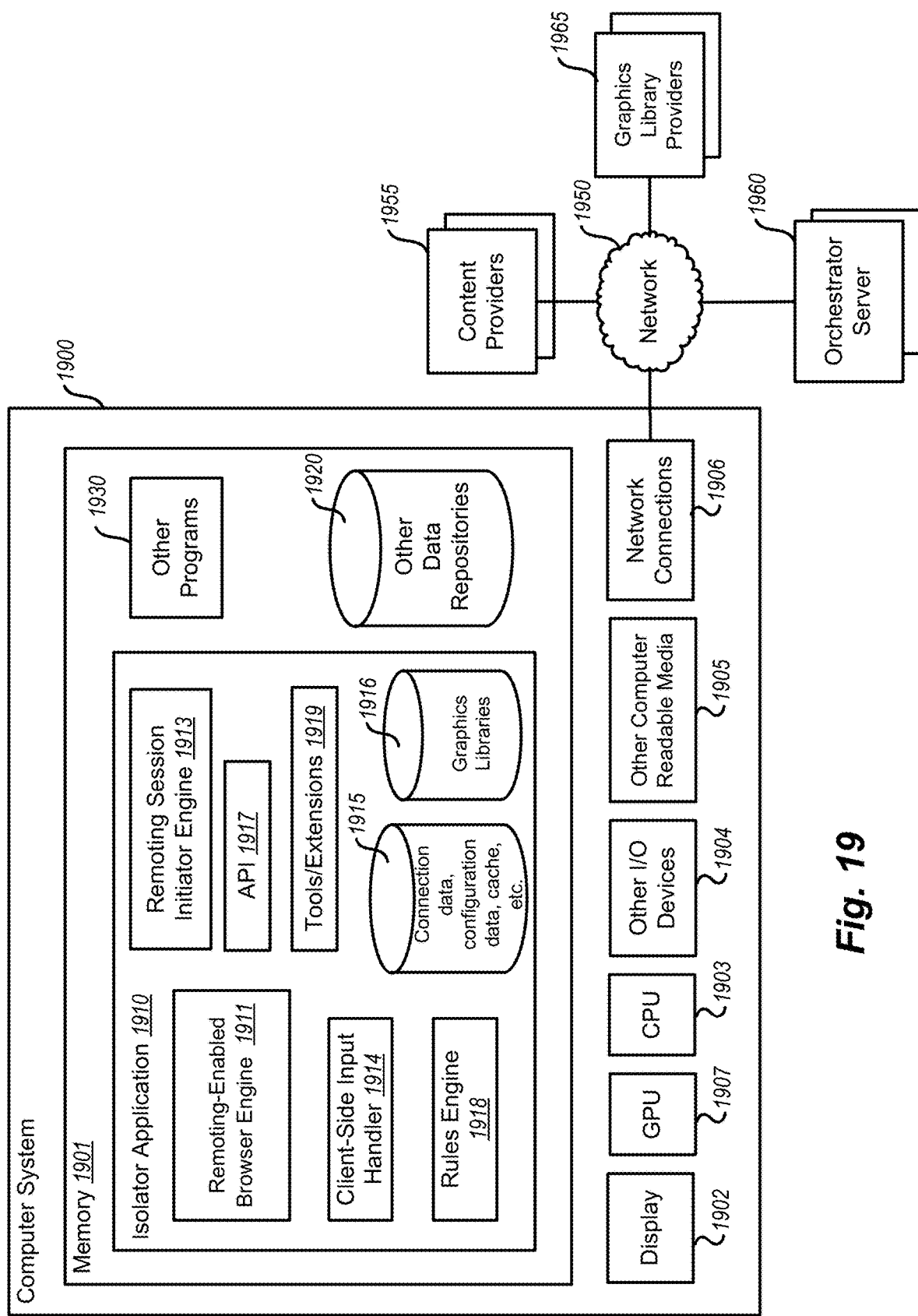
FIG. 19 is an example block diagram of an example computing system for practicing embodiments of an example Adaptive Rendering Application Isolation System.

FIG. 19 is an example block diagram of an example computing system 1900 for practicing embodiments of an example Adaptive Rendering Application Isolation System as described herein. In particular, this example computing system 1900 may be used to practice one or more of the client devices 104*a*—d illustrated in FIG. 1. This example computing system 1900 may be implemented in the same or a similar manner as discussed further regarding the example computing system 900 of FIG. 9. This example computing system 1900 also includes an isolator application 1910 stored in memory 1901, such as isolator application 105 and as described herein. One or more of the components 1911, 1913, 1914, and 1916-1918 may be cohesive components of the isolator application 1910 and, as such, are preconfigured in the isolator application 1910 to facilitate isolation sessions by performing or facilitating one or more portions of one or more of the actions, features, or functions described herein. In an embodiment, the isolator application 1910 is a Chromium-based application. Repository 1915 may store information obtained from the web server, orchestrator, or remote application instance. Components 1902-1907, 1950, 1955, 1960, and 1965 may operate as discussed further regarding the corresponding components in FIG. 9.

Although the Adaptive Rendering Application Isolation System ("ARAIS") is largely discussed in terms of its improvements to computer security, the ARAIS also facilitates improvements to computer technologies in many other ways, as is apparent from this disclosure. Examples include network scalability and computational scalability, which may be done without changing the experience of the end-user (i.e., transparency). Other examples include data control, such as compliance. Compliance includes legal compliance (e.g., General Data Protection Regulation (GDPR) compliance or others), enterprise policy compliance, or others. The ARAIS also facilitates reducing technological costs (as opposed to economic costs), such as computation costs, storage costs, bandwidth costs, or others. Further examples include ensuring version consistency related to applications (for example, web browsers) executing in the cloud by ensuring that all remote application instances are updated to the same version or have implemented the same patches (e.g., security patches).

Regarding data control, traditional web browsers allow users to move whatever data the user desires to any location that the user selects. In contrast, the ARAIS facilitates controlling where data sits and flows based on the isolator application's interactions with the remoting orchestrator, remote application instance, or other components of the ARAIS. One example includes executing a remote web browser or another remote application such as OUTLOOK in the secure container, and the ARAIS prevents downloading all data or select data or types of data (for example, personally identifying information (PII) in emails) other than select types of information such as draw commands from or via the remote web browser or other remote application to the client device based on one or more rules. Further, an enterprise implementing or otherwise utilizing the ARAIS may have visibility or control over data to facilitate data loss prevention (DLP) based on executing one or more rules to prevent select information or information types from being sent out of or brought into the enterprise, such as executing one or more rules that prevent uploading computer-aided design (CAD) documents or files from being transmitted to a computing device that is not associated with or controlled by the enterprise (for example, a computing device that does not directly control a remote web browser or remote application in the ARAIS).

Regarding costs, traditional web browsers or other locally executed applications lack scalability (up or down) beyond the physical limitations of the client device. In contrast, the ARAIS facilitates computation scalability (e.g., compute scalability, such as central processing unit (CPU) and memory footprint scaling or others), storage scalability, and bandwidth scalability in a manner that is transparent both to the user and to the client device, thereby facilitating reducing the computational load on the client device because draw commands sent to the client computing device do not materially influence the computational burden on the client device whether scaling up or down. Moreover, the ARAIS facilitates the remote orchestrator avoiding execution of a heavyweight virtual machine as is required in other remoting applications such as Remote Desktop Protocol applications or others. For example, the ARAIS facilitates merely executing an emulator instead of a virtual machine. Further, as explained elsewhere in this disclosure, various components of the remote browser instance or remote application instance may be distributed (for example, the execution computing device may be distributed and/or each function (e.g., scrolling or others) may be executed on a different machine) and all communicate with the client device or a single one of the machines in the distribution to communicate the draw commands to the client device such that the experience for the user and the client device is transparent.

As used herein, the term "or" refers to a grammatical conjunction to indicate that one or more of the connected terms may be employed. For example, the phrase "one or more A, B, or C" is employed to discretely refer to each of the following: i) one or more As, ii) one or more Bs, iii) one or more Cs, iv) one or more As and one or more Bs, v) one or more As and one or more Cs, vi) one or more Bs and one or more Cs, and vii) one or more As, one or more Bs, and one or more Cs. The term "based on" is not exclusive and allows for being based on additional factors not described, unless the context clearly dictates otherwise. In addition, the meaning of "a," "an," and "the" include plural references. Plural references are intended to also disclose the singular, unless the context clearly dictates otherwise. The meaning of "in" includes "in" and "on." Also, the use of "when" and "responsive to" do not imply that associated resultant actions are required to occur immediately or within a particular time period. Instead, they are used herein to indicate actions that may occur or be performed in response to one or more conditions being met, unless the context clearly dictates otherwise.

From the foregoing it will be appreciated that, although specific embodiments have been described herein for purposes of illustration, various modifications may be made without deviating from the spirit and scope of the invention. For example, the methods and systems for performing isolation-enabled rendering discussed herein are applicable to other architectures other than a Chromium or web-based architecture. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

What is claimed is:

1. A method, comprising:
receiving, by a server from an isolator application instance executing on a client device, a request to instantiate a remote application in the server;
instantiating an instance of the remote application in the server, wherein the server is remotely located, separate, and distinct from the client device;
configuring a secure connection between the remote application instance and the isolator application instance; and
providing, via the secure connection between the remote application instance and the isolator application instance, first draw commands and first position information that corresponds to the first draw commands to cause the isolator application instance to render one or more portions of output of the remote application instance based on the first draw commands and the first position information.

2. The method of claim 1, further comprising:
receiving, by the server from the isolator application instance on the client device, an indicator of an input from a user of the client device; and
providing, by the remote application instance to the isolator application instance, second draw commands and second position information that corresponds to the second draw commands, the second draw commands and the second position information being associated with a modified output of the remote application instance to cause the isolator application instance to render one or more portions of the modified output of the remote application instance based on the second draw commands and the second position information.

3. The method of claim 1, further comprising:
receiving, by the server from the isolator application instance on the client device, an indicator of an input from a user of the client device, the input indicating the one or more portions of the output of the remote application instance to be locally printed by the client device; and
providing, by the remote application instance to the isolator application instance, a file that provides a visual representation of the one or more portions of the output of the remote application instance, wherein the client device causes a printing device that is communicably coupled to the client device to print the visual representation of the one or more portions of the output of the remote application instance based on the file.

4. The method of claim 1, further comprising:
receiving, by the server from the isolator application instance on the client device, an indicator of an input from a user of the client device, the input indicating the one or more portions of the output of the remote application instance to be locally stored; and
providing, by the remote application instance to the isolator application instance, a file that provides a visual representation of the one or more portions of the output of the remote application instance, wherein the isolator application instance on the client device stores the file on another non-transitory computer-readable medium that is communicably coupled to the client device.

5. The method of claim 1, further comprising:
receiving, by the server from the isolator application instance on the client device, an indicator of an input from a user of the client device; and
providing, by the remote application instance to the isolator application instance, content in the one or more portions of the output of the remote application instance, wherein the isolator application instance stores the content in a clipboard buffer of the client device to enable the client device to paste the stored content in one or more other applications instantiated on the client device.

6. The method of claim 1, wherein instantiating the instance of the remote application in the server further comprises:
determining characteristics of the request and characteristics of a requested application for the remote application instance;
determining graphics level to use for transporting rendering data to the client device based on the determined characteristics of the request and determined characteristics of the requested application; and
transmitting, to the client device, a response packet in response to the request, the response packet including one or more resources to configure the isolator application instance to connect to the remote application instance, the one or more resources including graphic libraries available for the determined graphics level.

7. The method of claim 1, further comprising:
receiving, by the server from the isolator application instance on the client device, an indicator of an extension having an instance installed on the isolator application instance;
configuring an instance of the extension on the remote application instance on the server;
receiving, by the server from the isolator application instance on the client device, an indicator of a detected user input from a user of the client device to the extension instance installed on the isolator application instance; and
causing the extension instance on the remote application instance on the server to mirror the extension instance installed on the isolator application instance based on the detected user input.

8. A non-transitory machine-readable storage medium that provides instructions that, when executed by a processor, cause operations to be performed comprising:
receiving, by a server from an isolator application instance executing on a client device, a request to instantiate a remote application in the server;
instantiating an instance of the remote application in the server, wherein the server is remotely located, separate, and distinct from the client device;
configuring a secure connection between the remote application instance and the isolator application instance; and
providing, via the secure connection between the remote application instance and the isolator application instance, first draw commands and first position information that corresponds to the first draw commands to cause the isolator application instance to render one or more portions of output of the remote application instance based on the first draw commands and the first position information.

9. The non-transitory machine-readable storage medium of claim 8, wherein the operations further comprise:
receiving, by the server from the isolator application instance on the client device, an indicator of an input from a user of the client device; and
providing, by the remote application instance to the isolator application instance, second draw commands and second position information that corresponds to the second draw commands, the second draw commands and the second position information being associated with a modified output of the remote application instance to cause the isolator application instance to render one or more portions of the modified output of the remote application instance based on the second draw commands and the second position information.

10. The non-transitory machine-readable storage medium of claim 8, wherein the operations further comprise:
receiving, by the server from the isolator application instance on the client device, an indicator of an input from a user of the client device, the input indicating the one or more portions of the output of the remote application instance to be locally printed by the client device; and
providing, by the remote application instance to the isolator application instance, a file that provides a visual representation of the one or more portions of the output of the remote application instance, wherein the client device causes a printing device that is communicably coupled to the client device to print the visual representation of the one or more portions of the output of the remote application instance based on the file.

11. The non-transitory machine-readable storage medium of claim 8, wherein the operations further comprise:
receiving, by the server from the isolator application instance on the client device, an indicator of an input from a user of the client device, the input indicating the one or more portions of the output of the remote application instance to be locally stored; and
providing, by the remote application instance to the isolator application instance, a file that provides a visual representation of the one or more portions of the output of the remote application instance, wherein the isolator application instance on the client device stores the file on another non-transitory computer-readable medium that is communicably coupled to the client device.

12. The non-transitory machine-readable storage medium of claim 8, wherein the operations further comprise:
receiving, by the server from the isolator application instance on the client device, an indicator of an input from a user of the client device; and
providing, by the remote application instance to the isolator application instance, content in the one or more portions of the output of the remote application instance, wherein the isolator application instance stores the content in a clipboard buffer of the client device to enable the client device to paste the stored content in one or more other applications instantiated on the client device.

13. The non-transitory machine-readable storage medium of claim 8, wherein instantiating the instance of the remote application in the server includes:
determining characteristics of the request and characteristics of a requested application for the remote application instance;
determining graphics level to use for transporting rendering data to the client device based on the determined characteristics of the request and determined characteristics of the requested application; and
transmitting, to the client device, a response packet in response to the request, the response packet including one or more resources to configure the isolator application instance to connect to the remote application instance, the one or more resources including graphic libraries available for the determined graphics level.

14. The non-transitory machine-readable storage medium of claim 8, wherein the operations further comprise:
receiving, by the server from the isolator application instance on the client device, an indicator of an extension having an instance installed on the isolator application instance;
configuring an instance of the extension on the remote application instance on the server;
receiving, by the server from the isolator application instance on the client device, an indicator of a detected user input from a user of the client device to the extension instance installed on the isolator application instance; and
causing the extension instance on the remote application instance on the server to mirror the extension instance installed on the isolator application instance based on the detected user input.

15. A server, comprising:
a processor; and
a non-transitory machine-readable storage medium that provides instructions that, if executed by the processor, will cause the server to perform operations including:
receiving, by the server from an isolator application instance executing on a client device, a request to instantiate a remote application in the server;
instantiating an instance of the remote application in the server, wherein the server is remotely located, separate, and distinct from the client device;
configuring a secure connection between the remote application instance and the isolator application instance; and
providing, via the secure connection between the remote application instance and the isolator application instance, first draw commands and first position information that corresponds to the first draw commands to cause the isolator application instance to render one or more portions of output of the remote application instance based on the first draw commands and the first position information.

16. The server of claim 15, wherein the operations further comprise:
receiving, by the server from the isolator application instance on the client device, an indicator of an input from a user of the client device; and
providing, by the remote application instance to the isolator application instance, second draw commands and second position information that corresponds to the second draw commands, the second draw commands and the second position information being associated with a modified output of the remote application instance to cause the isolator application instance to render one or more portions of the modified output of the remote application instance based on the second draw commands and the second position information.

17. The server of claim 15, wherein the operations further comprise:
receiving, by the server from the isolator application instance on the client device, an indicator of an input from a user of the client device, the input indicating the one or more portions of the output of the remote application instance to be locally printed by the client device; and
providing, by the remote application instance to the isolator application instance, a file that provides a visual representation of the one or more portions of the output of the remote application instance, wherein the client device causes a printing device that is communicably coupled to the client device to print the visual representation of the one or more portions of the output of the remote application instance based on the file.

18. The server of claim 15, wherein the operations further comprise:
receiving, by the server from the isolator application instance on the client device, an indicator of an input from a user of the client device, the input indicating the one or more portions of the output of the remote application instance to be locally stored; and
providing, by the remote application instance to the isolator application instance, a file that provides a visual representation of the one or more portions of the output of the remote application instance, wherein the isolator application instance on the client device stores the file on another non-transitory computer-readable medium that is communicably coupled to the client device.

19. The server of claim 15, wherein the operations further comprise:
receiving, by the server from the isolator application instance on the client device, an indicator of an input from a user of the client device; and
providing, by the remote application instance to the isolator application instance, content in the one or more portions of the output of the remote application instance, wherein the isolator application instance stores the content in a clipboard buffer of the client device to enable the client device to paste the stored content in one or more other applications instantiated on the client device.

20. The server of claim 15, wherein instantiating the instance of the remote application in the server further includes:
determining characteristics of the request and characteristics of a requested application for the remote application instance;
determining graphics level to use for transporting rendering data to the client device based on the determined characteristics of the request and determined characteristics of the requested application; and
transmitting, to the client device, a response packet in response to the request, the response packet including one or more resources to configure the isolator application instance to connect to the remote application instance, the one or more resources including graphic libraries available for the determined graphics level.

21. The server of claim 15, wherein the operations further comprise:
receiving, by the server from the isolator application instance on the client device, an indicator of an extension having an instance installed on the isolator application instance;
configuring an instance of the extension on the remote application instance on the server;
receiving, by the server from the isolator application instance on the client device, an indicator of a detected user input from a user of the client device to the extension instance installed on the isolator application instance; and
causing the extension instance on the remote application instance on the server to mirror the extension instance installed on the isolator application instance based on the detected user input.

* * * * *